US008677608B2

(12) United States Patent
Akita et al.

(10) Patent No.: US 8,677,608 B2
(45) Date of Patent: Mar. 25, 2014

(54) METHOD FOR MANUFACTURING IRON CORE AND APPARATUS FOR MANUFACTURING IRON CORE

(75) Inventors: Hiroyuki Akita, Chiyoda-ku (JP); Kimiyasu Furusawa, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 818 days.

(21) Appl. No.: 12/990,113

(22) PCT Filed: Jul. 24, 2008

(86) PCT No.: PCT/JP2008/001973
§ 371 (c)(1),
(2), (4) Date: Oct. 28, 2010

(87) PCT Pub. No.: WO2010/010599
PCT Pub. Date: Jan. 28, 2010

(65) Prior Publication Data
US 2011/0047780 A1 Mar. 3, 2011

(51) Int. Cl.
*H01F 7/06* (2006.01)
(52) U.S. Cl.
USPC .......... 29/606; 29/604; 29/605; 336/200; 336/234; 310/216.008; 310/216.018; 310/216.011
(58) Field of Classification Search
USPC ............. 29/417, 592.1, 602.1, 604–606; 310/216.008, 216.011, 216.018, 310/216.049; 336/200, 234
See application file for complete search history.

(56) References Cited

U.S. PATENT DOCUMENTS

| 4,427,462 A | * | 1/1984 | Senno et al. ............... 148/308 |
| 4,524,507 A | * | 6/1985 | Hara et al. ............... 29/564.2 |
| 4,876,473 A | * | 10/1989 | Tanaka et al. .......... 310/216.018 |
| 5,095,610 A | * | 3/1992 | Schultz et al. ............. 29/596 |

(Continued)

FOREIGN PATENT DOCUMENTS

| CN | 1178410 A | 4/1998 |
| JP | 5-003648 A | 1/1993 |

(Continued)

OTHER PUBLICATIONS

Office Action (First Notice of Reasons for Rejection) dated Jul. 30, 2012, issued in corresponding Chinese Patent Application No. 200880129686.7, and a partial English Translation thereof. (6 pages).

(Continued)

*Primary Examiner* — Paul D Kim
(74) *Attorney, Agent, or Firm* — Buchanan Ingersoll & Rooney PC

(57) ABSTRACT

An annular core member having an opening portion located at a position rotated by 90 degrees from a reference position, where the opening portion is oriented in the counterclockwise direction, and an annular core member having the opening portion located at the reference position, where the opening portion is oriented in the clockwise direction, are prepared to form an iron core by a rotary lamination apparatus by rotating the annular core members and by a predetermined angle (90 degrees) such that a first end, in the annular core member, which is at the position rotated by 90 degrees from the reference position and has no rotation uneven part, is circumference-positionally identical in the laminating direction with that of a fourth end, in an annular core member, which is at the reference position and has no rotation uneven part.

10 Claims, 31 Drawing Sheets

(56) References Cited

U.S. PATENT DOCUMENTS

| | | | |
|---|---|---|---|
| 5,627,418 | A | 5/1997 | Satomi et al. |
| 6,226,856 | B1 | 5/2001 | Kazama et al. |
| 6,504,284 | B1 | 1/2003 | Kazama et al. |
| 6,658,721 | B2 * | 12/2003 | Kazama et al. ............... 29/596 |
| 7,038,349 | B2 * | 5/2006 | Suzuki et al. ......... 310/216.008 |
| 2003/0066183 | A1 * | 4/2003 | Nouzumi ...................... 29/596 |
| 2005/0050714 | A1 * | 3/2005 | Hashimoto et al. ............ 29/596 |
| 2006/0163967 | A1 | 7/2006 | Yamamoto et al. |
| 2006/0279160 | A1 * | 12/2006 | Yoshinaga et al. ........... 310/216 |

FOREIGN PATENT DOCUMENTS

| | | | |
|---|---|---|---|
| JP | 7-143722 | A | 6/1995 |
| JP | 3461552 | B2 | 10/2003 |
| JP | 2004-236497 | A | 8/2004 |
| JP | 2005-110464 | A | 4/2005 |
| JP | 2005-127768 | A | 5/2005 |
| JP | 2005-218194 | A | 8/2005 |
| JP | 2005-341684 | A | 12/2005 |
| JP | 2006-211819 | A | 8/2006 |

OTHER PUBLICATIONS

Japanese Office Action, dated Sep. 11, 2012, issued in corresponding Japanese Patent Appln. No. 2010-521543, with English-language Translation.

International Search Report (PCT/ISA/210) issued on Oct. 28, 2008, by Japanese Patent Office as the International Searching Authority for International Application No. PCT/JP2008/001973.

* cited by examiner 8-pole &12-slot        10-pole &12-slot

Table2. Experimental result

| sample No. | rotatary lamination | level difference [10E-3mm] | Y [10E-4/mm] | Cogging T /rated T [%] |
|---|---|---|---|---|
| 1 | N | 6.9 | 1.52 | 0.048 |
| 2 | Y | 5.4 | 1.40 | 0.005 |
| 3 | N | 29.4 | 9.07 | 0.346 |
| 4 | Y | 31.4 | 1.23 | 0.003 |

| KINDS OF PROCESSING | CUT LINE (CLOCKWISE DIRECTION) | | CUT LINE (COUNTER-CLOCKWISE DIRECTION) | | CUT LINE (COUNTER-CLOCKWISE DIRECTION) 10 POSITIONS | CUT LINE (CLOCKWISE DIRECTION) 10 POSITIONS | JOINT BEND | | JOINT BEND 10 POSITIONS | CUT |
|---|---|---|---|---|---|---|---|---|---|---|
| POSITION OF PROCESSING | 0 DEGREES | 90 DEGREES | 0 DEGREES | 90 DEGREES | | | 0 DEGREES | 90 DEGREES | | |
| PUNCH | P1 | P2 | P3 | P4 | P5 | P6 | P8 | P9 | P10 | P11 |
| M1 | × | × | ○ | ○ | ○ | × | ○ | × | ○ | ○ |
| M2 | ○ | × | × | ○ | × | ○ | ○ | × | ○ | ○ |
| M3 | × | ○ | ○ | × | ○ | × | ○ | × | ○ | ○ |
| M4 | ○ | ○ | × | × | ○ | ○ | ○ | ○ | ○ | ○ |
| M5 | × | × | ○ | × | × | × | × | ○ | ○ | ○ |
| M6 | × | ○ | × | ○ | ○ | ○ | × | ○ | ○ | ○ |
| M7 | ○ | × | × | × | × | × | × | ○ | ○ | ○ |
| M8 | ○ | ○ | × | × | × | ○ | × | ○ | | ○ |

METHOD FOR MANUFACTURING IRON CORE AND APPARATUS FOR MANUFACTURING IRON CORE

TECHNICAL FIELD

The present invention relates to a method and an apparatus for manufacturing an iron core which is formed by connecting adjoining split cores so as to be rotatable via rotation uneven parts, and by arranging the split cores annularly.

BACKGROUND ART

For example, as disclosed in Patent Document 1, iron cores which are each formed of divided pieces (split cores) are manufactured as follows. That is, split core pieces are manufactured by stamping a steel plate using a press die, and the plurality of split core pieces are laminated and fixed by crimping, whereby an iron core is manufactured. Stator iron cores are each manufactured as follows. That is, a coil is wound around a magnetic pole tooth of each split core having an insulation sheet interposed therebetween, split cores having the coils wound around are assembled annularly, and the annularly assembled split cores are fixed in a frame.

The split cores can be wound around separately, and thus as compared to a case of winding around an integrated iron core which is not divided into pieces, a sufficient space is secured for a nozzle for winding coils to pass through, and coils can be mounted in the high density. Thus, such designing as improvement in torque by increasing the number of turns of coil, and reduction in electric resistance by employing coils having a large cross-sectional area can be achieved, and consequently, the performance of motors in terms of torque, efficiency and the like can be advantageously improved.
[Patent Literature]
[Patent Literature 1] Japanese Patent No. 3461552 (Page 3, FIG. 1)

DISCLOSURE OF THE INVENTION

Problems to be Solved by the Invention

For example, with respect to drive motors used for machine tools, electric power steering systems for passenger cars, and elevators, there is a demand for reducing torque ripple in order to achieve improvements in their driving accuracy and improvements in their comfort. The torque ripple is caused by various factors such as errors in the inner circumference shape of a stator iron core, variation in the magnetic resistance of a stator iron core, variation in the magnetomotive force of a rotor, and axial misalignment between a stator and a rotor.

In the case of a stator iron core obtained by assembling split cores annularly, respective adjoining split cores come in contact with each other at their boundaries, whereby the position of the respective split cores with respect to one another are determined. However, due to processing accuracy of the split cores or assembly errors, level difference occurs in the inner circumference shape of the respective split cores. When the level difference exists in the inner circumference shape of the split cores, the permeance of the magnetic path formed between the stator and the rotor increases locally, resulting in a problem of increase in torque ripple.

There is a method for improving accuracy in assembling split cores, and according to the method, pivotably connected-type split cores are used as the split cores. However, even in this case, the level difference occurs in the inner circumference shape of the split cores due to errors in the rotation center position of the connecting parts, variation in the shape of the split cores, or the like. When the reduction in torque ripple is strictly demanded, for example, improvement in processing accuracy at the time of manufacture is further required, or grinding finish of the inner circumference after assembly is required, which causes a problem of increase in manufacturing costs.

In addition, a steel plate has magnetic anisotropy, and thus the magnetic resistance thereof in its rolling direction is different from that in a direction perpendicular to the rolling direction. Thus, in the case where a plurality of tooth parts forming a split core are aligned in the same direction on a single steel plate and are stamped from the steel plate, when a plurality of the split cores are arranged annularly to form a stator iron core, the magnetic resistance of the split cores varies depending on the direction of the tooth parts, and consequently the torque ripple becomes large.

The present invention relates to an iron core formed by rotatably connecting respectively adjoining split cores via their rotation uneven parts and by arranging split cores annularly. In addition, the preset invention provides a method and an apparatus for manufacturing iron cores which are capable of reducing torque ripple which is caused by shape asymmetry such as level difference in the inner circumference shape of split, and by difference in the magnetic resistance of split cores.

Solution to the Problems

A method for manufacturing an iron core according to the present invention is a method for manufacturing an iron core having a structure, in which first split core pieces adjoining one another in the circumferential direction and second split core pieces adjoining one another in the circumferential direction are mutually rotatable, by forming a first annular core member by punching a plurality of first split core pieces in an annular shape out of a sheet of magnetic plate material, the first split core pieces each including: a yoke part which includes a first end of a first shape oriented in a first circumferential direction and a second end of a second shape, which is different from the first shape and is oriented in a second circumferential direction, and which has a rotation uneven part arranged on the surface of the first end; and a tooth part projecting inwardly in the radial direction from the yoke part, such that the first end of the yoke part of each first split core piece comes in contact with the second end of the yoke part of its circumferentially adjoining first split core piece, by forming a second annular core member by punching a plurality of second split core pieces in an annular shape out of a sheet of magnetic plate material, the second split core pieces each including: a yoke part which includes a third end of the second shape oriented in the first circumferential direction and a fourth end of the first shape oriented in the second circumferential direction, and which has a rotation uneven part arranged on the surface of the fourth end; and a tooth part projecting inwardly in the radial direction from the yoke part, such that the third end of the yoke part of each second split core piece comes in contact with the fourth end of the yoke part of its circumferentially adjoining second split core piece, and by concentrically laminating the first annular core member and the second annular core member such that each first end of the first shape is overlaid with its corresponding fourth end of the first shape, and connecting the overlaid portions by the rotation uneven parts, the method including:

a first process of, on the first annular core member, making cut lines of the first shape or the second shape with respect to the first ends that are at a reference position, and at a position rotated by a predetermined angle from the reference position, and also making cut lines of the first shape with respect to the first ends that are at circumference positions other than the reference position, and the position rotated by the predetermined angle from the reference position;

a second process of, on the second annular core member, making cut lines of the first or the second shape with respect to the fourth ends that are at the reference position, and at the position rotated by the predetermined angle from reference position, and also making cut lines of the first shape with respect to the fourth ends that are at circumference positions other than the reference position, and the position rotated by the predetermined angle from the reference position;

a third process of forming the rotation uneven parts on the surfaces of the first ends of the yokes of the first annular core member and on the surfaces of the fourth ends of the yokes of the second annular core member, at the circumference positions other than either of the reference position and the position rotated by the predetermined angle from the reference position; and a fourth process of laminating the first annular core member and the second annular core member while rotating the first annular core member or the second annular core member by the predetermined angle such that one of the first ends in the circumferential direction of the first annular core member, the first end having no rotation uneven part processed, is positionally identical in the laminating direction with one of the fourth ends in the circumferential direction of the second annular core member, the fourth end having no rotation uneven part processed.

An apparatus for manufacturing an iron core according to the present invention is an apparatus for manufacturing an iron core having a structure, in which first split core pieces adjoining one another in the circumferential direction and second split core pieces adjoining one another in the circumferential direction are mutually rotatable, by forming a first annular core member by punching a plurality of first split core pieces in an annular shape out of a sheet of magnetic plate material, the first split core pieces each including: a yoke part which includes a first end of a first shape oriented in a first circumferential direction and a second end of a second shape, which is different from the first shape and is oriented in a second circumferential direction, and which has a rotation uneven part arranged on the surface of the first end; and a tooth part projecting inwardly in the radial direction from the yoke part, such that the first end of the yoke part of each first split core piece comes in contact with the second end of the yoke part of its circumferentially adjoining first split core piece, by forming a second annular core member by punching a plurality of second split core pieces in an annular shape out of a sheet of magnetic plate material, the second split core pieces each including: a yoke part which includes a third end of the second shape oriented in the first circumferential direction and a fourth end of the first shape oriented in the second circumferential direction, and which has a rotation uneven part arranged on the surface of the fourth end; and a tooth part projecting inwardly in the radial direction from the yoke part, such that the third end of the yoke part of each second split core piece comes in contact with the fourth end of the yoke part of its circumferentially adjoining second split core piece, and by concentrically laminating the first annular core member and the second annular core member such that each first end of the first shape is overlaid with its corresponding fourth end of the first shape, and connecting the overlaid portions by the rotation uneven parts, the apparatus including:

a metallic mold stage including:

a first cut processing punch which makes, on the first annular core member, cut lines of the first shape or the second shape with respect to the first ends that are at the reference position, and at the position rotated by a predetermined angle from the reference position, and which also makes, on the first annular core member, cut lines of the first shape with respect to the first ends that are at circumference positions other than the reference position, and the position rotated by the predetermined angle from the reference position;

a second processing punch which makes, on the second annular core member, cut lines of the first shape or the second shape with respect to the fourth ends that are at the reference position, and at the position rotated by the predetermined angle reference position, and which also makes, on the second annular core member, cut lines of the first shape with respect to the fourth ends that are at the circumference positions other than the reference position, and the position rotated by the predetermined angle from the reference position;

a first rotation uneven part processing punch for forming rotation uneven parts each on the surface of one of the first ends of the first annular core member, and on the surface of one of the fourth ends of the second annular core member, the first end and the fourth end being at the reference position;

a second rotation uneven part processing punch for forming rotation uneven parts each on the surface of one of the first ends of the first annular core member and on the surface of one of the fourth ends of the second annular core member, the first end and the fourth end being at the position rotated by the predetermined angle from the reference position; and a third rotation uneven part processing punch for forming rotation uneven parts on the surfaces of the other first ends of the first annular core member, and on the surfaces of the other fourth ends of the second annular core member, the first ends and the fourth ends being at the circumference positions other than the reference position, and the position rotated by the predetermined angle from the reference position, and a rotary lamination apparatus for laminating the first annular core member and the second annular core member while rotating the first annular core member or the second annular core member B by the predetermined angle such that one of the first ends in the circumferential direction of the first annular core member, the first end having no rotation uneven part processed, is positionally identical in the laminating direction with one of the fourth ends in the circumferential direction of the second annular core member, the fourth end having no rotation uneven part processed.

Effect of the Invention

According to the method and the apparatus for manufacturing an iron core of the present invention, an iron core, which is formed by rotatably connecting respectively adjoining split cores via their rotation uneven parts and by arranging the split cores annularly, is formed through rotary lamination of the annular core members, and thus it is possible to reduce torque ripple which is caused by shape asymmetry such as level difference in the inner circumference shape of split cores, and by difference in the magnetic resistance of split cores.

BRIEF DESCRIPTION OF THE DRAWINGS

FIG. 33 is a plan view illustrating the kinds of annular core members manufactured by an iron-core manufacturing apparatus according to an embodiment of the present invention.

FIG. 34 is a diagram showing steps of processing annular core members by using the iron-core manufacturing apparatus of an embodiment of the present invention.

BEST MODE FOR CARRYING OUT THE INVENTION

Embodiment 1

Figure 1:
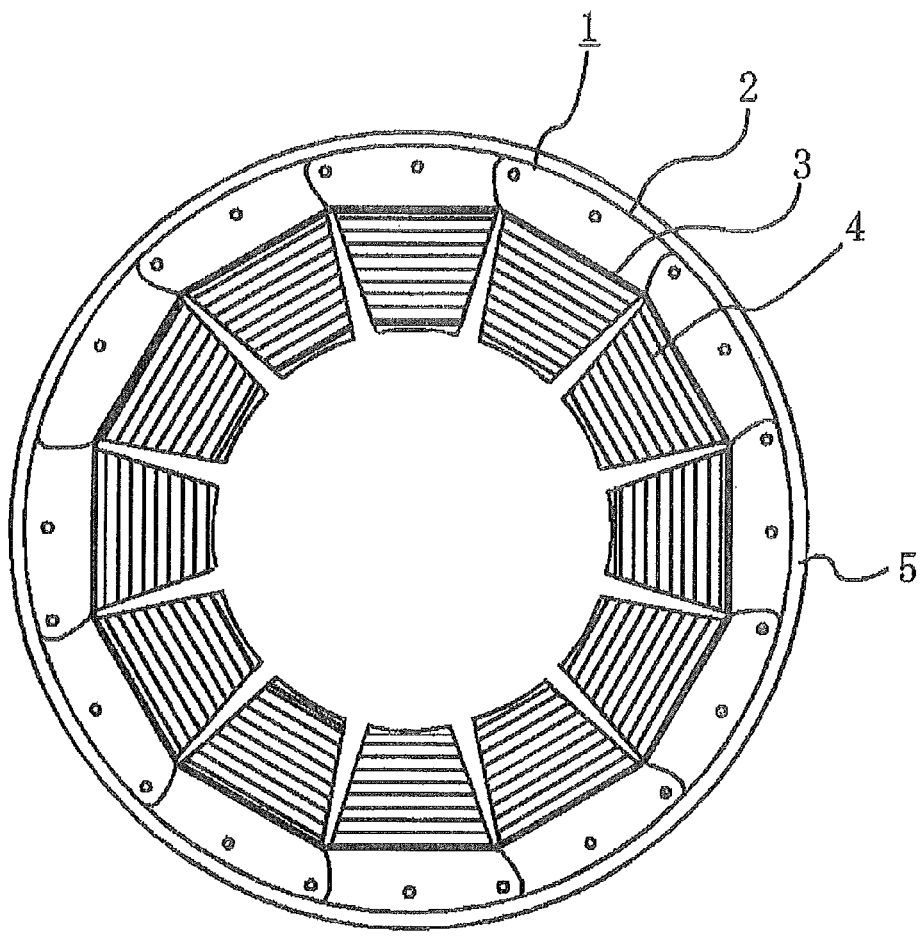
FIG. 1 is a plan view of a stator of a rotary electric machine according to an embodiment of the present invention.

FIG. 1 is a plan view of a stator of a rotary electric machine according to an embodiment of the present invention. In FIG. 1, the stator of the rotary electric machine includes a stator iron core 1 formed by annularly arranging a plurality of split cores 2 each including a yoke part and a tooth part projecting from the yoke part inwardly in the radial direction of a stator, winding frames 3 which are each provided to the tooth part of each split core 2 and made of insulating resin, coils 4 wound around the tooth parts of the split cores 2 via the winding frames 3, and a frame 5 fixed to the outer side of the stator iron core 1. The split cores 2 are each formed by laminating magnetic plate material such as a steel plate in the axial direction of the stator, as described later. It is noted that FIG. 1 illustrates the stator iron core 1 including twelve split cores 2, as an example, but the number of the split cores 2 are not limited thereto.

Figure 2:
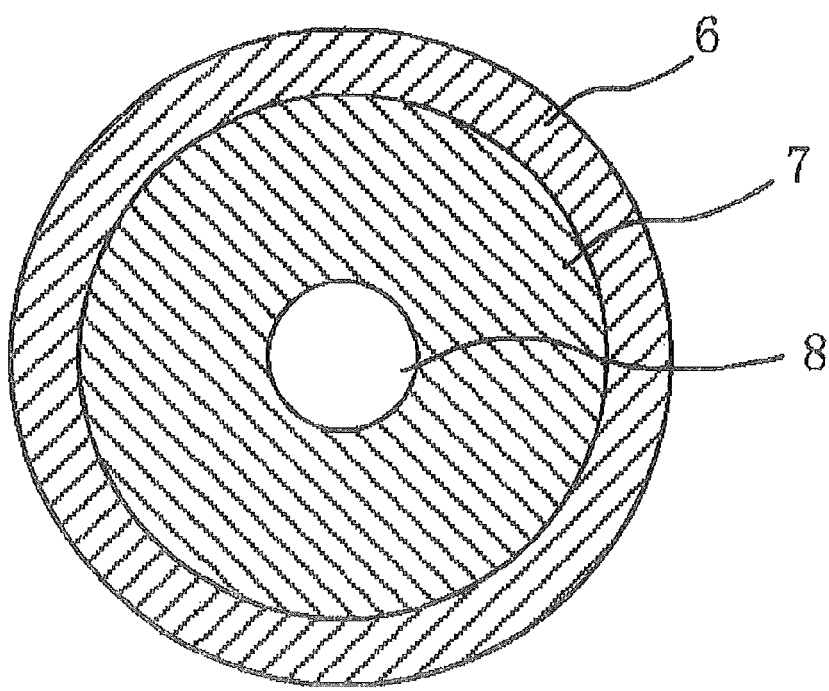
FIG. 2 is a cross-sectional view of a magnet-included rotor provided to the rotary electric machine according to an embodiment of the present invention.

FIG. 2 is a cross-sectional view of a magnet-included rotor provided to the rotary electric machine according to an embodiment of the present invention. In FIG. 2, the rotor of the rotary electric machine includes a rotor core 7, a ring-shaped magnet 6 arranged outside the rotor core 7, and a shaft 8 which is arranged at the center of the rotor core 7 and is a revolving shaft of the rotor. In the ring-shaped magnet 6, N poles and S poles (not shown) are formed, in the circumferential direction, alternately at predetermined intervals. The rotor core 7 is formed by laminating magnetic plate material such as a steel plate in the same manner as the stator iron core 1. The rotor in FIG. 2 is assembled inside the stator in FIG. 1, whereby the rotary electric machine is formed.

Figure 3:
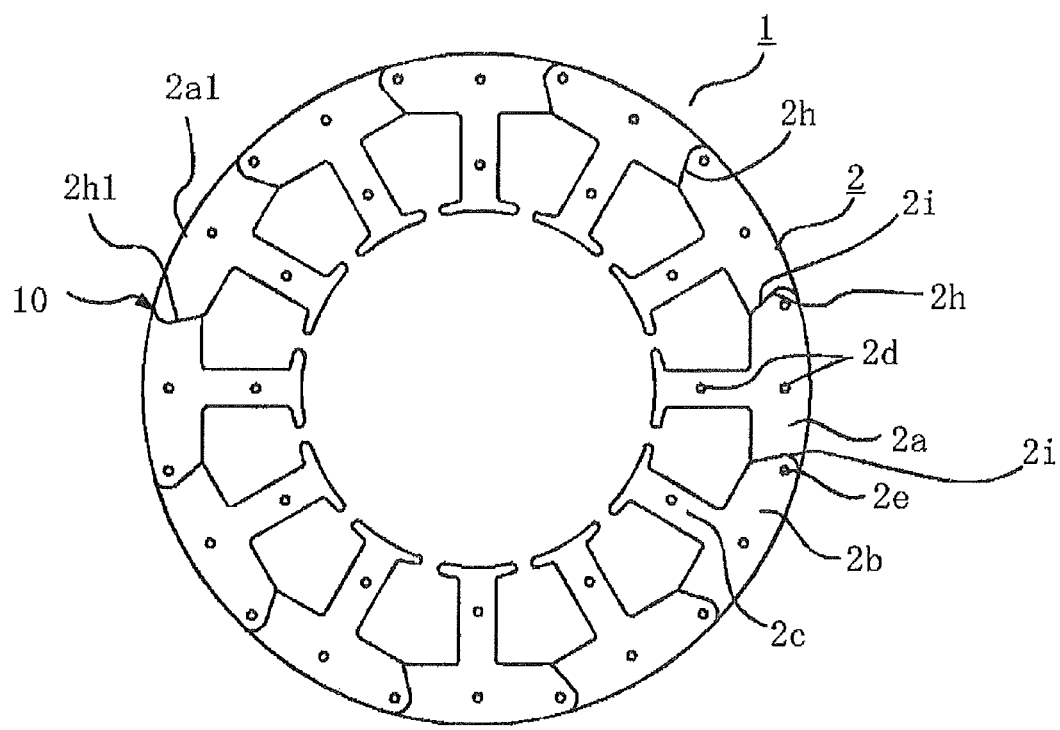
FIG. 3 is a plan view of an iron core forming the stator according to an embodiment of the present invention.
Figure 4:
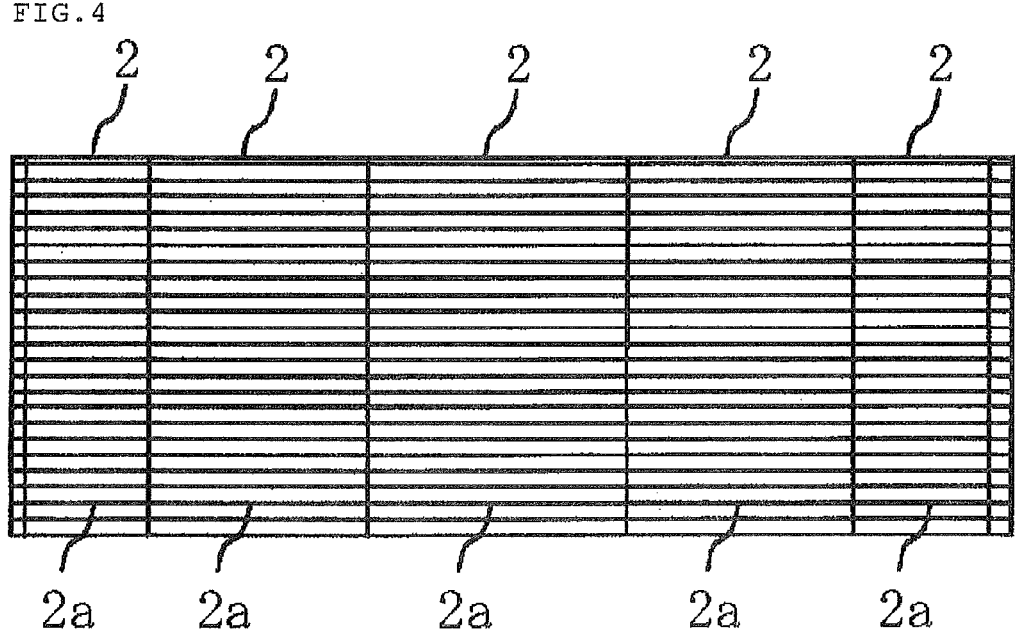
FIG. 4 is a side view of the iron core forming the stator according to an embodiment of the present invention.

FIG. 3 and FIG. 4 are, respectively, a plan view and a side view of the iron core included in the stator. As shown in FIG. 3 and FIG. 4, the split cores 2 are each formed by laminating a plurality of split core pieces 2a made of magnetic plate material. Each split core piece 2a includes a yoke part 2b and a tooth part 2c which projects from the yoke part 2b inwardly in the radial direction. In addition, the shape of a first end 2h in a first circumferential direction (counterclockwise direction in FIG. 3) of the yoke part 2b of each split core piece 2a is different from the shape of a second end 2i in a second circumferential direction (clockwise direction in FIG. 3) of the yoke part 2b. For example, a convex shape part, which is a first shape part, is formed at the first end 2h of the yoke part 2b of each split core piece 2a, and a concave shape part, which is a second shape part, is formed at the second end 2i. With respect to the split core pieces 2a adjoining each other in the circumferential direction, the first shape part (e.g., convex shape part) at the first end 2h of one split core piece 2a is arranged in contact with the second shape part (e.g., concave shape part) at the second end 2i of its adjoining split core piece 2a.

On the central portion of a surface of each split core piece 2a, for example, two uneven parts 2d (which are referred to as uneven parts since they are each a concave part for one surface, and are a convex part for the other surface) are formed for crimping. A plurality of split core pieces 2a are laminated, and the laminated split core pieces 2a are mutually fixed at the crimping uneven parts 2d, whereby a split core 2 is formed. In addition, of the plurality of split cores 2 arranged annularly, except a first end 2h1 of a predetermined split core 2a1, the first ends 2h of the other split core pieces 2a each have a rotation uneven part 2e formed on the surface of the first shape part (e.g., convex shape part), the rotation uneven part 2e having the same configuration as the above-mentioned uneven parts 2d. On the surface of the first shape part (e.g., convex shape part) at the first end 2h1 of the predetermined split core 2a1, no rotation uneven part 2e is formed.

In the present embodiment, at the contact part of each two of the split cores 2 adjoining each other in the circumferential direction, the first shape parts (e.g., convex shape parts) at the first ends 2h of the respective split core piece 2a are arranged so as to be overlaid with each other in the laminating direction. The rotation uneven parts 2e are formed at the overlaid portions in the laminating direction, and crimping of the rotation uneven parts 2e allows connection of the overlaid portions of split core pieces 2a adjoining each other in the laminating direction. Split cores 2 adjoining each other in the circumferential direction are configured to be mutually rotatable about the corresponding rotation uneven part 2e. It is noted that there is no uneven part 2e formed at the first end 2h1 of the predetermined split core piece 2a1, and in addition, there is no uneven part 2e formed in the first shape part (e.g., convex shape part) at a fourth end of a split core piece 2a overlaid with the predetermined split core piece 2a1 in the laminating direction, as described later. Thus, the split core 2 having the first end 2h1, and the split core 2 adjoining the same in the circumferential direction can be separated from each other at the position of an opening portion 10 in FIG. 3.

Figure 5:
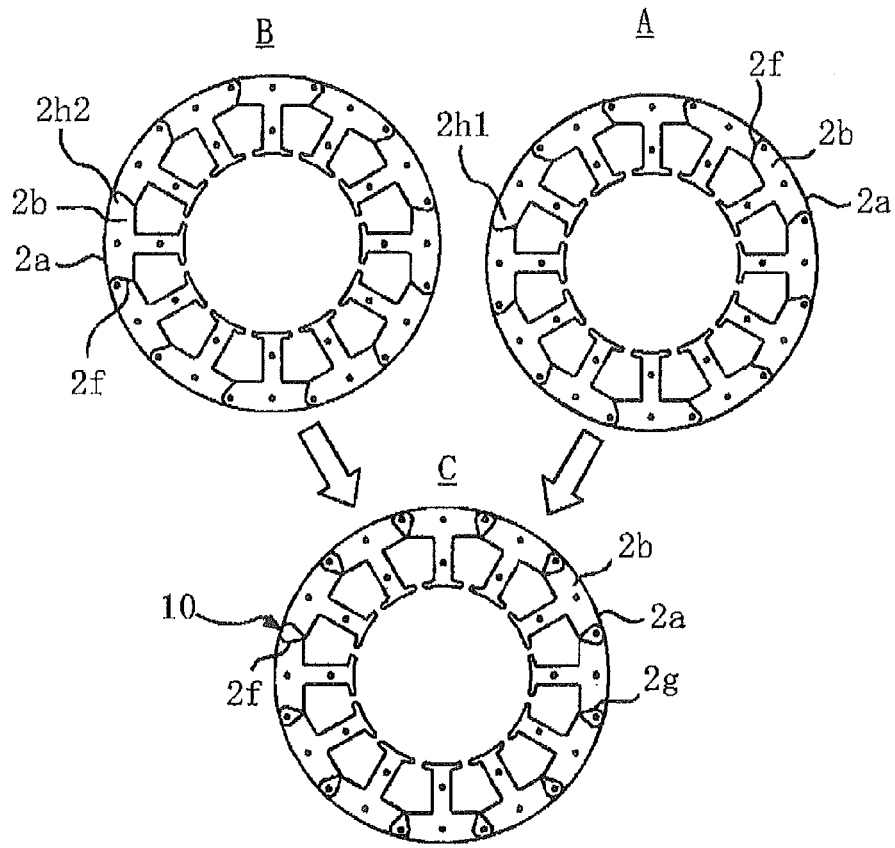
FIG. 5 is a plan view simply illustrating a step of manufacturing the iron core according to an embodiment of the present invention.

FIG. 5 is a plan view simply illustrating a step of manufacturing an iron core formed of split cores. FIG. 5 is also a plan view illustrating a first annular core member A, a second annular core member B, and an iron core C which is formed by laminating the first and second annular core members A and B. The first and second annular core members A and B are each manufactured from an electromagnetic steel plate or a thin steel plate such as an SPCE (hereinafter referred to as magnetic plate material) by annularly press-stamping the magnetic plate material. The first and second annular core members A and B are each divided into split core pieces 2a at their cuts, which are referred to as cut lines 2f. The stator iron core C is formed by laminating the first annular core member A and the second annular core member B.

In the first annular core member A, the yoke 2b of each split core piece 2a has the first end, in the first circumferential direction (counterclockwise direction), which forms the first shape part (e.g., convex shape part), and has a second end, in the second circumferential direction (clockwise direction), which forms the second shape part (e.g., concave shape part). On the other hand, in the second annular core member B, the yoke 2b of each split core piece 2a has a third end, in the first circumferential direction (counterclockwise direction), which forms the second shape part (e.g., concave shape part), and has the fourth end, in the second circumferential direction (clockwise direction), which forms the first shape part (e.g., convex shape part). When the first and second annular core members A and B are laminated, portions (hereinafter referred to as "overlaid portions") 2g are formed where the first shape parts (e.g., convex shape parts) of the split core pieces 2a are overlaid with one another in the laminating direction.

On the central portion of a surface of the split core piece 2a in each of the first and second annular core member A and B, for example, two uneven parts 2d are formed for crimping. The split core pieces 2a adjoining each other in the laminating direction are fixed at their crimping uneven parts 2d. In addition, on the surface of the first shape part (e.g., convex shape part) at the first end of the yoke 2b of each split core piece 2a in the first annular core member A, the rotation uneven part 2e is formed. In addition, on the surface of the first shape part (e.g., convex shape part) at the fourth end of the yoke 2b of each split core piece 2a in the second annular core member B, the rotation uneven part 2e is formed. Here, in the first end 2h1 of a predetermined split core piece 2a in the first annular core member A, no rotation uneven part 2e is formed. In addition, in the fourth end 2h2 of a predetermined split core piece 2a in the second annular core member B, no uneven part 2e is formed. The first end 2h1 of the predetermined split core piece 2a in the first annular core member A and the fourth end 2h2 of the predetermined split core piece 2a in the second annular core member B are arranged in a manner as to be mutually overlaid with each other in the laminating direction, and split cores 2 adjoining each other in the circumferential direction can be separated from each other at the overlaid portion. Such a separable portion is referred to as the opening portion 10.

Figure 6:
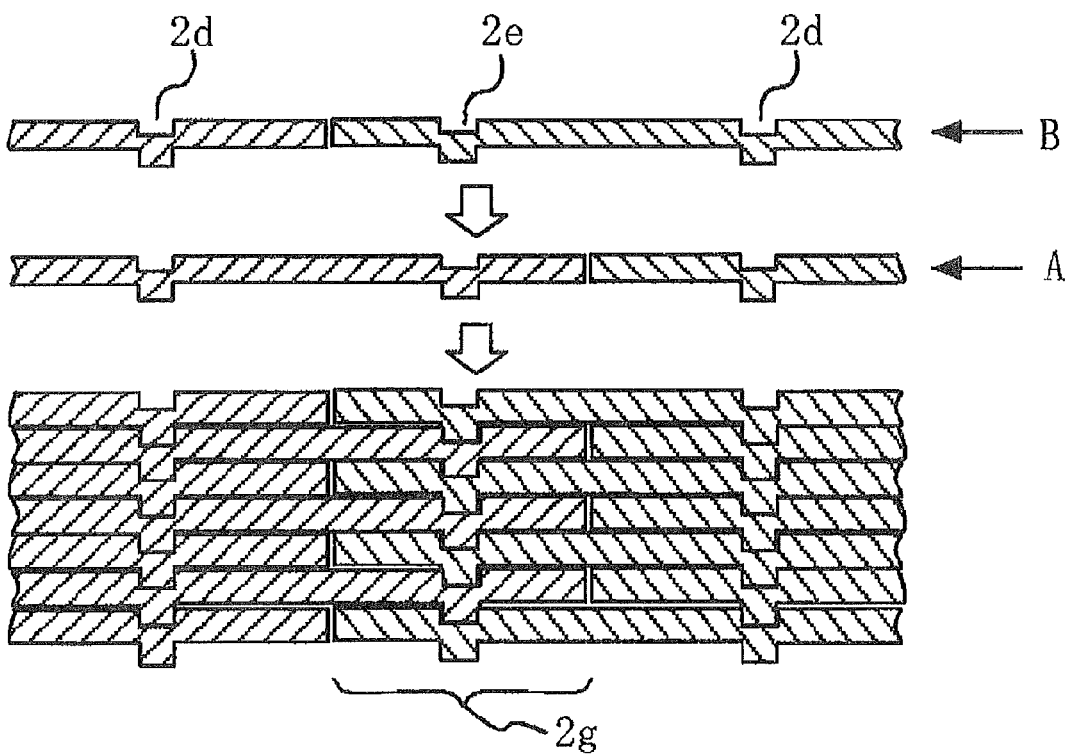
FIG. 6 is a cross-sectional view of the iron core according to an embodiment of the present invention.

FIG. 6 is a cross-sectional view of the laminated first and second annular core members A and B as cut along a circumference line passing through the uneven parts 2d and the uneven part 2e. As shown in FIG. 6, and as described with reference to FIG. 3 to FIG. 5, when the first annular core member A and the second annular core member B are laminated, the first shape parts (e.g., convex shape parts) of split core pieces 2a adjoining each other in the laminating direction are overlaid with each other at the overlaid portions 2g. At the center, in the circumferential direction, of each overlaid portion 2g, a cylindrical uneven part 2e is formed by plastic working, i.e., press working. The uneven parts 2e are fitted together while having small clearances (about 5 μm) arranged between split core pieces 2a adjoining each other in the laminating direction, and thus, the split cores 2 adjoining each other in the circumferential direction are mutually rotatable about the uneven parts 2e. Moreover, each split core 2 includes the crimping uneven part 2d used for lamination fixing, and the respective split cores 2 are crimped at the crimping uneven parts 2d in the laminating direction. Accordingly, the split cores 2 can be fixed as a layered product.

Figure 7:
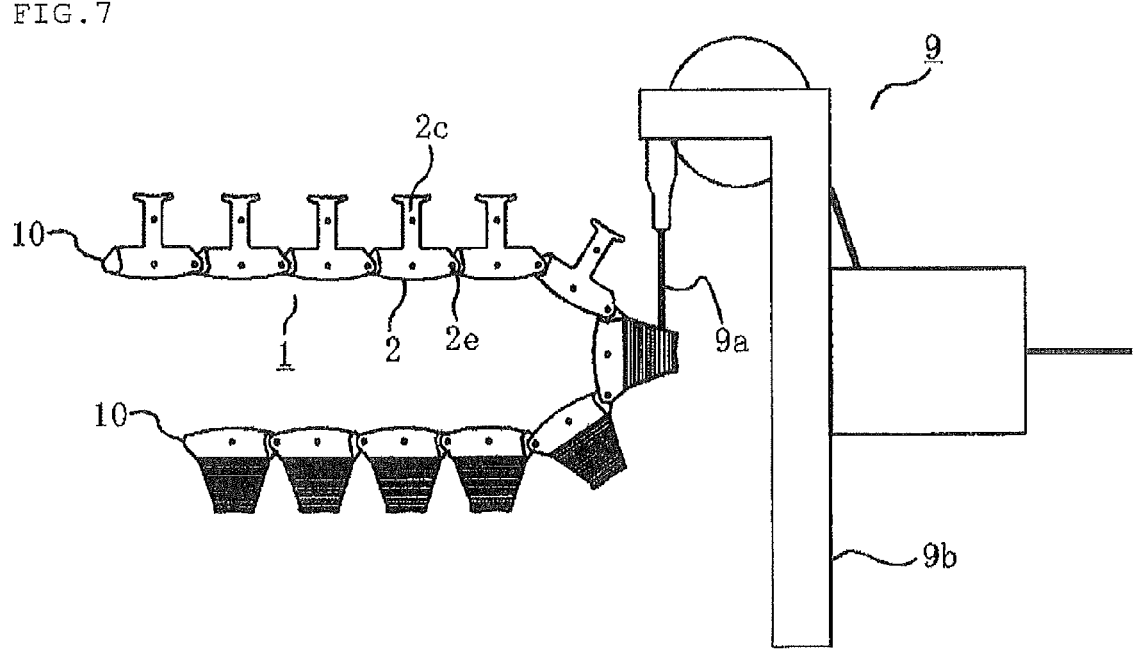
FIG. 7 is a plan view illustrating wire winding around the iron core according to an embodiment of the present invention.

FIG. 7 is a plan view illustrating a method of winding a wire around the iron core. In FIG. 7, the iron core 1 (C in FIG. 5) formed annularly by laminating the first and second annular core members A and B is separated at the opening portion 10, and is set to a wire winding machine 9. By rotating a head 9b of the wire winding machine 9, a wire 9a, which is to be a coil, is wound around the tooth part 2c of each split core 2. As shown in FIG. 7, respectively adjoining split cores 2 are connected to one another so as to be mutually rotatable about the rotation uneven parts 2e, and thus at the time of wire winding for coils, the angle between two adjoining tooth parts 2c can be expanded. That is, by arranging the tooth parts 2c of split cores 2 so as to face outwardly, it is possible to secure a sufficient space for supplying the wire 9a. As a result, by utilizing the sufficient space, it is possible to wind the wire around each tooth part 2c without interference with the adjoining split cores 2 while the straightness of the wire 9a supplied from the wire winding machine 9 is maintained. Accordingly, each tooth part 2c can be wound around by the wire with the wire being neatly aligned, and thus a stator having a high coil space factor can be obtained. In addition, since a sufficient space is secured for winding, the winding operation draws an annular orbit which allows high-speed movement, and thus high productivity can be obtained.

As described above, in the iron core formed of split cores, the tooth part of each split core can be equipped with a high-density coil, and thus a motor which uses split cores each equipped with the high-density coils can improve its output per unit volume. However, the iron core formed of the split cores may cause machining errors more frequently than integrated-type iron cores, and even a minor machining error will cause a change in magnetic energy, resulting in a problem that cogging torque, known as torque ripple, will be increased. The cogging torque is suppressible to a very small value at the designing stage, but the value comes to an unignorable value since machining errors are actually included during manufacture. To minimize the machining errors as close to zero as possible, a sophisticated manufacturing process is required, which is costly and unrealistic. Thus, it is industrially useful to provide a method and an apparatus for manufacturing the iron core formed of split cores, which can simply and effectively reduce the cogging torque.

Therefore, in the present invention, firstly, such an element of the cogging torque that is caused by errors in the inner circumference shape of a stator, the element accounting for a large proportion of the cogging torque, is analyzed, and a manufacturing method which enables overlaying and offset of the effects of the errors in the inner circumference shape is proposed. The cogging torque is caused by various factors such as asymmetry of the magnetic property of a stator or a rotor, and the combination between the number of slots and the number of poles (slot combination). Among them, examples of the elements of stator asymmetry include, in addition to the error in the inner circumference shape, asymmetry between an inner circumference shape and an outer circumference shape of a stator, uneven stress distribution due to welding or fixing to a frame, magnetic asymmetry of a stator caused by magnetic anisotropy. When these elements change in the circumferential direction of a stator, permeance, which is a reciprocal of magnetic resistance, will be imbalanced, and the magnetic energy generated in an air gap between tooth parts of the stator and the rotor changes in the circumferential direction, and consequently cogging torque occurs. A change in torque due to the stator asymmetry is accompanied by rotation of the rotor, and the torque ripples at the same cycle as the number of poles p of the magnet in the rotor. When the frequency of the N pole and S pole created by the magnet in the rotor is defined as a frequency f, the number of poles p is 2f, and in the present invention, the element having the same cycle as the number of poles p (=2f) is referred to as a cogging torque 2f element. The cogging torque 2f element can be represented by a vector on a polar coordinate system, where the magnetic pole cycle of the rotor is set as one cycle, and is referred to as a torque vector in this case.

The vector representation of the cogging torque 2f element which is caused by errors in the inner circumference shape of a stator will be derived. Here, in order to extract effects of the inner circumference shape errors only, it will be assumed that, of the elements of the stator asymmetry elements other than the inner circumference shape, there is no error in the outer circumference shape of the rotor and in the magnetomotive force. Torque $T(\theta)$ in the case where the rotor is at a rotation angle θ is obtained from the following Equation (1) by integrating torque $dT(\theta, \phi)$ applied to a minute section dø at the position of an angle ø, in the circumferential direction, on the rotor.

[Equation 1]

$$dT(\theta, \phi) = \frac{k \cdot \mu_0}{2} \cdot \{F(\phi)\}^2 \cdot A(\phi, \theta) \qquad (1)$$

$$T(\theta) = \int_0^{2\pi} \frac{k \cdot \mu_0}{2} \cdot \{F(\phi)\}^2 \cdot A(\phi, \theta) \, d\phi$$

Figure 8:
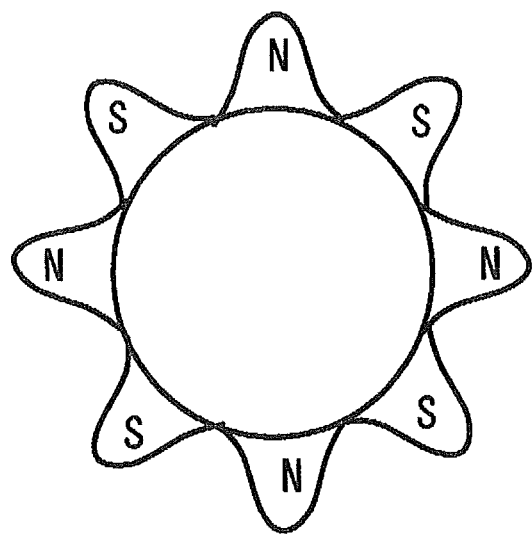
FIG. 8 is a diagram illustrating a distributed magnetomotive-force model of the rotor.

Here, $\mu_0$ is permeability in vacuum, k is a value obtained by dividing an air gap volume of the minute angle dø by dø. F(ø) represents magnetomotive force of the rotor, and its square derives a distribution of p cycles in φ direction on the rotor, as shown in FIG. 8. A(ø, θ) is an element constituting the square of permeance, and is defined by Equation (2) below by using an air gap g(ø, θ) at the position of the angle φ when the rotor is at the rotation angle θ.

[Equation 2]

$$A(\phi, \theta) = \frac{\partial}{\partial \theta}\{1/g(\phi, \theta)\}^2 \qquad (2)$$

The magnetic resistance of the iron core is ignored since it is significantly smaller than the magnetic resistance of the air gap. The air gap $g(\emptyset, \theta)$ is a variable including errors of the inner circumference shape of the stator, and thus, $A(\emptyset, \theta)$ will be a variable representing a change, in the circumferential direction, in the error of the inner circumference shape of the stator.

Figure 9:
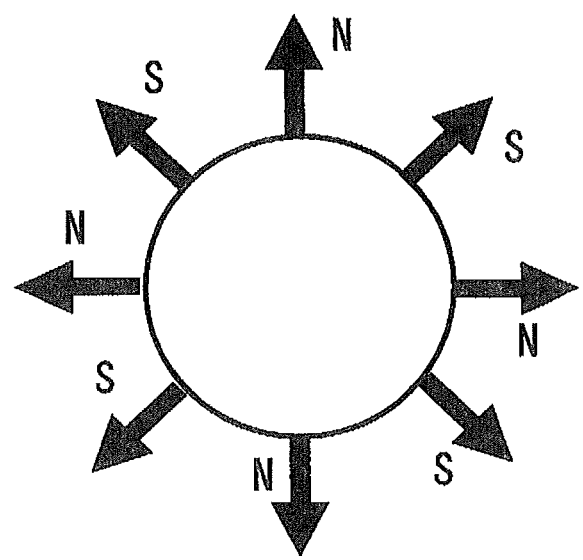
FIG. 9 is a diagram illustrating a concentrated magnetomotive-force model of the rotor.

$\{F(\emptyset)\}^2$, the square of the magnetomotive force of the rotor is distributed in a sine wave shape or in a rectangular wave shape. However, for simplification, concentrated magnetomotive-force model in which the magnetomotive force is concentrated at even pitches from the position of $\emptyset=0$, as shown in FIG. 9, will be considered herein. The pitch angle is $2\pi/p$, and the magnetomotive force is expressed by Equations (3) and (4) below.

[Equation 3]

$$\{F(\phi)\}^2 = F^2 \text{ (In case of } \phi = 2\pi(n-1)/p) \qquad (3)$$

[Equation 4]

$$\{F(\phi)\}^2 = 0 \text{ (In case of } \phi \neq 2\pi(n-1)/p) \qquad (4)$$

n is an integer from 1 to p. In the concentrated magnetomotive-force model, it will be assumed that, as the effect of the magnetomotive force on the stator, magnetic fluxes are generated only at positions in the stator opposing the magnetomotive force, and no effect is applied onto their neighboring areas. In this case, the torque $T(\theta)$ shown in Equation (1) is the sum of partial torques occurring at p concentrated magnetomotive force positions. When the rotor is rotated, the positions of the stator opposing the p concentrated magnetomotive force positions move, and in accordance with the change in the inner circumference shape, the torque changes. Here, as described above, $A(\emptyset, \theta)$ is a function representing the change of errors in the inner circumference shape of the stator in the circumferential direction. Thus, when the inner circumference shape of the stator is divided equally in the circumferential direction into p sections, and the function $A(\emptyset, \theta)$ of the inner circumference shape of the nth section is set as $A_n(\theta)$, a partial torque $T_n(\theta)$ occurring at the nth magnetomotive force position is expressed by Equation (5) below.

[Equation 5]

$$T_n(\theta) = \frac{k\mu_0 F^2}{2} A_n(\theta) \qquad (5)$$

By summing p partial torques, $T(\theta)$ is expressed by Equation (6) below.

[Equation 6]

$$T(\theta) = \frac{k\mu_0 F^2}{2} \sum_{n=1}^{p} A_n(\theta) \qquad (6)$$

When the rotor is rotated by an angle of $2\pi/p$ from 0, the concentrated magnetomotive force at each of the sections n=1 to p rotates from its starting point to end point. The values of the p magnetomotive forces are identical with one another, and thus when the rotor is further rotated by the angle of $2\pi/p$, the same torque waveforms occur repeatedly at the respective sections of the stator. Therefore, $T(\theta)$ repeats the same waveform for each pitch angle, and creates waveforms of p cycles per rotation of the rotor. Through Fourier series deployment of $T(\theta)$, the p-cycle element is obtained as a vector $T(T_x, T_y)$ from Equations (7) and (8) below.

[Equation 7]

$$\begin{aligned} T_x &= \frac{1}{\pi}\int_0^{2\pi} T(\theta)\cos(p\theta)d\theta \\ &= \frac{k\mu_0 F^2}{2\pi}\int_0^{2\pi/p}\left\{\sum_{n=1}^{p} A_n(\theta)\right\}\cos(p\theta)d\theta \end{aligned} \qquad (7)$$

[Equation 8]

$$\begin{aligned} T_y &= \frac{1}{\pi}\int_0^{2\pi} T(\theta)\sin(p\theta)d\theta \\ &= \frac{k\mu_0 F^2}{2\pi}\int_0^{2\pi/p}\left\{\sum_{n=1}^{p} A_n(\theta)\right\}\sin(p\theta)d\theta \end{aligned} \qquad (8)$$

Here, a curve obtained by dividing the torque curve $T(\theta)$ by $k\mu_0 F^2/2\pi$ is represented as $A_0(\theta)$, and a vector obtained by dividing the vector $T(T_x, T_y)$ by $k\mu_0 F^2/2\pi$ is represented as $Y(Y_x, Y_y)$, and these are additionally defined by using Equations (9), (10), and (11) below.

[Equation 9]

$$A_0(\theta) = \sum_{n=1}^{p} A_n(\theta) \qquad (9)$$

[Equation 10]

$$Y_x = \int_0^{2\pi/p}\left\{\sum_{n=1}^{p} A_n(\theta)\right\}\cos(p\theta)d\theta \qquad (10)$$

[Equation 11]

$$Y_y = \int_0^{2\pi/p}\left\{\sum_{n=1}^{p} A_n(\theta)\right\}\sin(p\theta)d\theta \qquad (11)$$

The curve $A_0(\Theta)$ and the vector $Y(Y_x, Y_y)$ can be calculated regardless of material characteristics, and thus can be employed to relative evaluation of cogging torque, which is caused by variation in manufacture, in products of the same material and of the same dimensions, like those produced in a factory.

Figure 10:
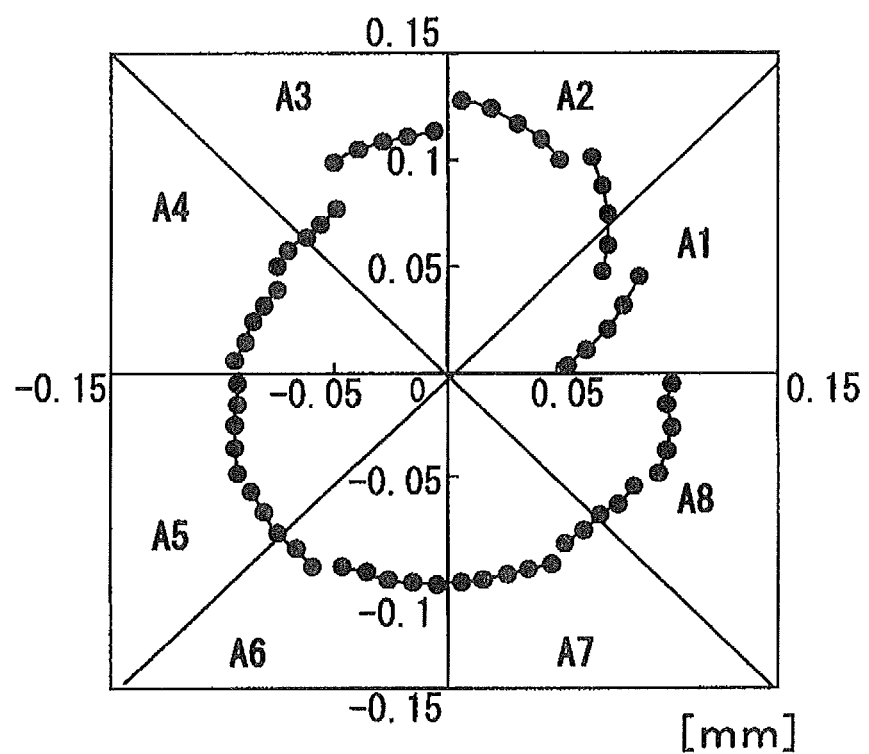
FIG. 10 is a diagram illustrating the distribution of the inner circumference of the stator.
Figure 11:
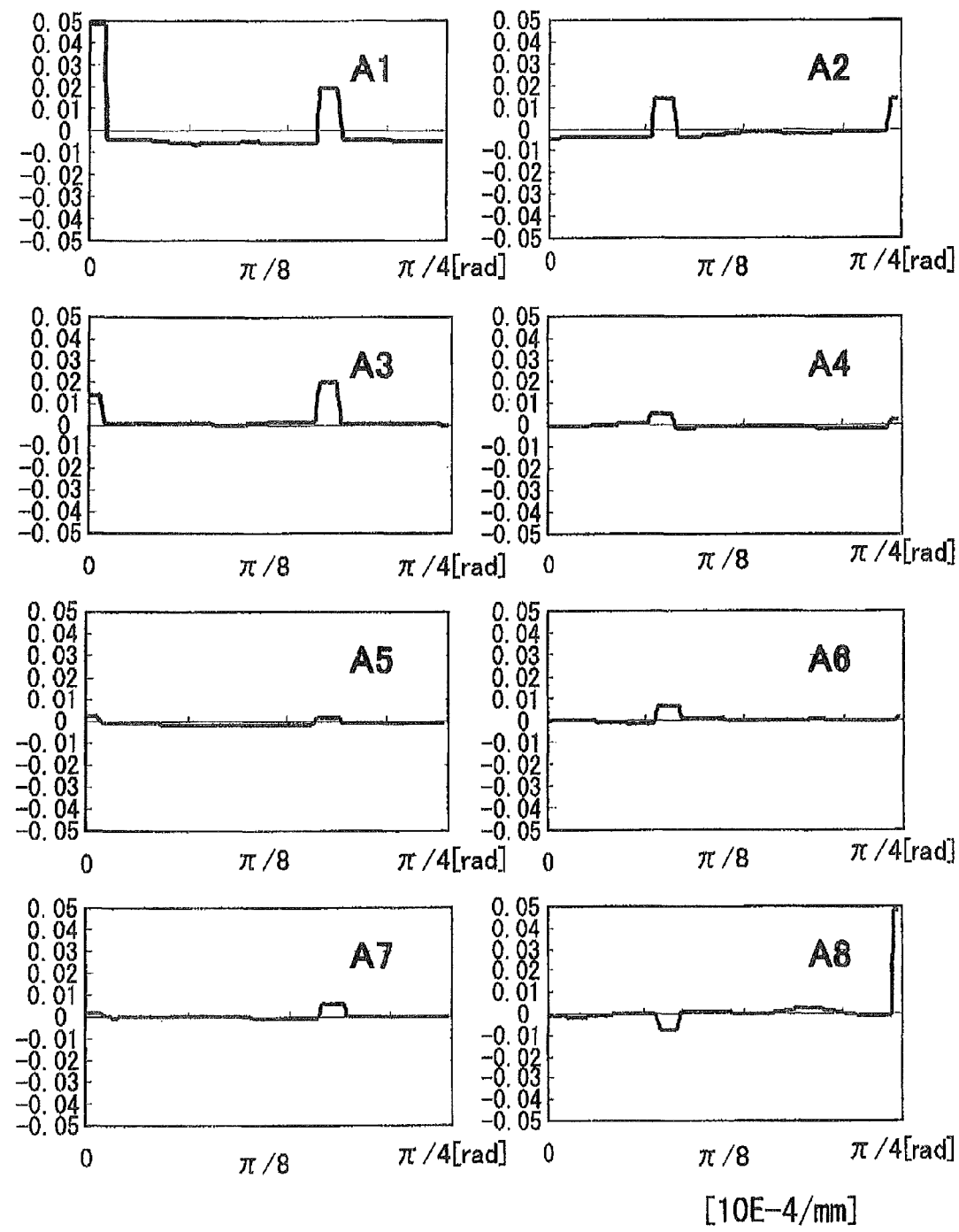
FIG. 11 is a diagram illustrating calculation results of $A_n$ ($\theta$).
Figure 12:
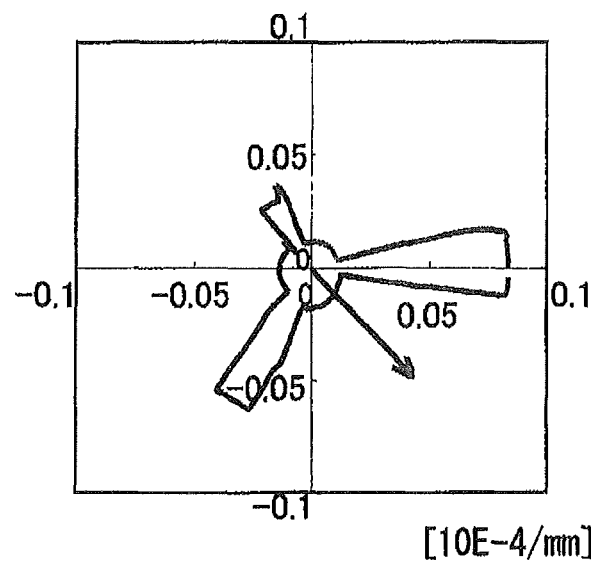
FIG. 12 is a diagram illustrating a curve $A_0$ ($\theta$) and a vector Y.

As an example of vector representation, the cogging torque of a stator, having level difference in its inner, circumference shape, relative to a rotor of p=8 is illustrated in the drawing. With regard to the inner circumference shape shown in FIG. 10, $A_n(\theta)$ (n=1 to 8) is obtained from Equation (2) in a range of $0<\theta<2\pi/p$, and the results are shown in FIG. 11. From Equation (9), the scalar sum of $A_n(\theta)$ is obtained for each position of $\theta$, and $A_0(\theta)$ is obtained. The results are displayed in polar coordinates in FIG. 12, where a pitch angle $2\pi/p$ is set as one cycle. Further, the vector Y obtained from Equations (10) and (11) is superposed on the curve $A_0(\theta)$ and displayed. According to the polar coordinates display in this manner, it is understood, from Equations (10) and (11), that the sum of vectors from the coordinate center to the respective points on the curve $A_0(\theta)$ represents the vector Y. In addition, it is understood from Equation (9) that $A_0(\theta)$ corresponds to superposition of $A_n(\theta)$ (n=1 to 8). That is, from FIG. 11 and FIG. 12, causal relations between the vector Y and errors in respective portions of the inner circumference shape can be obtained. Meanwhile, according to the concentrated magnetomotive-force model, $A_n(\theta)$ is calculated by using only the value of the inner circumference shape at the position of $\theta$, and thus, the area causing the cogging torque 2f element can be specified. Accordingly, the effect of the shape error, and particularly the effect of level difference of the inner circumference of the split cores are clarified.

The magnitude of the vector Y is a value which is obtained by ignoring distribution of magnetomotive force, and effects of the magnetomotive force on the areas neighboring the opposing positions in the stator. Thus, the value does not represent the absolute value of the cogging torque 2f element resulting from the inner circumference shape, but is an index applicable to the relative evaluation of stators having a common shape, or to specification of a problem part in the inner circumference shape, which is used in various scenes such as production or development of motors.

As a method for minimizing the vector Y, the following methods can be considered: a method for minimizing errors by improving the shape accuracy of the inner circumference shape; and a method of overlaying errors thereby to offset vectors.

Figure 13:
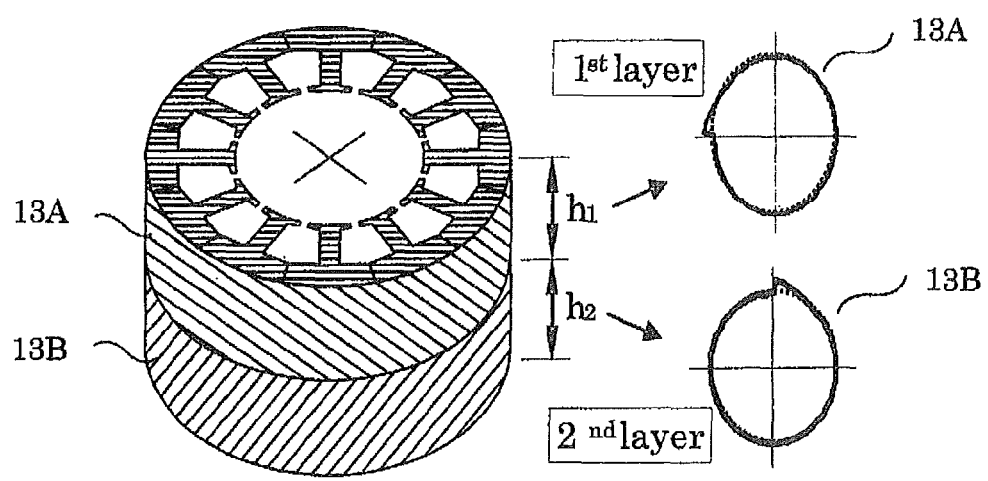
FIG. 13 is a diagram illustrating a model of an iron core structure formed by rotary lamination.

The present invention employs the latter method, and a method of reducing the cogging torque 2f element by combining a plurality of vectors Y will be described. Particularly, a method of assembling iron cores having a common error in the inner circumference shape by changing the phases of the iron cores will be considered. For example, a steel plate forming an iron core is divided in the laminating direction into a first layer and a second layer. By rotating the second layer, for example, an iron core having a single inner circumference shape and having vectors Y whose orientations are different from each other is formed. Here, a method of partially rotating an iron core and then laminating the iron core is referred to as rotary lamination. FIG. 13 illustrates a conceptual model of an iron core structure made by the rotary lamination. The iron core is divided in the laminating direction into two portions 13A and 13B having heights $h_1$ and $h_2$, respectively. The two portions are laminated while the phases thereof are displaced in the circumferential direction from each other. Both the first layer 13A and the second layer 13B are manufactured by stamping with a single metallic mold, and thus have a common error in the inner circumference shape. For example, the inner circumference shapes of the first layer 13A and the second layer 13B, the inner circumference shapes each having one level difference, are schematically shown on the right-hand side in FIG. 13. Since the level differences are substantially identical in shape, the vectors Y are equal in magnitude to each other. The lamination heights $h_1$ and $h_2$ of the first layer 13A and the second layer 13B are set equal to each other, and the rotation angles are set such that the vectors Y are opposite to each other, whereby the sum of the vectors Y can be minimized. Described herein is a model of a case where the iron core is made of two divided layers. However, the number of divisions in the laminating direction (corresponding to the number of vectors Y), the ratio of lamination heights (corresponding to the magnitude of the respective vectors Y), and the rotation angles (corresponding to the phase of the respective vectors Y) can be set arbitrarily.

Here, the angles of slots forming the iron core need be set equal to each other, which adds constraint to rotation angle setting. If the number of slots is s, based on the condition for adjusting the position of slots, a possible rotation angle $\alpha t$ of an iron core is obtained from Equation (12) below using an integer t.

[Equation 12]
$$\alpha_t = \frac{2\pi}{s} t \quad (0 \le t \le s - 1) \tag{12}$$

If the rotation angle $\alpha t$ is converted to $\alpha t'$ on polar coordinates where the magnetic pole angle is set as one cycle, $\alpha t'$ is expressed by Equation (13) below.

[Equation 13]
$$\alpha'_t = \frac{2\pi}{s} tp \quad (0 \le t \le s - 1) \tag{13}$$

From the condition of Equation (13), a combination which can minimize the vector Y may be selected. For example, in the case of a motor of 8 poles and 12 slots and a motor of 10 poles and 12 slots, the possible rotation angles (represented with the magnetic pole angles) of the iron cores are expressed by Equations (14) and (15) below.

[Equation 14]
$$\alpha'_{t(p=8)} = \frac{4\pi}{3} t \quad (0 \le t \le 11) \tag{14}$$

[Equation 15]
$$\alpha'_{t(p=10)} = \frac{5\pi}{3} t \quad (0 \le t \le 11) \tag{15}$$

Figure 14:
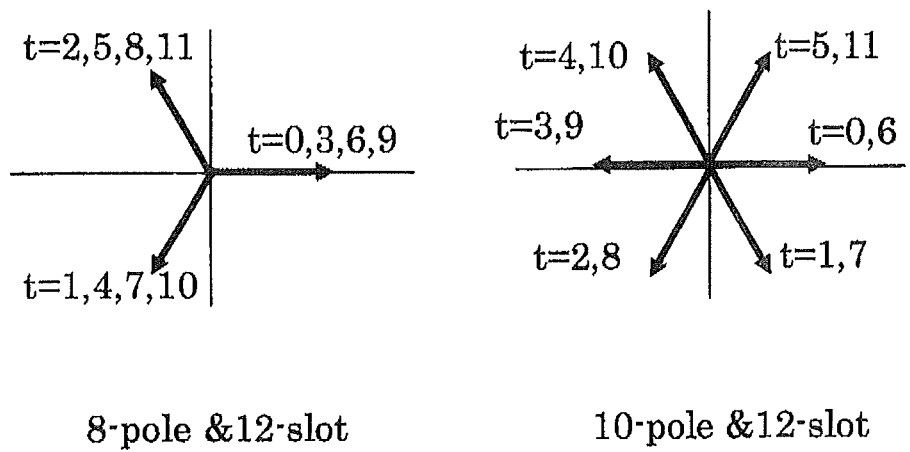
FIG. 14 is a diagram illustrating conditions for rotation angle setting based on the slot angle of the iron core.

Orientations of the vectors of the 8-pole, 12-slot motor, and 10-pole, 12-slot motor are shown in FIG. 14. From Equations (14) and (15), or from the phases shown in FIG. 14, angles cancelling torque vectors are selected, whereby the degree of rotation angle of the rotary lamination can be obtained.

For example, effects of the rotary lamination in the case of a slot combination of 10 poles and 12 slots will be verified. Here, the laminating direction is divided into four, and as rotation angles of the rotary lamination, cases of t=0, 3, 6, 9 are selected from FIG. 14. From Equation (12), rotation angles for the above cases are 0, $\pi/2$, $\pi$, and $3\pi/2$. For comparison, the following 4 samples were verified.

Figure 15:
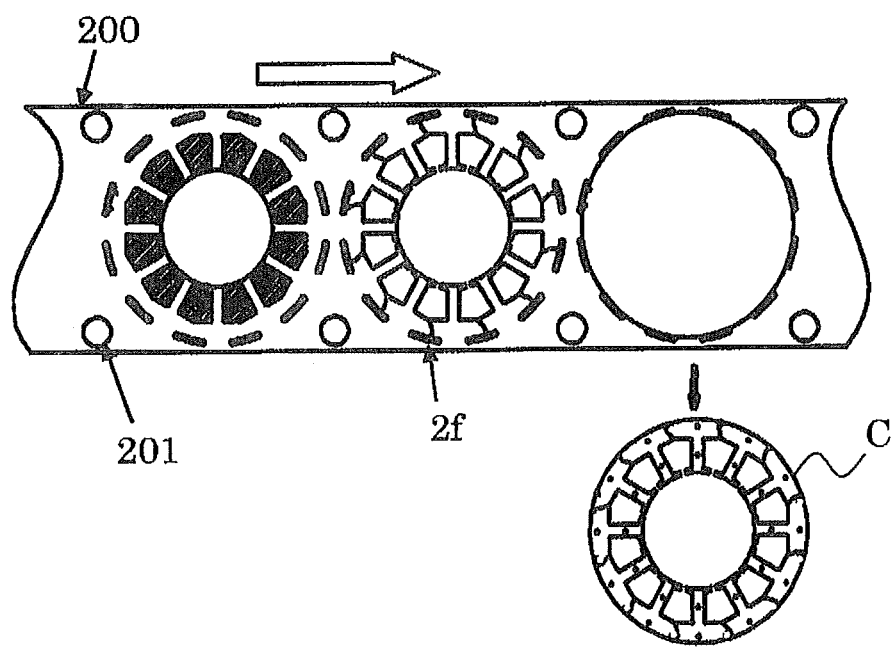
FIG. 15 is a diagram illustrating a step of manufacturing the iron core by metallic mold processing of an automatic pitch feed type.
Figures 16, 17:
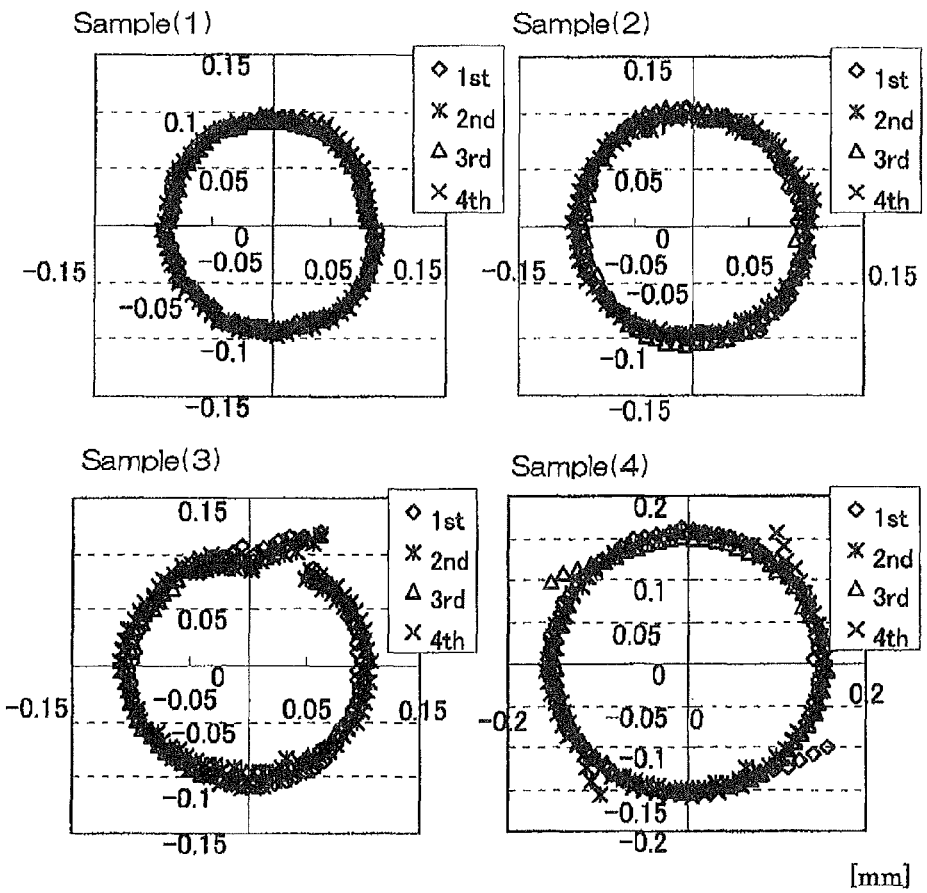
FIG. 16 is a diagram illustrating the measuring result of the inner circumference shape of iron core samples.
FIG. 17 is a diagram showing the measurement result of the magnitude of the vector Y and cogging torque 2$f$ element of the respective sample iron cores.

(1) Without level difference, without rotary lamination
(2) Without level difference, with rotary lamination
(3) With level difference, without rotary lamination
(4) With level difference, with rotary lamination The experimental samples were manufactured by metallic mold processing of an automatic pitch feed type as shown in FIG. 15. In FIG. 15, a magnetic plate material 200 such as a steel plate was automatically fed in the arrow direction, while pilot holes 201 were set as the positioning reference, and cut lines 2f were made by press working, whereby the magnetic plate material 200 was divided into respective magnetic pole teeth. The magnetic plate materials 200 were stamped out along the circular-shaped outlines, and were laminated to form an iron core C. The iron core C obtained by lamination is separable at the cut lines so as to be equipped with coils. After wire winding, the iron core C was made into an annular shape again, and a frame was fixed to the outer circumference by press fitting. As to the samples (3) and (4), level differences were formed by additional wire cutting of the inner circumference surfaces. As to the samples (2) and (4), each of the iron cores was formed of four layers equally divided in the laminating direction, and the layers were rotated by predetermined angles and fixed together. Errors in the respective inner circumference shapes after processing were measured, and the results are shown in FIG. 16 and are indicated by positions from the respective reference circle. Data of the respective four layers were measured and displayed in an overlaid manner. The maximum level differences of the samples (3) and (4) are 29.4 mm and 31.4 mm, respectively, which are considered to be substantially equal to each other. Meanwhile, the maximum level differences of the samples (1) and (2) are 6.9 mm and 5.4 mm, respectively, which are significantly small compared to the maximum level differences of the samples (3) and (4). That is, shapes suitable for comparison were obtained.

Figure 18:
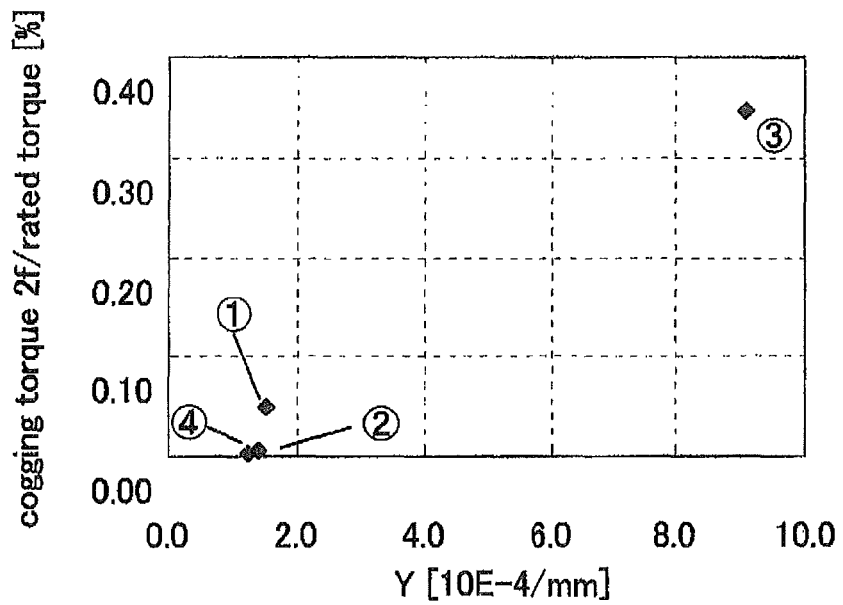
FIG. 18 is a diagram illustrating the relation between the magnitude of the vector Y and the magnitude of the cogging torque 2$f$ element of each sample iron core.

The magnitude of the vector Y and the cogging torque $2f$ element were measured with respect to each of the samples, and the results are shown in FIG. 17. The cogging torque $2f$ element is represented as a ratio thereof to rated torque. In addition, the relation between the magnitude of the vector Y and the magnitude of the cogging torque $2f$ element of each of the samples (1) to (4) is shown in FIG. 18. The cogging torque $2f$ element of the sample (3) indicates a value greater than those of other three samples. The samples (2) and (4), which were subjected to rotary lamination, are significantly different in their level differences, but their cogging torque $2f$ elements are close to each other and indicate small values.

Figure 19:
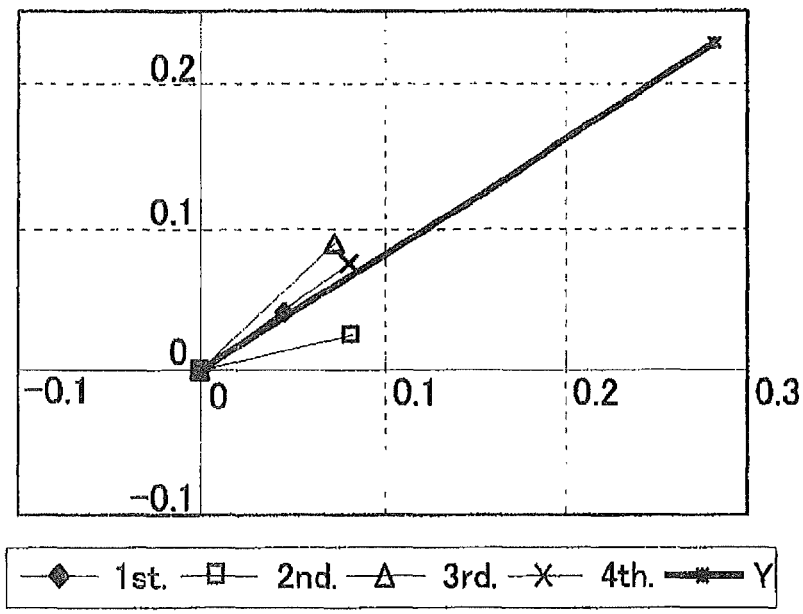
FIG. 19 is a diagram illustrating vectors Y of respective layers included in the iron core of the sample (3) and the combined vector.
Figure 20:
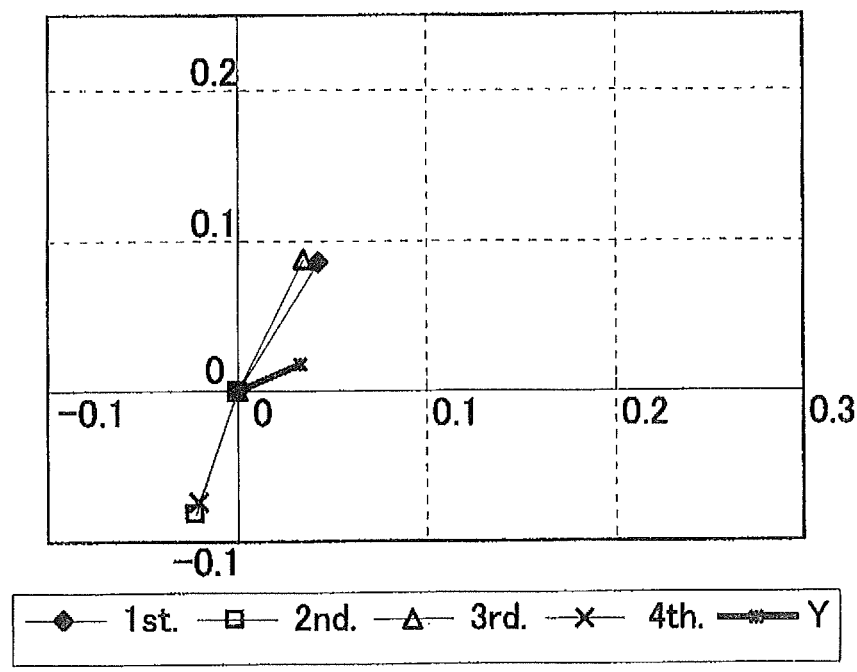
FIG. 20 is a diagram illustrating vectors Y of respective layers included in the iron core of the sample (4) and the combined vector.

The vector Y was calculated as a vector sum of vectors Y of the respective four layers. With respect to the samples (3) and (4), the vectors Y of the respective layers, and the combined vectors are shown in FIG. 19 and FIG. 20. In the sample (3), the level differences of the respective layers are aligned with each other, and thus, as shown in FIG. 19, the vectors Y of the respective layers have substantially the same magnitude and are oriented in substantially the same direction, and accordingly, the magnitude of the combined vector is significantly large since the vectors of the respective layers are reinforced mutually. In proportion to the magnitude of the vector Y, the cogging torque $2f$ element indicates a large value.

On the other hand, in the sample (4), as shown in FIG. 20, the magnitude of the vectors Y of the respective layers are substantially the same, but are oriented in reverse directions. Thus, the respective vectors are weakened mutually, and the combined vector indicates a small value. In proportion to the magnitude of the vector Y, the cogging torque $2f$ element indicates a small value. From the comparison between the samples (3) and (4), it is understood that even if the level differences have a substantially identical shape, the cogging torque $2f$ element can be reduced by offsetting the vectors Y through rotary lamination.

The iron cores constituting these samples were manufactured by stamping circular shapes, which are arranged in line in a sheet of magnetic plate material, from the plate material. Therefore, an angle between the rolling direction of the magnetic plate material and the directions of the magnetic pole teeth (the radial directions of the stator) varies depending on the magnetic pole teeth. The rolling direction of the magnetic plate material coincides with the direction in which a magnetic flux is likely to pass through. Thus, the magnetic resistance varies depending on the magnetic pole teeth, and this is called magnetic anisotropy. The magnetic anisotropy is, as described above, a kind of asymmetry of the magnetic property of a stator, and is a cause of the cogging torque $2f$ element. Since the level difference of each of the sample (1) and sample (2) is small, the magnitude of the vector Y resulted in a small value. However, the cogging torque $2f$ element of the sample (1) is larger by about 0.04 points, in terms of the ratio relative to the rated torque, than that of the sample (2). This is considered to be because in the sample (1), there was the effect of the magnetic anisotropy, whereas in the sample (2), the effect of the magnetic anisotropy was offset by the rotary lamination. The magnitude of the vector Y of the sample (1) and that of the sample (2) are substantially equal to each other, which means that the value of the vector Y is determined based on the effect of the shape errors only. It is true that the value of the vector Y is not affected by the magnetic anisotropy.

That is, with the rotary lamination, not only the effect of errors in the inner circumference shape, but also the effect of the magnetic anisotropy can be offset. Both effects are reduced as the reduction effects of the cogging torque $2f$ element in the sample (4) as compared to the sample (3). Specifically, when the reduction effects in the samples (1) and (2) are taken into consideration, reduction by 86.6% was achieved as an improvement by the offset of inner circumference shape errors; and reduction by 12.5% was achieved as an improvement by the offset of the magnetic anisotropy.

As described above, the rotary lamination method is a manufacturing method which is capable of minimizing the cogging torque $2f$ element in a split iron core structure which allows high-density winding. According to the rotary lamination method, iron cores having a common shape error are assembled, and thus even if the magnitude and phase of torque vectors are unknown, the torque vectors can be offset mutually. This exerts the following advantages in terms of manufacturing of iron cores each formed of split cores.

(1) It is not necessary, in iron core production, to measure variation in the inner circumference shape so as to adjust the variation depending on the measuring result.

(2) In the case of production using a plurality of metallic molds, it is not necessary to adjust errors of the metallic molds.

(3) It is not necessary to adjust the variation depending on temporal changes in the inner circumference shape errors which are caused by metallic mold abrasion or difference in material lots.

In addition, it is possible to adjust the magnitude and phase of a combined vector by changing the rotation angles of rotary lamination and the ratio of the lamination heights. Accordingly, by obtaining the vector sum between the combined vector and the torque vectors caused by other elements than the inner circumference shape errors, among the asymmetry properties of a stator, it is possible to reduce the cogging torque $2f$ element while other elements than the inner circumference shape errors are taken into consideration.

Next, a method and an apparatus for manufacturing an iron core by employing the rotary lamination method according to an embodiment of the present invention will be described in detail. Here, as highly useful rotary electric machines which have a high torque feature and are suitable for miniaturization, there are a rotary electric machine having 8 rotor poles and 12 stator slots and a rotary electric machine having 10 rotor poles and 12 stator slots, both of which pursue torque ripple reduction. For example, as to the rotary electric machine having 8 rotor poles and 12 stator slots, in the case where the stator iron core is formed of three layered products having a common lamination thickness, when the rotation angles of the respective layered products are obtained based on the above-described method, the rotation angles of layered products relative to the remaining one layered product are $\pi/6$ and $\pi/3$. Whereas, as to the rotary electric machine having 10 rotor poles and 12 stator slots, in the case where the stator iron core is formed of two layered products having a common lamination thickness, when the rotation angles between the layered products are obtained based on the above-described method, the rotation angle of one layered product relative to the other layered product is π/2. In the description below, the rotary electric machine having a slot combination of 10 rotor poles and 12 stator slots is used as an example, and a case will be described where the rotary lamination is performed such that the rotation angle of one layered product relative to the other layered product is π/2. It is noted that the number of rotor poles, the number of stator slots, the height of layered products, the number of layered products, the rotation angle for rotary lamination are not limited to this example, but any values that satisfy the above method and conditions can be applicable.

Figure 21:
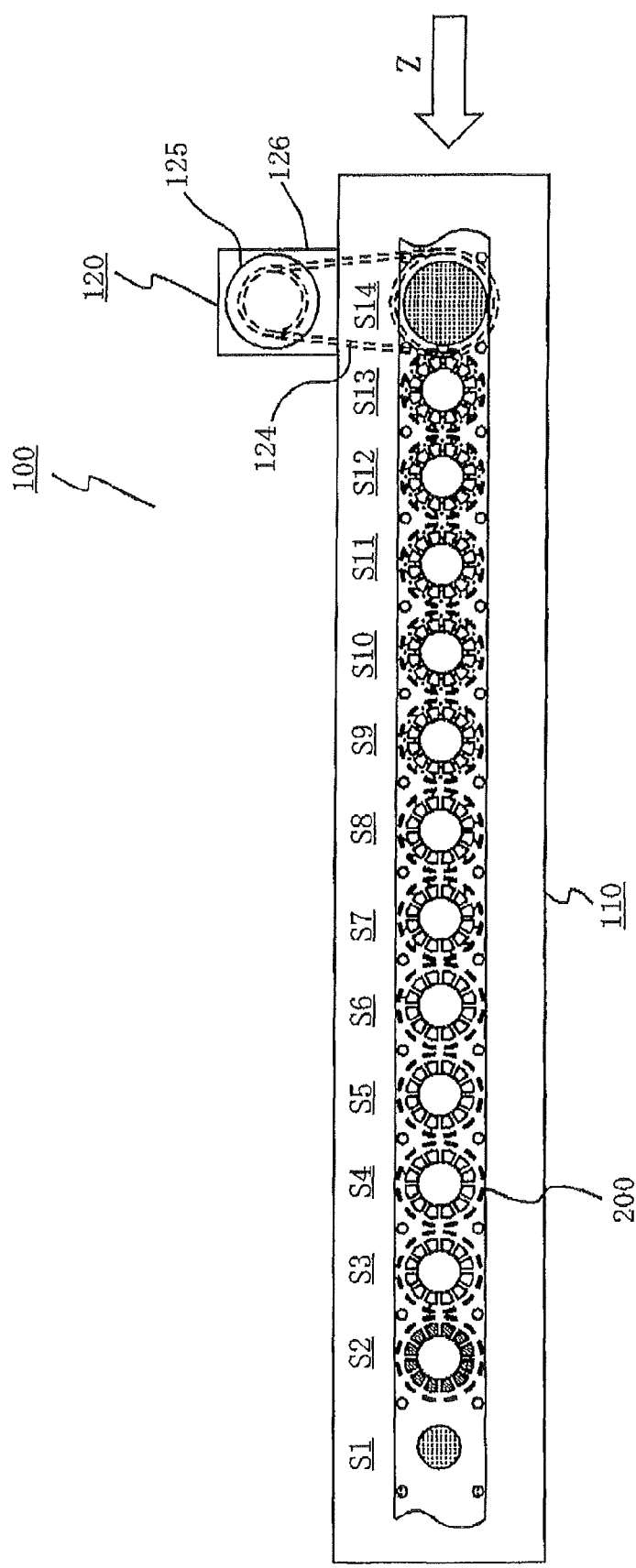
FIG. 21 is a plan view illustrating an outline of an iron-core manufacturing apparatus according to an embodiment of the present invention.
Figure 22:
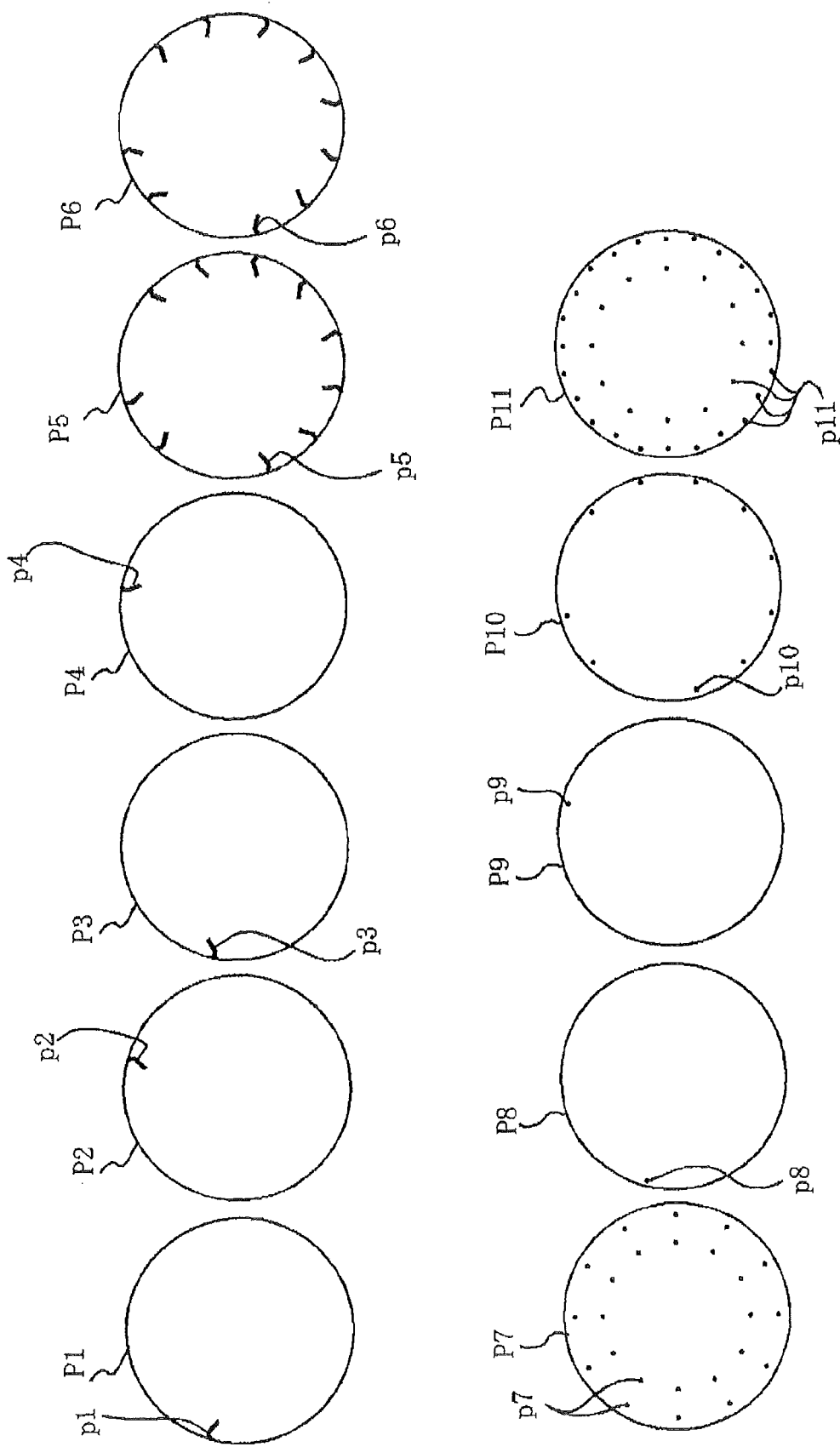
FIG. 22 is a bottom view of punches used in a metallic mold stage of an embodiment of the present invention.

FIG. 21 is a plan view illustrating an outline of an iron-core manufacturing apparatus according to an embodiment of the present invention. An iron-core manufacturing apparatus 100 of the present embodiment includes: a metallic mold stage 110 on which press working of a magnetic plate material 200 such as a steel plate is performed; and a rotary lamination apparatus 120 for rotary lamination of annular core members stamped out from the magnetic plate material 200. The metallic mold stage 110 includes a plurality of stages, and in this example, includes stage S1 to stage S14. In FIG. 21, punches used in the respective stages S1 to S14 are omitted, and the respective punches are illustrated in FIG. 22 in detail. In addition, cross-sectional views of the rotary lamination apparatus 120 as viewed from an arrow Z direction in FIG. 21 are shown in FIG. 29 to FIG. 32. The structure and operation of the apparatus 120 will be described later in detail.

FIG. 22 is a bottom view of punches used for the stages in the metallic mold stage 110. A punch P1 is used in stage S3, and has a cutting portion p1 for making a cut line for separating yoke parts, of each annular core member, at a reference position (0-degree position) in the outer circumference of the annular core member. A punch P2 is used in stage S4, and has a cutting portion p2 for making a cut line for separating yoke parts, of each annular core member, at the position rotated by a predetermined angle from the reference position (the position rotated clockwise by 90 degrees from the reference position in this example). A punch P3 is used in stage S5, and has a cutting portion p3 for making a cut line for separating yoke parts, of each annular core member, at the reference position. A punch P4 is used in stage S6, and has a cutting portion p4 for making a cut line for separating yoke parts, of each annular core member, at the position rotated by the predetermined angle from the reference position (the position rotated clockwise by 90 degrees from the reference position in this example).

A punch P5 is used in stage S7, and has cutting portions p5 for making cut lines for separating yoke parts, of each annular core member, at positions (10 positions, in this example), in the outer circumference, other than the reference position (0-degree position) and the position rotated by the predetermined angle from the reference position (the position rotated clockwise by 90 degrees from the reference position, in this example). In addition, a punch P6 is used in stage S8, and has cutting portions p6 for making cut lines for separating yoke parts, of each annular core member, at positions (10 positions in this example), in the outer circumference, other than the reference position (0-degree position) and the position rotated by the predetermined angle from the reference position (the position rotated clockwise by 90 degrees from the reference position, in this example).

A punch P7 is used in stage S9, and has protruding portions p7 forming crimping uneven parts 213 which are positioned at the central portions of the yoke part and the tooth part of each split core piece and which are used for lamination fixing of the annular core members. A punch P8 is used in stage S10, and has a protruding portion p8 which forms a rotation uneven part 215 on each of the annular core members, at the reference position where the first shape part (e.g., convex shape part) of the first end, in the first circumferential direction, of a yoke of one annular core member is overlaid with the first shape part (e.g., convex shape part) of the fourth end, in the second circumferential direction, of a yoke of another annular core member. A punch P9 is used in stage S11, and has a protruding portion p9 which forms a rotation uneven part 216 on each of the annular core members, at the position rotated by the predetermined angle from the reference position (in this example, the position rotated clockwise by 90 degrees from the reference position) where the first shape part (e.g., convex shape part) of the first end, in the first circumferential direction, of a yoke of one annular core member is overlaid with the first shape part (e.g., convex shape part) of the fourth end, in the second circumferential direction, of a yoke of another annular core member. A punch P10 is used in stage 12, and has protruding portions p10 (10 portions in this example) which form rotation uneven parts 217 on each of the annular core members at positions neighboring the outer circumference other than the reference position (0-degree position) and the position rotated by the predetermined angle from the reference position (in this example, the position rotated clockwise by 90 degrees from the reference position), where the first shape parts (e.g., convex shape parts) of the first ends, in the first circumferential direction, of the yokes of one annular core member are overlaid with the first shape parts (e.g., convex shape parts) of the fourth ends, in the second circumferential direction, of the yokes of another annular core member.

A punch P11 is used in stage S13. The punch P11 has protruding portions p11 which form through holes 218a at the same positions as the above crimping uneven parts 213, and form through holes 218b at the same positions as the above rotation uneven parts 215, 216, and 217, in the lowermost annular core member of a plurality of annular core members which are laminated and fixed to form an iron core. The through holes 218a in the lowermost annular core member are used for fitting with the crimping uneven parts 213 of the annular core member immediately thereabove, and the through holes 218b in the lowermost annular core member is used for fitting with the rotation uneven parts 215, 216, 217 of the upper annular core member immediately thereabove.

Figure 23:
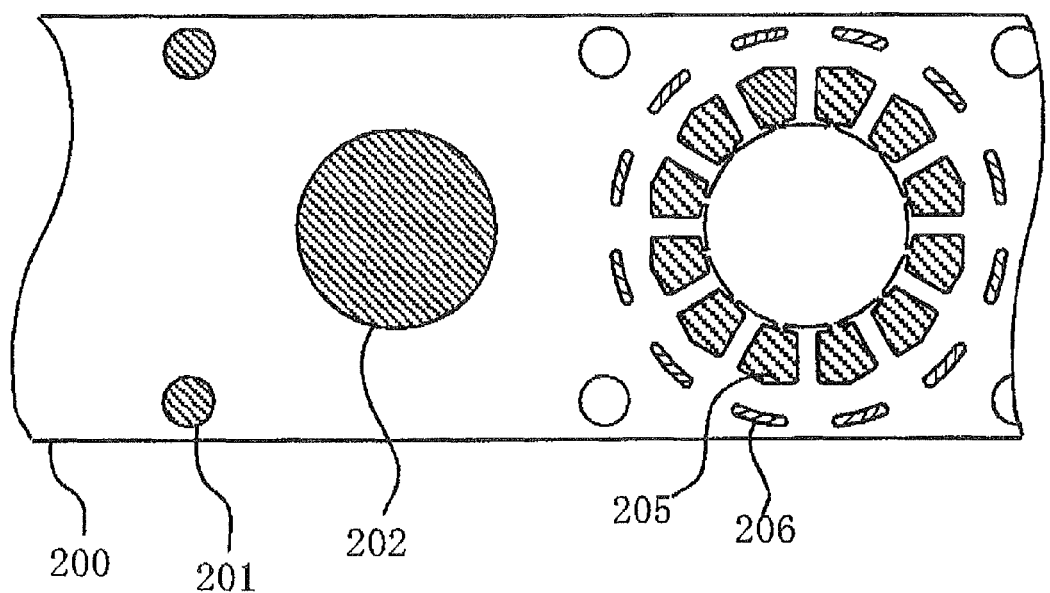
FIG. 23 is a diagram illustrating stages S1 to S2 of the metallic mold stage of an embodiment of the present invention.

FIG. 23 to FIG. 28 are diagrams illustrating the respective stages S1 to S13 of the metallic mold stage 110. FIG. 23 illustrates stages S1 and S2. In stage S1, with a punch not shown, pilot holes 201 which are used as the reference for one pitch feed of the press working are punched at positions near both ends, in the width direction, of the magnetic plate material 200. In addition, a space 202 which is to be an inner circumference of an annular core member is punched at a substantially central part, in the width direction, of the magnetic plate material 200. In stage S2, with punches not shown, slot parts 205 which are spaces between tooth parts of an annular core member, and matching holes 206 which are located at the outer circumference portion of an annular core member and which are clearance holes for the subsequent process, are punched. In FIG. 23, the portions which are punched out in respective stages S1 and S2 are drawn hatched.

Figure 24:
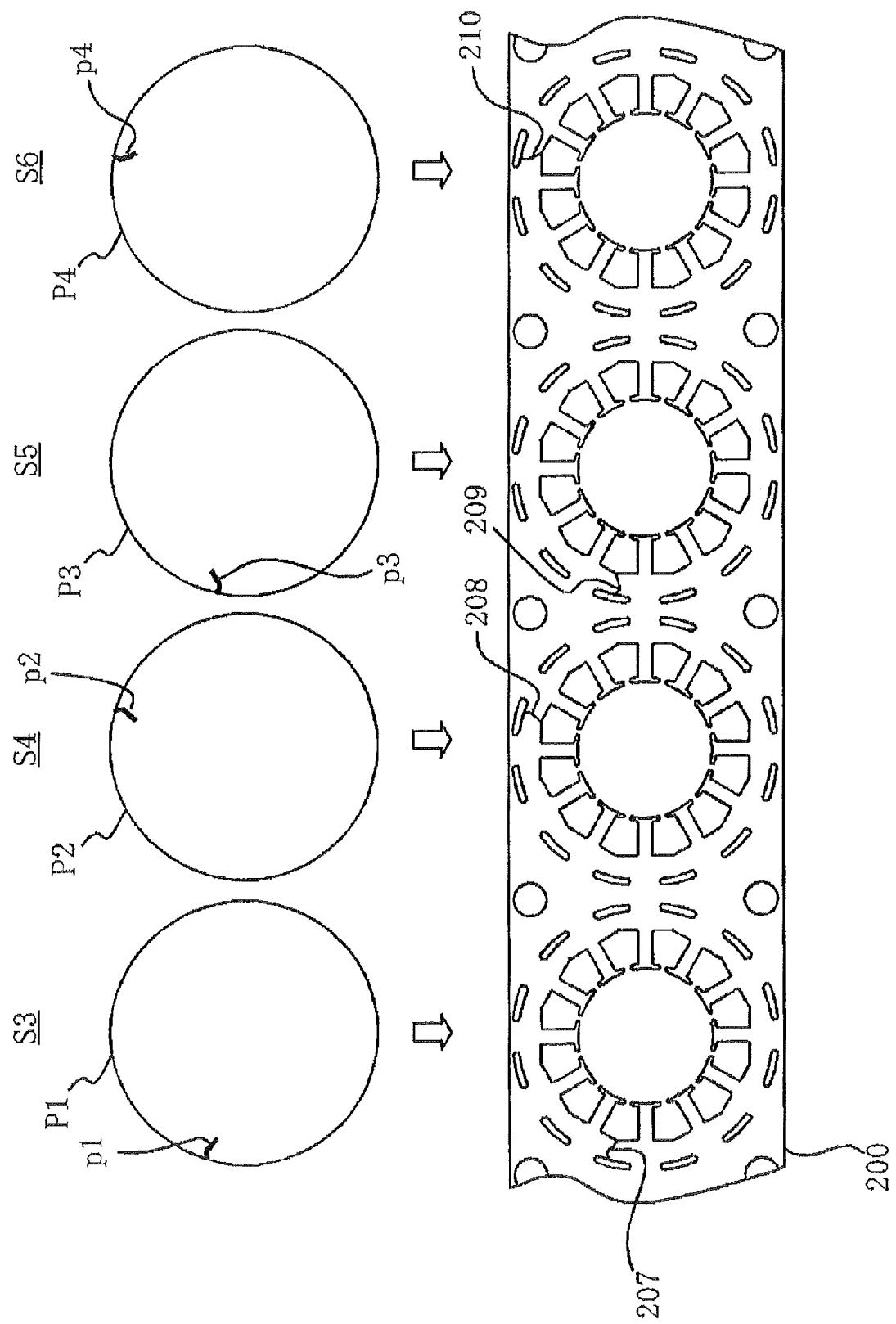
FIG. 24 is a diagram illustrating stages S3 to S6 of the metallic mold stage of an embodiment of the present invention.

FIG. 24 illustrates stages S3 to S6. In stage S3, with the punch P1 having the cutting portion p1, a cut line 207 having a convex shape in the second circumferential direction (clockwise direction) is made for separating the yoke parts, of each annular core member, at the reference position. In stage S4, with the punch P2 having the cutting portion p2, a cut line 208 having a convex shape in the second circumferential direction (clockwise direction) is made for separating the yoke parts, of each annular core member, at the position rotated by the predetermined angle from the reference position (in this example, the position rotated clockwise by 90 degrees from the reference position). In stages S3 and S4, when either of the punch P1 having the cutting portion p1 or the punch P2 having the cutting portion p2 is arranged so as to be rotatable in the circumferential direction at least between the reference position (0-degree position) and the position rotated by the predetermined angle from the reference position (the position rotated clockwise by 90 degrees from the reference position), installation of only either of the punch P1 or the punch P2 is necessary. In stage S5, with the punch P3 having the cutting portion p3, a cut line 209 having a convex shape in the first circumferential direction (counterclockwise direction) is made for separating the yoke parts, of each annular core member, at the reference position. In stage S6, with the punch P4 having the cutting portion p4, a cut line 210 having a convex shape in the first circumferential direction (counterclockwise direction) is made for separating the yoke parts, of each annular core member, at the position rotated by the predetermined angle from the reference position (in this example, the position rotated clockwise by 90 degrees from the reference position). In stages S5 and S6, when either of the punch P3 having the cutting portion p3 or the punch P4 having the cutting portion p4 is arranged so as to be rotatable in the circumferential direction at least between the reference position (0-degree position) and the position rotated by the predetermined angle from the reference position (the position rotated clockwise by 90 degrees from the reference position), installation of only either of the punch P3 or the punch P4 is necessary.

Here, as to the cut process in stage S3 using the punch P1 and the cut process in stage S5 using the punch P3, either of the processes are selected and operated. Similarly, as to the cut process in stage S4 using the punch P2 and the cut process in stage S6 using the punch P4, either of the processes are selected and operated.

Figure 25:
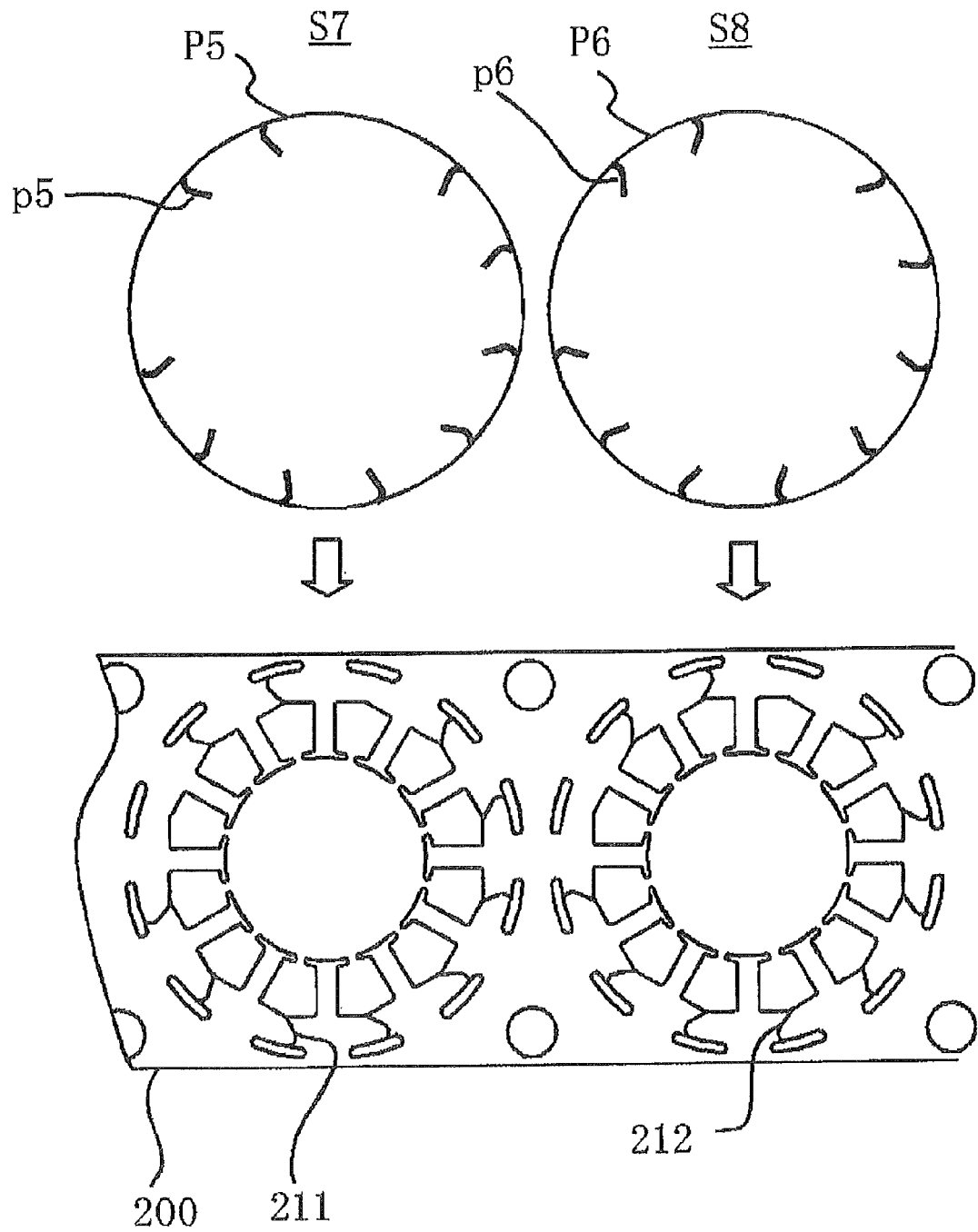
FIG. 25 is a diagram illustrating stages S7 to S8 of the metallic mold stage of an embodiment of the present invention.

FIG. 25 illustrates stages S7 and S8. In stage S7, with the punch P5 having the cutting portions p5, cut lines 211 having a convex shape in the first circumferential direction (counterclockwise direction) are made for separating the yoke parts, of each annular core member, at positions in the outer circumference (10 positions in this example) other than the reference position (0-degree position) and the position rotated by the predetermined angle from the reference position (in this example, the position rotated clockwise by 90 degrees from the reference position). In stage S8, with the punch P6 having the cutting portions p6, cut lines 212 having a convex shape in the second circumferential direction (clockwise direction) are made for separating the yoke parts, of each annular core member, at the positions in the outer circumference (10 positions in this example) other than the reference position (0-degree position) and the position rotated by the predetermined angle from the reference position (in this example, the position rotated clockwise by 90 degrees from the reference position). In FIG. 25, cut lines processed in any of stages S3 to S6 in FIG. 24 are omitted for convenience of explanation.

Figure 26:
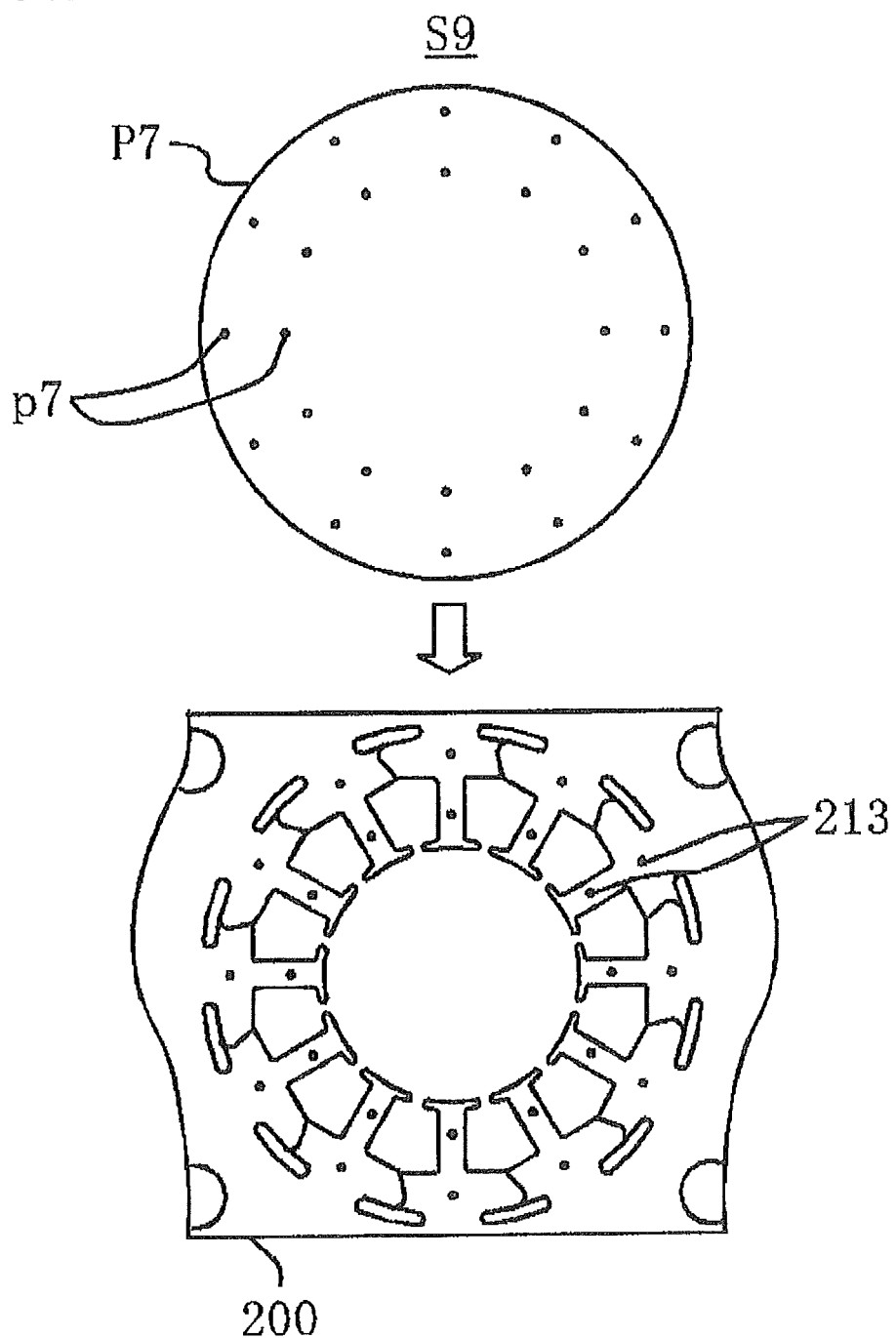
FIG. 26 is a diagram illustrating stage S9 of the metallic mold stage of an embodiment of the present invention.

FIG. 26 illustrates stage S9. In stage S9, with the punch P7 having the protruding portions p7, the crimping uneven parts 213 are formed at the central portions of the yoke part and the tooth part of each split core piece, so as to be used for lamination fixing of the annular core members.

Figure 27:
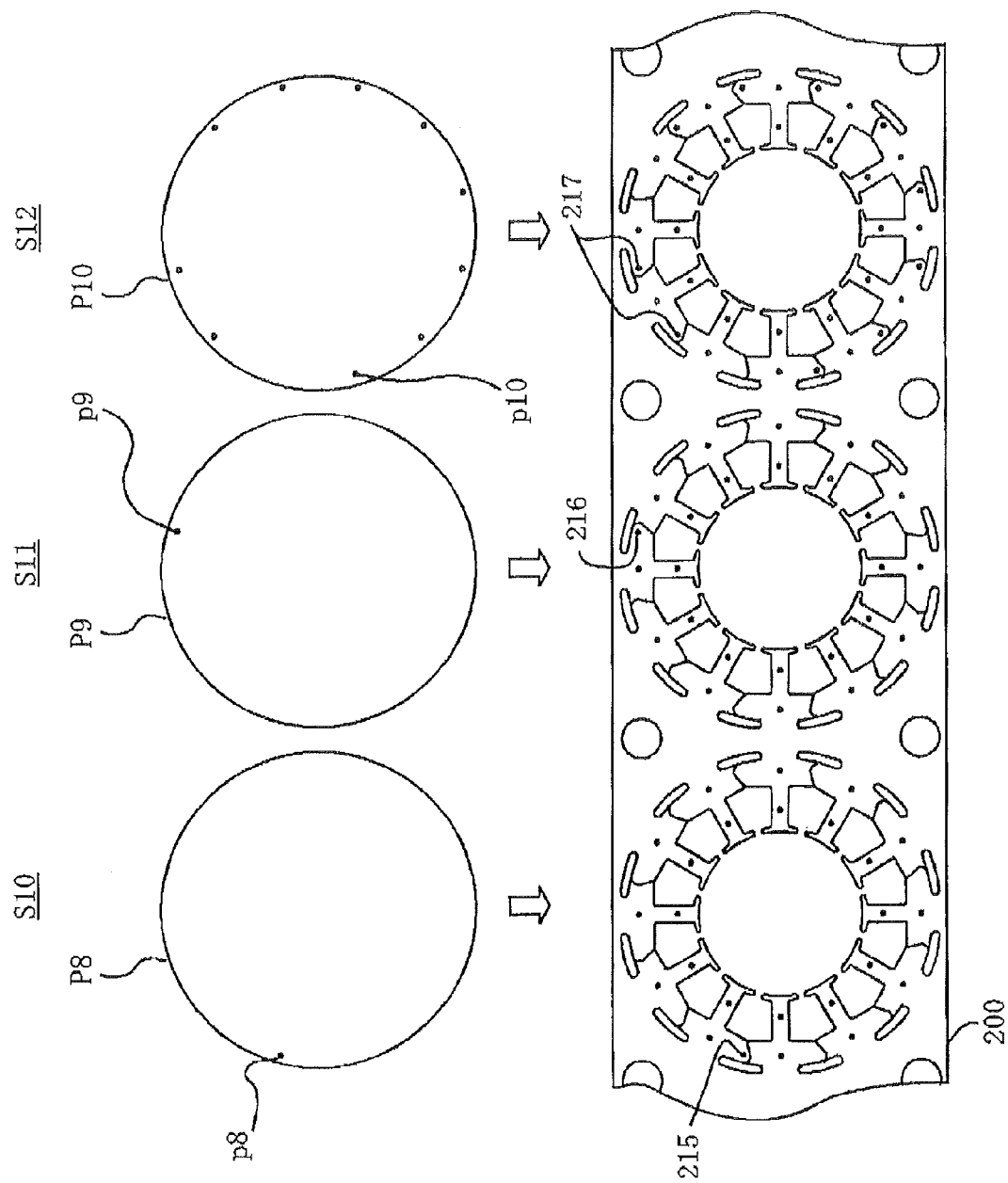
FIG. 27 is a diagram illustrating stages S10 to S12 of the metallic mold stage of an embodiment of the present invention.

FIG. 27 illustrates stage S10 to stage S12. In stage S10, with the punch P8 having the protruding portion p8, a rotation uneven part 215 is formed on each of the annular core members at the reference position, where the first shape part (e.g., convex shape part) of the first end, in the first circumferential direction, of a yoke of one annular core member is overlaid with the first shape part (e.g., convex shape part) of the fourth end, in the second circumferential direction, of a yoke of another annular core member. In stage S11, with the punch P9 having the protruding portion p9, a rotation uneven part 216 is formed on each of the annular core members at the position rotated by the predetermined angle from the reference position (in this example, the position rotated clockwise by 90 degrees from the reference position), where the first shape part (e.g., convex shape part) of the first end, in the first circumferential direction, of a yoke of one annular core member is overlaid with the first shape part (e.g., convex shape part) of the fourth end, in the second circumferential direction, of a yoke of another annular core member. It is noted that, in stages S10 and S11, when either of the punch P8 having the cutting portion p8 or the punch P9 having the cutting portion p9 is arranged so as to be rotatable in the circumferential direction at least between the reference position (0-degree position) and the position rotated by the predetermined angle from the reference position (the position rotated clockwise by 90 degrees from the reference position), installation of only either of the punch P8 or the punch P9 is necessary. In stage S12, with the punch P10 having the protruding portions p10, rotation uneven parts 217 are formed on each of the annular core members at positions in the outer circumference, other than the reference position and the position rotated by the predetermined angle from the reference position (in this example, the position rotated clockwise by 90 degrees from the reference position), where the first shape parts (e.g., convex shape parts) of the first ends, in the first circumferential direction, of the yokes of one annular core member are overlaid with the first shape parts (e.g., convex shape parts) of the fourth ends in the second circumferential direction, of the yokes of another annular core member. In stage S12 in FIG. 27, the rotation uneven parts processed in stage S10 or stage S11 are omitted for convenience of description.

Figure 28:
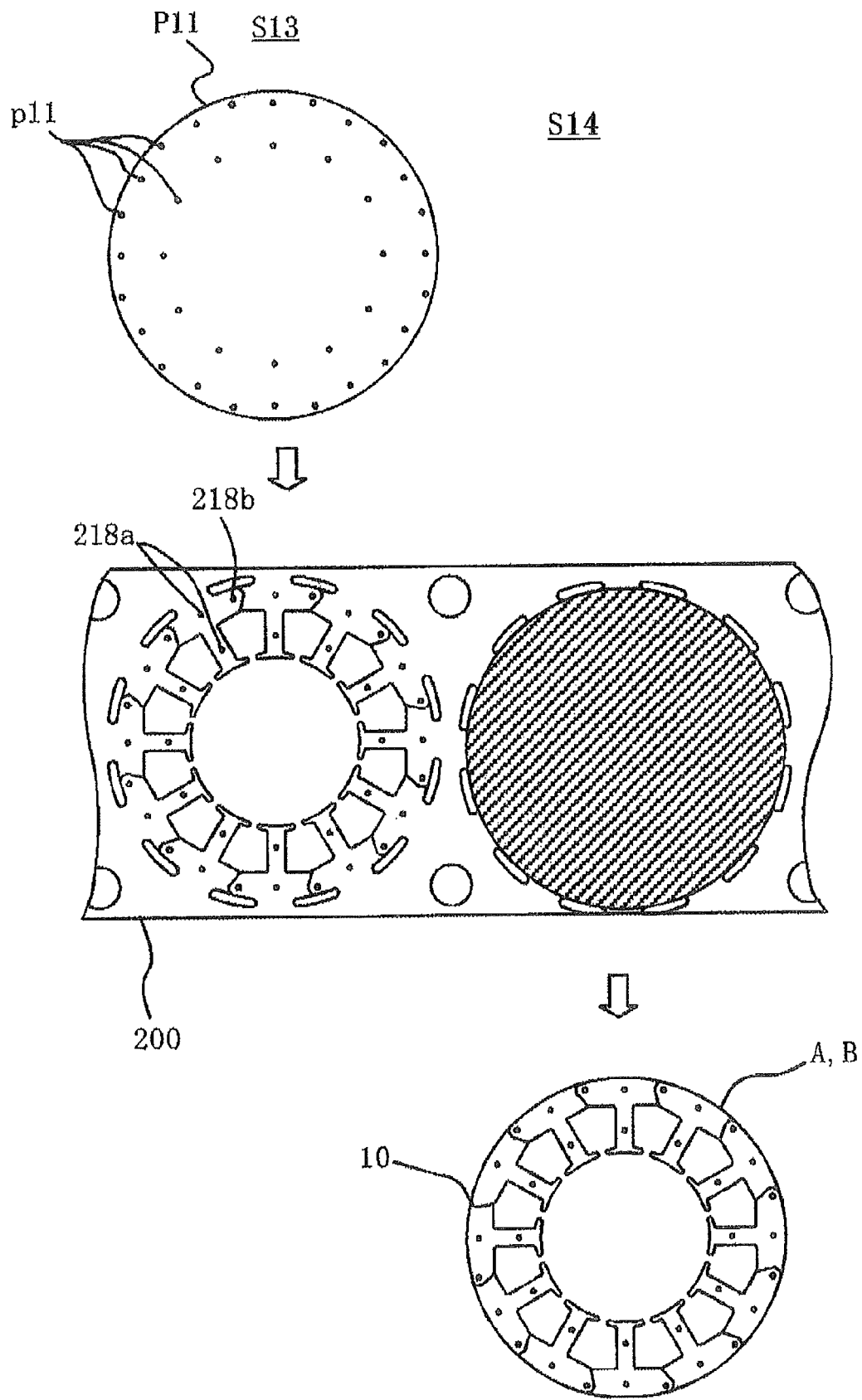
FIG. 28 is a diagram illustrating stages S13 to S14 of the metallic mold stage of an embodiment of the present invention.

FIG. 28 illustrates stage S13 and stage S14. In stage S13, with the punch P11 having the protruding portions p11, in the lowermost annular core member of the annular core members which are laminated and fixed to form an iron core, the through holes 218a are formed at the same positions as the above crimping uneven parts 213 which are formed in stage S9, and in addition, the through holes 218b are formed at the same positions as the rotation uneven parts 215, 216, and 217 which are formed in the above stages S10 to S12. The through holes 218a in the lowermost annular core member are used for fitting with the crimping uneven parts 213 of the annular core member immediately thereabove. The through holes 218b in the lowermost annular core member is used for fitting with the rotation uneven parts 215, 216, and 217 of the upper annular core member immediately thereabove. In stage S14, with the punch P15 shown in FIG. 29 and FIG. 30, the outer circumference of each annular core member is punched along the above matching holes 206 out of the magnetic plate material 200, whereby the annular core members A and B are generated.

Figure 29:
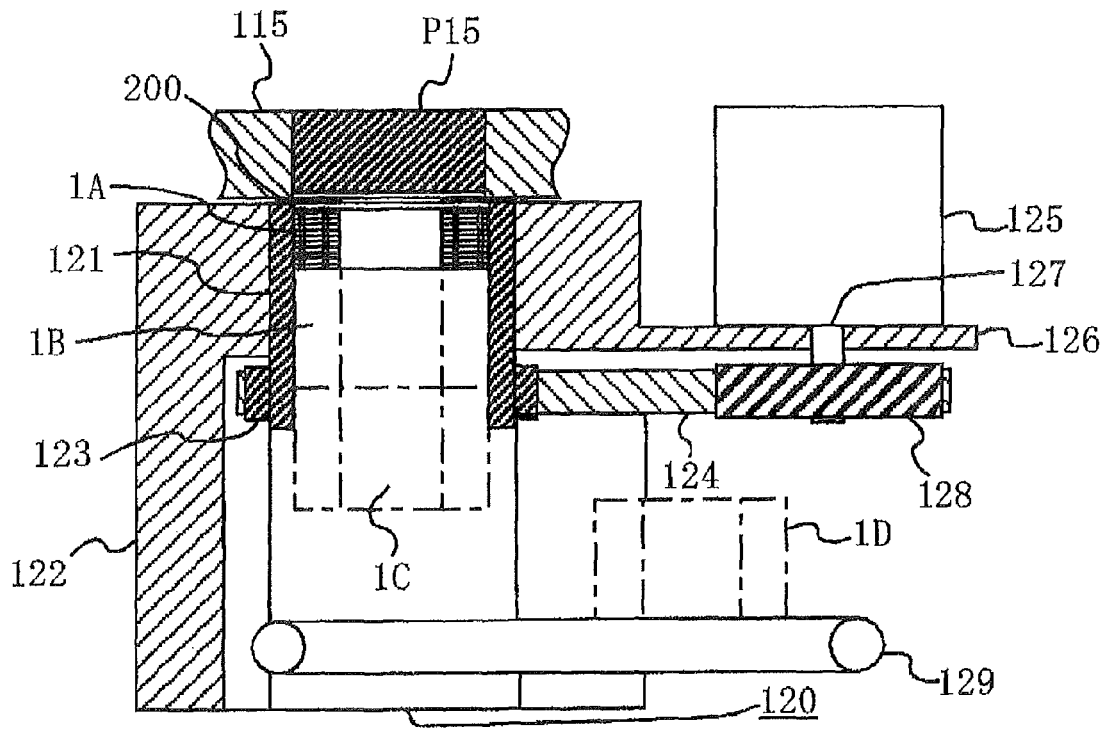
FIG. 29 is a cross-sectional view of a rotary lamination apparatus according to an embodiment of the present invention.
Figure 30:
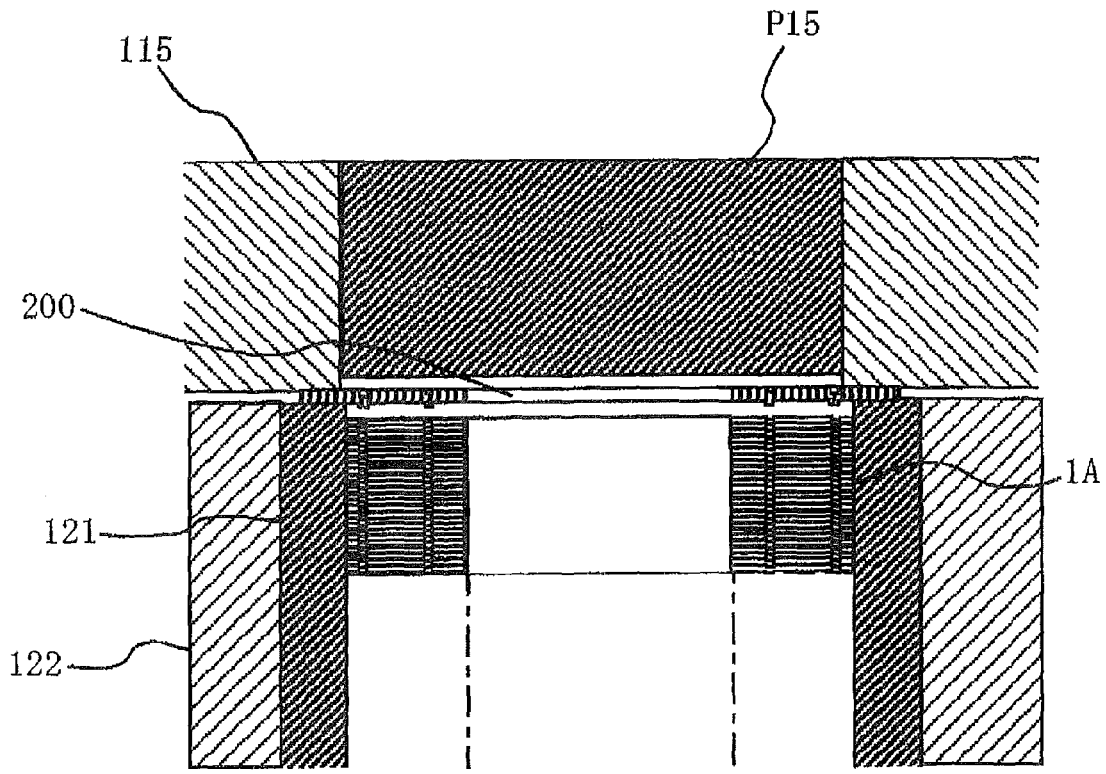
FIG. 30 is an enlarged sectional view illustrating the state of lamination of annular core members performed by the rotary lamination apparatus according to an embodiment of the invention.

FIG. 29 is a cross-sectional view of the rotary lamination apparatus 120 for rotary lamination of the annular core members, and FIG. 30 is an enlarged view illustrating the state of lamination of the annular core members shown in FIG. 29. In the drawings, the punch P15 installed in a stripper 115 is used in above stage S14 for punching the annular core members out of the magnetic plate material 200. The rotary lamination apparatus 120 includes a dice 121 for retaining the annular core members punched out by the punch P15 with the side pressure at its inner circumference. That is, the annular core member that is initially punched by the punch P15 is retained with the side pressure at the inner circumference of the dice 121, and the annular core members punched thereafter are pressed down by the punch P15, and laminated and fixed onto the initially punched annular core member. In this manner, annular core members are laminated successively thereby to form an iron core 1A.

Figure 31:
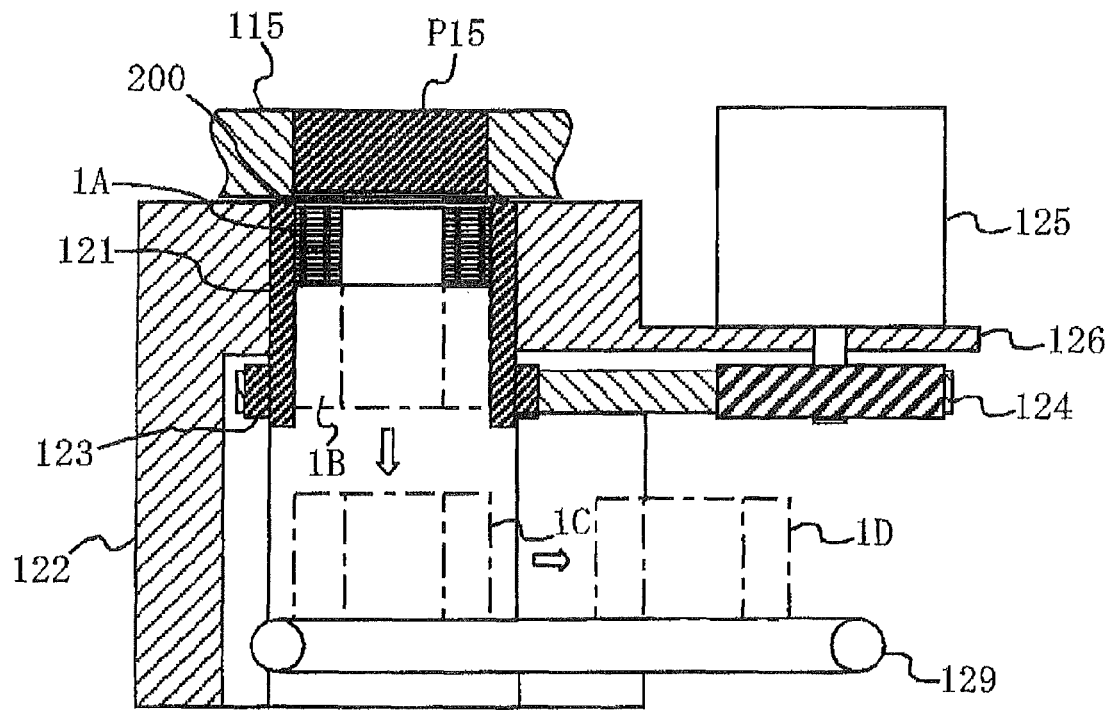
FIG. 31 is a cross-sectional view illustrating an operation of the rotary lamination apparatus according to an embodiment of the present invention.
Figure 32:
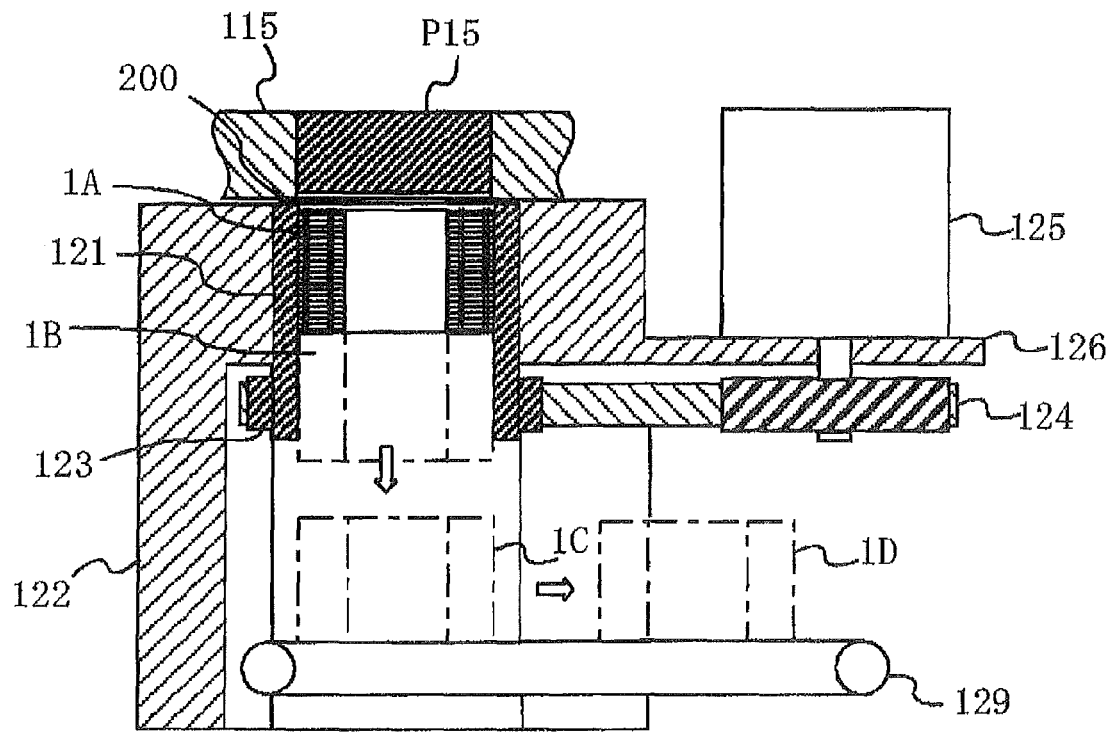
FIG. 32 is a cross-sectional view illustrating an operation of the rotary lamination apparatus according to an embodiment of the present invention.

The dice 121 is rotatably supported by a lower die 122 of the rotary lamination apparatus 120, and the dice 121 is provided with a pulley 123. A motor 125 is mounted on a motor fitting part 126 which is mounted to the lower die 122 of the rotary lamination apparatus 120, and a pulley 128 is fixed to a motor shaft 127. A belt 124 is wound around the pulley 123 of the dice 121 and the pulley 128 of the motor 125, and by driving the motor 125, the dice 121 is rotated via the pulley 128, the belt 124, and the pulley 123. FIG. 29 illustrates a state where the iron core 1A formed by laminating a specified number of the annular core members is retained by the inner circumference of the dice 121. By driving the motor 125 under this state, the dice 121 is rotated by a predetermined angle. FIG. 31 illustrates a process after the rotation of the dice 121 at a predetermined angle shown in FIG. 29, i.e., the process of additionally punching, laminating, and fixing together annular core members thereby to form the iron core 1A. FIG. 32 illustrates a state of the iron core 1A completed by punching, laminating, and fixing together a specified number of the annular core members. In FIG. 29 to FIG. 31, iron cores 1B and 1C, which are completed by laminating and fixing a specified number of the annular core members, are located under the iron core 1A which is in the process of lamination and fixing, and are retained by the inner circumference of the dice 121. They finally fall onto a belt conveyor 129 and are conveyed.

Figure 33:
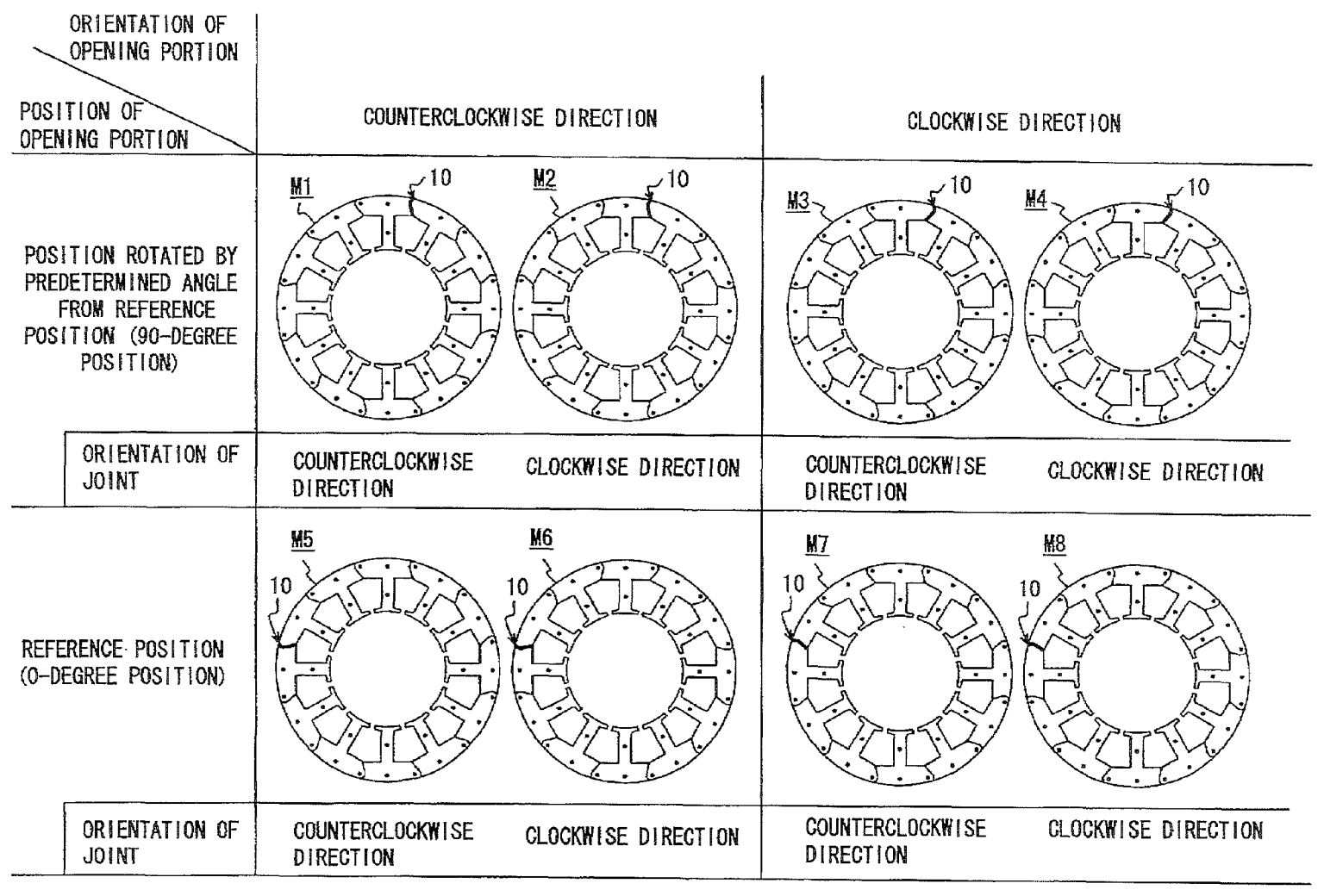

FIG. 33 is a plan view illustrating kinds of annular core members manufactured by the iron-core manufacturing apparatus 100 of the present embodiment. Annular core members M1 to M8 shown in FIG. 33 are based on the first and second annular core members A and B shown in FIG. 5, and are different from one another in terms of the combination of the following factors: the position of the opening portion 10 of the split core piece that has no rotation uneven part formed near one end in the circumferential direction of its yoke; the orientation of the first shape part (e.g., convex shape part) of the opening portion 10 (hereinafter, referred to as the orientation of the opening portion); and the orientation of the joint. Here, the opening portion 10 of each of the annular core members M1 to M8 represents a cut line at the one end in the circumferential direction of the yoke part of a split core piece in each annular core member, the one end having no rotation uneven part formed. The orientation of the joint represents the orientation of the first shape parts (e.g., convex shape part) of one ends in the circumferential direction of the yoke parts of split core pieces in each annular core member, the one ends having rotation uneven parts formed. In the first annular core member A, which is a base for the annular core members M1 to M8, the first end, in the first circumferential direction (counterclockwise direction), of the yoke of each split core piece has the first shape part (e.g., convex shape part), and the second end in the second circumferential direction (clockwise direction) has the second shape part (e.g., concave shape part). In addition, in the second annular core member B, the third end, in the first circumferential direction (counterclockwise direction), of the yoke of each split core piece has the second shape part (e.g., concave shape part), and the fourth end in the second circumferential direction (clockwise direction) has the first shape part (e.g., convex shape part).

In FIG. 33, the annular core member M1 is based on the first annular core member A, its opening portion 10 is located at the position rotated by the predetermined angle from the reference position (90-degree position), and the orientation of the opening portion 10 is the counterclockwise direction. The annular core member M2 is based on the second annular core member B, its opening portion 10 is located at the position rotated by the predetermined angle from the reference position (90-degree position), and the orientation of the opening portion 10 is the counterclockwise direction. The annular core member M3 is based on the first annular core member A, its opening portion 10 is located at the position rotated by the predetermined angle from the reference position (90-degree position), and the orientation of the opening portion 10 is the clockwise direction. The annular core member M4 is based on the second annular core member B, its opening portion 10 is located at the position rotated by the predetermined angle from the reference position (90-degree position), and the orientation of the opening portion 10 is the clockwise direction.

In addition, the annular core member M5 is based on the first annular core member A, its opening portion 10 is located at the reference position (0-degree position), and the orientation of the opening portion 10 is the counterclockwise direction. The annular core member M6 is based on the second annular core member B, its opening portion 10 is located at the reference position (0-degree position), and the orientation of the opening portion 10 is the counterclockwise direction. The annular core member M7 is based on the first annular core member A, its opening portion 10 is located at the reference position (0-degree position), and the orientation of the opening portion 10 is the clockwise direction. The annular core member M8 is based on the second annular core member B, its opening portion 10 is located at the reference position (0-degree position), and the orientation of the opening portion 10 is the clockwise direction.

FIG. 34 is a diagram showing steps of processing the above annular core members M1 to M8 on the metallic mold stage 110 of the iron-core manufacturing apparatus 100 of the present embodiment. Among the kinds of processing shown in FIG. 34, cut processing represents processing of making a cut line for separating yoke parts of each annular core member. Joint bend processing represents processing of forming rotation uneven parts at portions of yokes, of annular core members, which are overlaid with each other in the laminating direction. Further, the cut processing represents processing of forming, in the lowermost annular core member of annular core members which are laminated and fixed to form an iron core, through holes at the same positions as the crimping uneven parts formed in above stage S9, and through holes at the same positions as the rotation uneven parts formed in above stages S10 to S12. The 0 degrees in the processing position in FIG. 34 represent, in this example, the reference position in the outer circumference of each annular core member, and the 90 degrees represent, in this example, the position rotated by the predetermined angle from the reference position. The 10 positions represent positions in the outer circumference other than the reference position (0-degree position) and the position (90-degree position) rotated by the predetermined angle from the reference position. The punch represents the kinds of punches described above.

In FIG. 34, the annular core member M1 is manufactured through the following steps. That is, with the punch P3 and punch P4, cut processing for separating yoke parts is performed at the reference position (0-degree position) and the position (90-degree position) rotated by the predetermined angle from the reference position. Next, with the punch P5, the cut processing for separating yoke parts is performed at 10 positions other than the reference position (0-degree position) and the position (90-degree position) rotated by the predetermined angle from the reference position. Next, with the punch P8, processing for forming a rotation uneven part is performed at the overlaid portion of a yoke part at the reference position (0-degree position). Further, with the punch P10, the processing for forming rotation uneven parts is performed at the overlaid portions of 10 yoke parts at the positions other than the reference position (0-degree position) and the position (90-degree position) rotated by the predetermined angle from the reference position. The cut processing for forming through holes with the punch P11 is performed with respect to the lowermost one of the annular core members which are laminated and fixed to form an iron core. It is noted that the steps for the annular core members M2 to M8 to be described later are the same as above, and description of the press working in stages S1 and S2, and the press working in stage S9 using the punch P7 will be omitted.

The annular core member M2 is manufactured through the following steps. That is, with the punch P1 and punch P4, the cut processing for separating yoke parts is performed at the reference position (0-degree position) and the position (90-degree position) rotated by the predetermined angle from the reference position. Next, with the punch P6, the cut processing for separating yoke parts is performed at 10 positions other than the reference position (0-degree position) and the position (90-degree position) rotated by the predetermined angle from the reference position. Next, with the punch P8, the processing for forming a rotation uneven part is performed at the overlaid portion of a yoke part at the reference position (0-degree position). Further, with the punch P10, the processing for forming rotation uneven parts is performed at the overlaid portions of 10 yoke parts at the positions other than the reference position (0-degree position) and the position (90-degree position) rotated by the predetermined angle from the reference position. The cut processing for forming through holes with the punch P11 is performed with respect to the lowermost one of the annular core members which are laminated and fixed to form an iron core.

The annular core member M3 is manufactured through the following steps. That is, with the punch P3 and punch P2, the cut processing for separating yoke parts is performed at the reference position (0-degree position) and the position (90-degree position) rotated by the predetermined angle from the reference position. Next, with the punch P5, the cut processing for separating yoke parts is performed at 10 positions other than the reference position (0-degree position) and the position (90-degree position) rotated by the predetermined angle from the reference position. Next, with the punch P8, the processing for forming a rotation uneven part is performed at the overlaid portion of a yoke part at the reference position (0-degree position). Further, with the punch P10, the processing for forming rotation uneven parts is performed at the overlaid portions of 10 yoke parts at the positions other than the reference position (0-degree position) and the position (90-degree position) rotated by the predetermined angle from the reference position. The cut processing for forming through holes with the punch P11 is performed with respect to the lowermost one of the annular core members which are laminated and fixed to form an iron core.

The annular core member M4 is manufactured through the following steps. That is, with the punch P1 and punch P2, the cut processing for separating yoke parts is performed at the reference position (0-degree position) and the position (90-degree position) rotated by the predetermined angle from the reference position. Next, with the punch P6, the cut processing for separating yoke parts is performed at 10 positions other than the reference position (0-degree position) and the position (90-degree position) rotated by the predetermined angle from the reference position. Next, with the punch P8, the processing for forming a rotation uneven part is performed at the overlaid portion of a yoke part at the reference position (0-degree position). Further, with the punch P10, the processing for forming rotation uneven parts is performed at the overlaid portions of 10 yoke parts at the positions other than the reference position (0-degree position) and the position (90-degree position) rotated by the predetermined angle from the reference position. The cut processing for forming through holes with the punch P11 is performed with respect to the lowermost one of the annular core members which are laminated and fixed to form an iron core.

The annular core member M5 is manufactured through the following steps. That is, with the punch P3 and punch P4, the cut processing for separating yoke parts is performed at the reference position (0-degree position) and the position (90-degree position) rotated by the predetermined angle from the reference position. Next, with the punch P5, the cut processing for separating yoke parts is performed at 10 positions other than the reference position (0-degree position) and the position (90-degree position) rotated by the predetermined angle from the reference position. Next, with the punch P9, the processing for forming a rotation uneven part is performed at the overlaid portion of a yoke part at the position (90-degree position) rotated by the predetermined angle from the reference position. Further, with the punch P10, the processing for forming rotation uneven parts is performed at the overlaid portions of 10 yoke parts at the positions other than the reference position (0-degree position) and the position (90-degree position) rotated by the predetermined angle from the reference position. The cut processing for forming through holes with the punch P11 is performed with respect to the lowermost one of the annular core members which are laminated and fixed to form an iron core.

The annular core member M6 is manufactured through the following steps. That is, with the punch P3 and punch P2, the cut processing for separating yoke parts is performed at the reference position (0-degree position) and the position (90-degree position) rotated by the predetermined angle from the reference position. Next, with the punch P6, the cut processing for separating yoke parts is performed at 10 positions other than the reference position (0-degree position) and the position (90-degree position) rotated by the predetermined angle from the reference position. Next, with the punch P9, the processing for forming a rotation uneven part is performed at the overlaid portion of a yoke part at the position (90-degree position) rotated by the predetermined angle from the reference position. Further, with the punch P10, the processing for forming rotation uneven parts is performed at the overlaid portions of 10 yoke parts at the positions other than the reference position (0-degree position) and the position (90-degree position) rotated by the predetermined angle from the reference position. The cut processing for forming through holes with the punch P11 is performed with respect to the lowermost one of the annular core members which are laminated and fixed to form an iron core.

The annular core member M7 is manufactured through the following steps. That is, with the punch P1 and punch P4, the cut processing for separating yoke parts is performed at the reference position (0-degree position) and the position (90-degree position) rotated by the predetermined angle from the reference position. Next, with the punch P5, the cut processing for separating yoke parts is performed at 10 positions other than the reference position (0-degree position) and the position (90-degree position) rotated by the predetermined angle from the reference position. Next, with the punch P9, the processing for forming a rotation uneven part is performed at the overlaid portion of a yoke part at the position (90-degree position) rotated by the predetermined angle from the reference position. Further, with the punch P10, the processing for forming rotation uneven parts is performed at the overlaid portions of 10 yoke parts at the positions other than the reference position (0-degree position) and the position (90-degree position) rotated by the predetermined angle from the reference position. The cut processing for forming through holes with the punch P11 is performed with respect to the lowermost one of the annular core members which are laminated and fixed to form an iron core.

The annular core member M8 is manufactured through the following steps. That is, with the punch P1 and punch P2, the cut processing for separating yoke parts is performed at the reference position (0-degree position) and the position (90-degree position) rotated by the predetermined angle from the reference position. Next, with the punch P6, the cut processing for separating yoke parts is performed at 10 positions other than the reference position (0-degree position) and the position (90-degree position) rotated by the predetermined angle from the reference position. Next, with the punch P9, the processing for forming a rotation uneven part is performed at the overlaid portion of a yoke part at the position (90-degree position) rotated by the predetermined angle from the reference position. Further, with the punch P10, processing for forming rotation uneven parts is performed at the overlaid portions of 10 yoke parts at the positions other than the reference position (0-degree position) and the position (90-degree position) rotated by the predetermined angle from the reference position. The cut processing for forming through holes with the punch P11 is performed with respect to the lowermost one of the annular core members which are laminated and fixed to form an iron core.

FIG. 35 to FIG. 41 are perspective views illustrating the iron cores C1 to C7 which are manufactured by the iron-core manufacturing apparatus 100 of the present embodiment. The iron cores C1 to C7 are formed by assembling any of the above annular core members M1 to M8, and then laminating the core members using the rotary lamination method.

Figure 35:
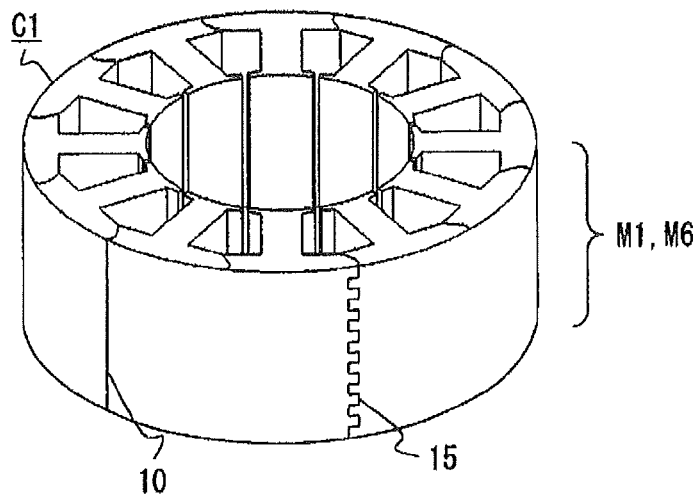
FIG. 35 is a perspective view of an iron core C1 according to an embodiment of the present invention.

The iron core C1 illustrated in FIG. 35 is formed by alternatively laminating the annular core members M1 and the annular core members M6 using the rotary lamination method. As shown in FIG. 33, in each annular core member M1, which is based on the first annular core member A, the opening portion 10 is located at the position (90-degree position) rotated by the predetermined angle from the reference position, and the orientation of the opening portion 10 is the counterclockwise direction. In addition, in each annular core member M6, which is based on the second annular core member B, the opening portion 10 is located at the reference position (0-degree position), and the orientation of the opening portion 10 is the counterclockwise direction. The iron core C1 is formed by the rotary lamination apparatus 120 by laminating the annular core members M1 and M6 alternately while rotating them at the predetermined angle (90 degrees) such that the first end in the circumferential direction of each annular core member M1, the first end having no rotation uneven part formed and being located at the position (90-degree position) rotated by the predetermined angle from the reference position, is positionally identical in the laminating direction with the third end in the circumferential direction of each annular core member M6, the third end having no rotation uneven part formed and being located at the reference position (0-degree position).

According to the iron core C1 illustrated in FIG. 35, the ends of the split cores in contact with each other at the opening portion 10 are planar shaped, and thus opening and closing of the iron core C1 at the opening portion 10 can be performed easily. It is noted that in FIG. 35, the annular core members M1 and M6 may be rotated and laminated alternately one by one, or may be rotated and laminated alternately in units of a specified number (e.g., two or three). In addition, in FIG. 35, the reference numeral 15 illustrates a situation of the overlaid portions of the annular core members, where the rotation uneven parts are formed, are laminated one another. The same is the true in FIG. 36 to FIG. 41.

Figure 36:
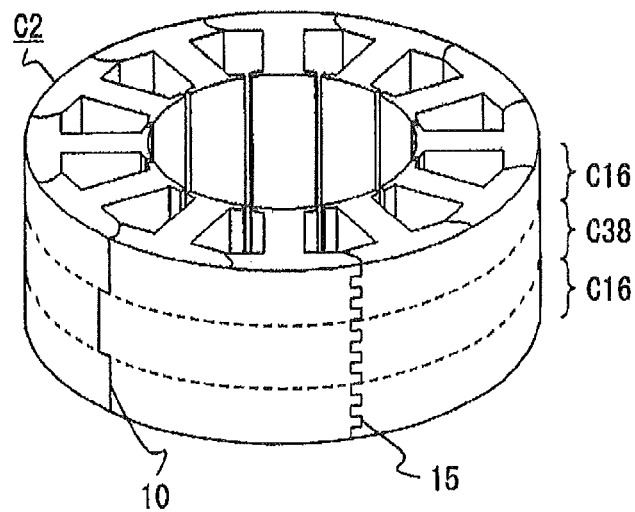
FIG. 36 is a perspective view of an iron core C2 according to an embodiment of the present invention.

The iron core C2 illustrated in FIG. 36 is formed by: forming core parts C16 by laminating the annular core members M1 and the annular core members M6 alternately using the rotary lamination method; forming a core part C38 by laminating the annular core members M3 and the annular core members M8 alternately using the rotary lamination method; and laminating the core parts C16 and the core part C38. In each annular core member M1, which is based on the first annular core member A, the opening portion 10 is located at the position (90-degree position) rotated by the predetermined angle from the reference position, and the orientation of the opening portion 10 is the counterclockwise direction. In addition, in each annular core member M6, which is based on the second annular core member B, the opening portion 10 is located at the reference position (0-degree position), and the orientation of the opening portion 10 is the counterclockwise direction. The core part C16 is formed by the rotary lamination apparatus 120 by laminating the annular core members M1 and M6 alternately while rotating them at the predetermined angle (90 degrees) such that the first end in the circumferential direction of each annular core member M1, the first end having no rotation uneven part formed and being located at the position (90-degree position) rotated by the predetermined angle from reference position, is positionally identical in the laminating direction with the third end in the circumferential direction of each annular core member M6, the third end having no rotation uneven part formed and being located at the reference position (0-degree position).

On the other hand, in each annular core member M3, which is based on the first annular core member A, the opening portion 10 is located at the position (90-degree position) rotated by the predetermined angle from the reference position, and the orientation of the opening portion 10 is the clockwise direction. In each annular core member M8, which is based on the second annular core member B, the opening portion 10 is located at the reference position (0-degree position), and the orientation of the opening portion 10 is the clockwise direction. The core part C38 is formed by the rotary lamination apparatus 120 by laminating the annular core members M3 and M8 alternately while rotating them at the predetermined angle (90 degrees) such that the second end in the circumferential direction of each annular core member M3, the second end having no rotation uneven part formed and being located at the position (90-degree position) rotated by the predetermined angle from the reference position, is positionally identical in the laminating direction with the fourth end in the circumferential direction of each annular core member M8, the fourth end having no rotation uneven part formed and being located at the reference position (0-degree position).

Next, the core parts C16 and C38 are laminated alternately such that the first end in the circumferential direction of each annular core member M1, the third end in the circumferential direction of each annular core member M6, the fourth end in the circumferential direction of each annular core member M3, and the second end in the circumferential direction of each annular core member M8, none of the ends having a rotation uneven part formed, are positionally identical with one another in the laminating direction, whereby the iron core C2 is formed.

According to the iron core C2 illustrated in FIG. 36, the ends of the split cores in contact with each other at the opening portion 10 have level differences, and thus the positioning of the iron core C2 at the opening portion 10 in the laminating direction can be performed easily.

Figure 37:
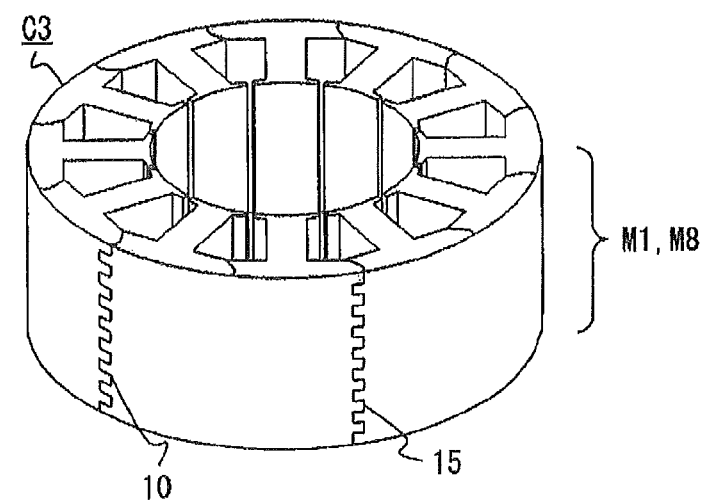
FIG. 37 is a perspective view of an iron core C3 according to an embodiment of the present invention.

The iron core C3 illustrated in FIG. 37 is formed by alternately laminating the annular core members M1 and the annular core members M8 using the rotary lamination method. In each annular core member M1, which is based on the first annular core member A, the opening portion 10 is located at the position (90-degree position) rotated by the predetermined angle from the reference position, and the orientation of the opening portion 10 is the counterclockwise direction. In addition, in each annular core member M8, which is based on the second annular core member B, the opening portion 10 is located at the reference position (0-degree position), and the orientation of the opening portion 10 is the clockwise direction. The iron core C3 is formed by the rotary lamination apparatus 120 by laminating the annular core members M1 and M8 alternately while rotating them at the predetermined angle (90 degrees) such that the first end in the circumferential direction of each annular core member M1, the first end having no rotation uneven part formed and being located at the position (90-degree position) rotated by the predetermined angle from the reference position, is positionally identical in the laminating direction with the fourth end in the circumferential direction of each annular core member M8, the fourth end having no rotation uneven part formed and being located at the reference position (0-degree position).

According to the iron core C3 illustrated in FIG. 37, the orientation of the cut lines in the respective annular core members M1 and M8 forming the iron core C3 is uniform, and thus the shape accuracy of the annular core members M1 and M8, that is, the shape accuracy of the iron core C3 is stabilized.

Figure 38:
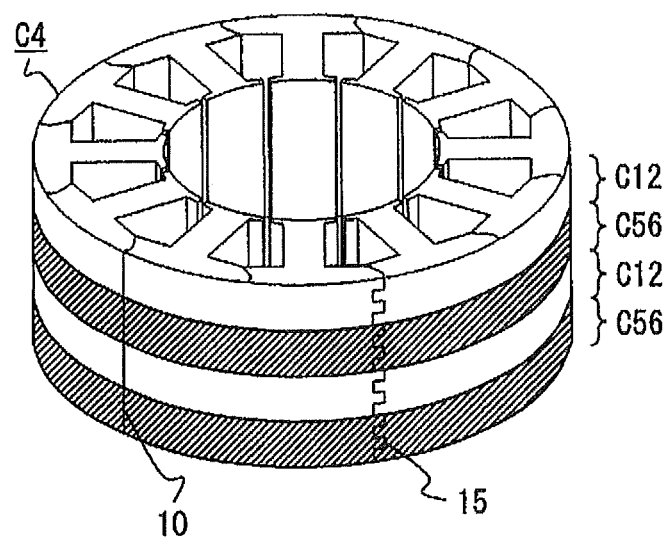
FIG. 38 is a perspective view of an iron core C4 according to an embodiment of the present invention.

The iron core C4 illustrated in FIG. 38 is formed by: forming core parts C12 by laminating the annular core members M1 and the annular core members M2 alternately; forming core parts C56 by laminating the annular core members M5 and the annular core members M6 alternately; and laminating the core parts C12 and the core parts C56 alternately using the rotary lamination method. In each annular core member M1, which is based on the first annular core member A, the opening portion 10 is located at the position (90-degree position) rotated by the predetermined angle from the reference position, and the orientation of the opening portion 10 is the counterclockwise direction. In each annular core member M2, which is based on the second annular core member B, the opening portion 10 is located at the position (90-degree position) rotated by the predetermined angle from the reference position, and the orientation of the opening portion 10 is the counterclockwise direction. Further, each core part C12 is formed by laminating the annular core members M1 and M2 alternately such that the first end in the circumferential direction of each annular core member M1, the first end having no rotation uneven part formed and being located at the position (90-degree position) rotated by the predetermined angle from the reference position, is positionally identical in the laminating direction with the third end in the circumferential direction of each annular core member M2, the third end having no rotation uneven part formed and being located at the position (90-degree position) rotated by the predetermined angle from the reference position.

On the other hand, in each annular core member M5, which is based on the first annular core member A, the opening portion 10 is located at the reference position (0-degree position), and the orientation of the opening portion 10 is the counterclockwise direction. In each annular core member M6, which is based on the second annular core member B, the opening portion 10 is located at the reference position (0-degree position), and the orientation of the opening portion 10 is the counterclockwise direction. Each core part C56 is formed by laminating the annular core members M5 and M6 alternately such that the first end in the circumferential direction of each annular core member M5, the first end having no rotation uneven part formed and being located at the reference position (0-degree position), is positionally identical in the laminating direction with the third end in the circumferential direction of each annular core member M6, the third end having no rotation uneven part formed and being located at the reference position (0-degree position).

Next, with the rotary lamination apparatus 120, the core parts C12 and C56 are laminated alternately while being rotated by the predetermined angle (90 degrees) such that the first end in the circumferential direction of each annular core member M1, the third end in the circumferential direction of each annular core member M2, the first end in the circumferential direction of each annular core member M5, and the third end in the circumferential direction of each annular core member M6, none of the ends having a rotation uneven part formed, are positionally identical with one another in the laminating direction, whereby the iron core C4 is formed.

According to the iron core C4 illustrated in FIG. 38, the ends of the split cores in contact with each other at the opening portion 10 are planar shaped, and thus opening and closing of the iron core C4 at the opening portion 10 can be performed easily. In addition, as compared to manufacture of the iron cores C1 to C3, the number of times of rotary lamination by the rotary lamination apparatus 120 is reduced, leading to improvement in productivity.

Figure 39:
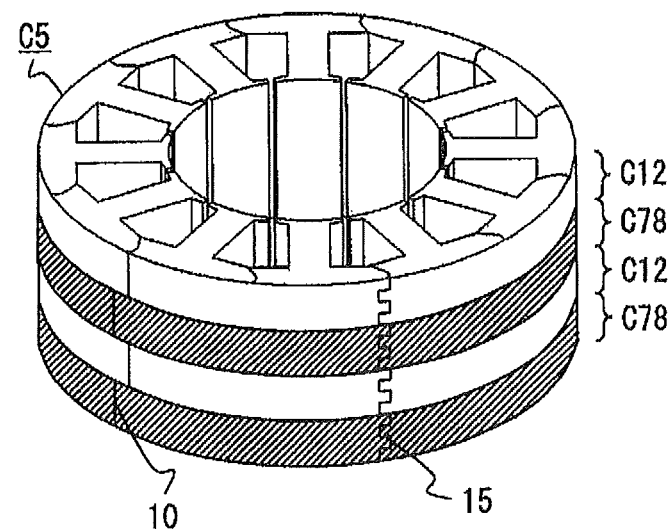
FIG. 39 is a perspective view of an iron core C5 according to an embodiment of the present invention.

The iron core C5 illustrated in FIG. 39 is formed by: forming the core parts C12 by laminating the annular core members M1 and the annular core members M2 alternately; forming core parts C78 by laminating the annular core members M7 and the annular core members M8 alternately; and laminating the core parts C12 and the core parts C78 alternately using the rotary lamination method. In each annular core member M1, which is based on the first annular core member A, the opening portion 10 is located at the position (90-degree position) rotated by the predetermined angle from the reference position, and the orientation of the opening portion 10 is the counterclockwise direction. In addition, in each annular core member M2, which is based on the second annular core member B, the opening portion 10 is located at the position (90-degree position) rotated by the predetermined angle from the reference position, and the orientation of the opening portion 10 is the counterclockwise direction. Each core part C12 is formed by laminating the annular core members M1 and M2 alternately such that the first end in the circumferential direction of each annular core member M1, the first end having no rotation uneven part formed and being located at the position (90-degree position) rotated by the predetermined angle from the reference position, is positionally identical in the laminating direction with the third end in the circumferential direction of each annular core member M2, the third end having no rotation uneven part formed and being located at the position (90-degree position) rotated by the predetermined angle from the reference position.

On the other hand, in each annular core member M7, which is based on the first annular core member A, the opening portion 10 is located at the reference position (0-degree position), and the orientation of the opening portion 10 is the clockwise direction. In each annular core member M8, which is based on the second annular core member B, the opening portion 10 is located at the reference position (0-degree position), and the orientation of the opening portion 10 is the clockwise direction. Further, each core part C78 is formed by laminating the annular core members M7 and M8 alternately such that the second end in the circumferential direction of each annular core member M7, the second end having no rotation uneven part formed and being located at the reference position (0-degree position), is positionally identical in the laminating direction with the fourth end in the circumferential direction of each annular core member M8, the fourth end having no rotation uneven part formed and being located at the reference position (0-degree position).

Next, with the rotary lamination apparatus 120, the core parts C12 and 78 are laminated alternately while being rotated by the predetermined angle (90 degrees) such that the first end in the circumferential direction of each annular core member M1, the third end in the circumferential direction of each annular core member M2, the second end in the circumferential direction of each annular core member M7, and the fourth end in the circumferential direction of each annular core member M8, none of the ends having a rotation uneven part formed, are positionally identical with one another in the laminating direction, whereby the iron core C5 is formed.

According to the iron core C5 illustrated in FIG. 39, the ends of the split cores in contact with each other at the opening portion 10 have level differences, and thus the positioning of the iron core C5 at the opening portion 10 in the laminating direction can be performed easily. In addition, as compared to manufacture of the iron cores C1 to C3, the number of times of rotary lamination by the rotary lamination apparatus 120 is reduced, leading to improvement in productivity.

Figure 40:
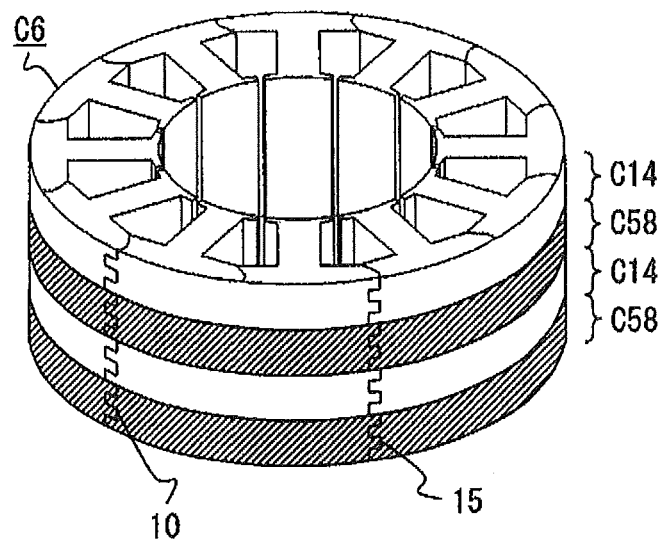
FIG. 40 is a perspective view of an iron core C6 according to an embodiment of the present invention.

The iron core C6 illustrated in FIG. 40 is formed by: forming core parts C14 by laminating the annular core members M1 and the annular core members M4 alternately; forming core parts C58 by laminating the annular core members M5 and the annular core members M8 alternately; and laminating the core parts C14 and the core parts C58 alternately using the rotary lamination method. In each annular core member M1, which is based on the first annular core member A, the opening portion 10 is located at the position (90-degree position) rotated by the predetermined angle from the reference position, and the orientation of the opening portion 10 is the counterclockwise direction. In addition, in each annular core member M4, which is based on the second annular core member B, the opening portion 10 is located at the position (90-degree position) rotated by the predetermined angle from the reference position, and the orientation of the opening portion 10 is the clockwise direction. Each core part C14 is formed by laminating the annular core members M1 and M4 alternately such that the first end in the circumferential direction of each annular core member M1, the first end having no rotation uneven part formed and being located at the position (90-degree position) rotated by the predetermined angle from the reference position, is positionally identical in the laminating direction with the fourth end in the circumferential direction of each annular core member M4, the fourth end having no rotation uneven part formed and being located at the position (90-degree position) rotated by the predetermined angle from the reference position.

On the other hand, in each annular core member M5, which is based on the first annular core member A, the opening portion 10 is located at the reference position (0-degree position), and the orientation of the opening portion 10 is the counterclockwise direction. In each annular core member M8, which is based on the second annular core member B, the opening portion 10 is located at the reference position (0-degree position), and the orientation of the opening portion 10 is the clockwise direction. The core part C58 is formed by laminating the annular core members M5 and M8 alternately such that the first end in the circumferential direction of each annular core member M5, the first end having no rotation uneven part formed and being located at the reference position (0-degree position), is positionally identical in the laminating direction with the fourth end in the circumferential direction of each annular core member M8, the fourth end having no rotation uneven part formed and being located at the reference position (0-degree position).

Next, with the rotary lamination apparatus 120, the core parts C14 and C58 are laminated alternately while being rotated by the predetermined angle (90 degrees) such that the first end in the circumferential direction of each annular core member M1, the fourth end in the circumferential direction of each annular core member M4, the first end in the circumferential direction of each annular core member M5, and the fourth end in the circumferential direction of each annular core member M8, none of the ends having a rotation uneven part formed, are positionally identical with one another in the laminating direction, whereby the iron core C6 is formed.

According to the iron core C6 illustrated in FIG. 40, the orientation of the cut lines in the respective annular core members M1, M4, M5, and M6 forming the iron core C6 is uniform, and thus the shape accuracy of the annular core members M1, M4, M5, and M8, that is, the shape accuracy of the iron core C6 is stabilized. In addition, as compared to manufacture of the iron cores C1 to C3, the number of times of rotary lamination by the rotary lamination apparatus 120 is reduced, leading to improvement in productivity.

Figure 41:
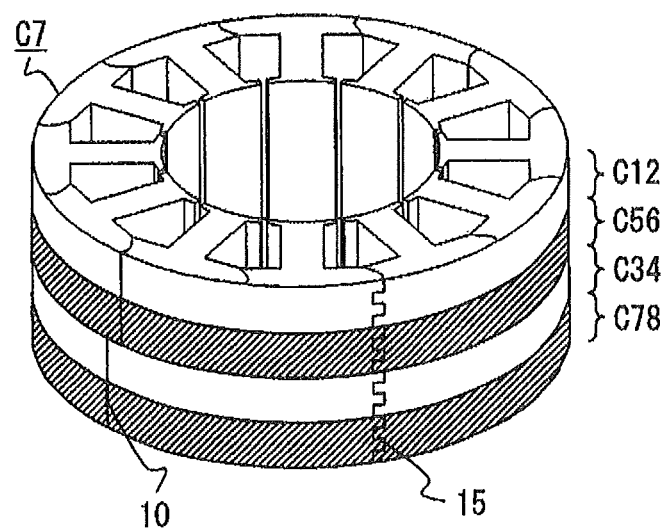
FIG. 41 is a perspective view of an iron core C7 according to an embodiment of the present invention.

The iron core C7 illustrated in FIG. 41 is formed by: forming the core part C12 by laminating the annular core members M1 and the annular core members M2 alternately; forming the core part C56 by laminating the annular core members M5 and the annular core members M6 alternately; forming the core part C34 by laminating the annular core members M3 and the annular core members M4 alternately; forming the core part C78 by laminating the annular core members M7 and the annular core members M8 alternately; and laminating the core parts C12, C56, C34, and C78 using the rotary lamination method.

In each annular core member M1, which is based on the first annular core member A, the opening portion 10 is located at the position (90-degree position) rotated by the predetermined angle from the reference position, and the orientation of the opening portion 10 is the counterclockwise direction. In addition, in each annular core member M2, which is based on the second annular core member B, the opening portion 10 is located at the position (90-degree position) rotated by the predetermined angle from the reference position, and the orientation of the opening portion 10 is the counterclockwise direction. The core part C12 is formed by laminating the annular core members M1 and M2 alternately such that the first end in the circumferential direction of each annular core member M1, the first end having no rotation uneven part formed and being located at the position (90-degree position) rotated by the predetermined angle from the reference position, is positionally identical in the laminating direction with the third end in the circumferential direction of each annular core member M2, the third end having no rotation uneven part formed and being located at the position (90-degree position) rotated by the predetermined angle from the reference position.

In each annular core member M5, which is based on the first annular core member A, the opening portion 10 is located at the reference position (0-degree position), and the orientation of the opening portion 10 is the counterclockwise direction. In each annular core member M6, which is based on the second annular core member B, the opening portion 10 is located at the reference position (0-degree position), and the orientation of the opening portion 10 is the counterclockwise direction. The core part C56 is formed by laminating the annular core members M5 and M6 alternately such that the first end in the circumferential direction of each annular core member M5, the first end having no rotation uneven part formed and being located at the reference position (0-degree position), is positionally identical in the laminating direction with the third end in the circumferential direction of each annular core member M6, the third end having no rotation uneven part formed and being located at the reference position (0-degree position).

In each annular core member M3, which is based on the first annular core member A, the opening portion 10 is located at the position (90-degree position) rotated by the predetermined angle from the reference position, and the orientation of the opening portion 10 is the clockwise direction. In addition, in each annular core member M4, which is based on the second annular core member B, the opening portion 10 is located at the position (90-degree position) rotated by the predetermined angle from the reference position, and the orientation of the opening portion 10 is the clockwise direction. The core part C34 is formed by laminating the annular core members M3 and M4 alternately such that the second end in the circumferential direction of each annular core member M3, the second end having no rotation uneven part formed and being located at the position (90-degree position) rotated by the predetermined angle from the reference position, is positionally identical in the laminating direction with the fourth end in the circumferential direction of each annular core member M4, the fourth end having no rotation uneven part formed and being located at the position (90-degree position) rotated by the predetermined angle from the reference position.

In each annular core member M7, which is based on the first annular core member A, the opening portion 10 is located at the reference position (0-degree position), and the orientation of the opening portion 10 is the clockwise direction. In each annular core member M8, which is based on the second annular core member B, the opening portion 10 is located at the reference position (0-degree position), and the orientation of the opening portion 10 is the clockwise direction. The core part C78 is formed by laminating the annular core members M7 and M8 alternately such that the second end in the circumferential direction of each annular core member M7, the second end having no rotation uneven part formed and being located at the reference position (0-degree position), is positionally identical in the laminating direction with the fourth end in the circumferential direction of each annular core member M8, the fourth end having no rotation uneven part formed and being located at the reference position (0-degree position).

Next, with the rotary lamination apparatus 120, the core parts C12, C56, C34, and C78 are laminated while being rotated by the predetermined angle (90 degrees) such that the first end of each annular core member M1, the third end of each annular core member M2, the first end of each annular core member M5, the third end of each annular core member M6, the second end of each annular core member M3, the fourth end of each annular core member M4, the second end of each annular core member M7, and the fourth end of each annular core member M8, all the ends being in the circumferential direction and none of the ends having a rotation uneven part formed, are positionally identical with one another in the laminating direction, whereby the iron core C7 is formed.

According to the iron core C7 illustrated in FIG. 41, the ends of the split cores in contact with each other at the opening portion 10 have level differences, and thus the positioning of the iron core C7 at the opening portion 10 in the laminating direction can be performed easily. In addition, as compared to manufacture of the iron cores C1 to C3, the number of times of rotary lamination by the rotary lamination apparatus 120 is reduced, leading to improvement in productivity.

As described above, in the iron-core manufacturing apparatus illustrated in FIG. 21 of the present embodiment, when the punches illustrated in FIG. 22 are provided and the rotary lamination apparatus illustrated in FIG. 29 to FIG. 32 is used, a plurality of kinds of iron cores C1 to C7 illustrated in FIG. 35 to FIG. 41 can be manufactured by one iron-core manufacturing apparatus 100. It is noted that the iron cores C1 to C7 can be manufactured by using an iron-core manufacturing apparatus having punches described below.

Figure 42:
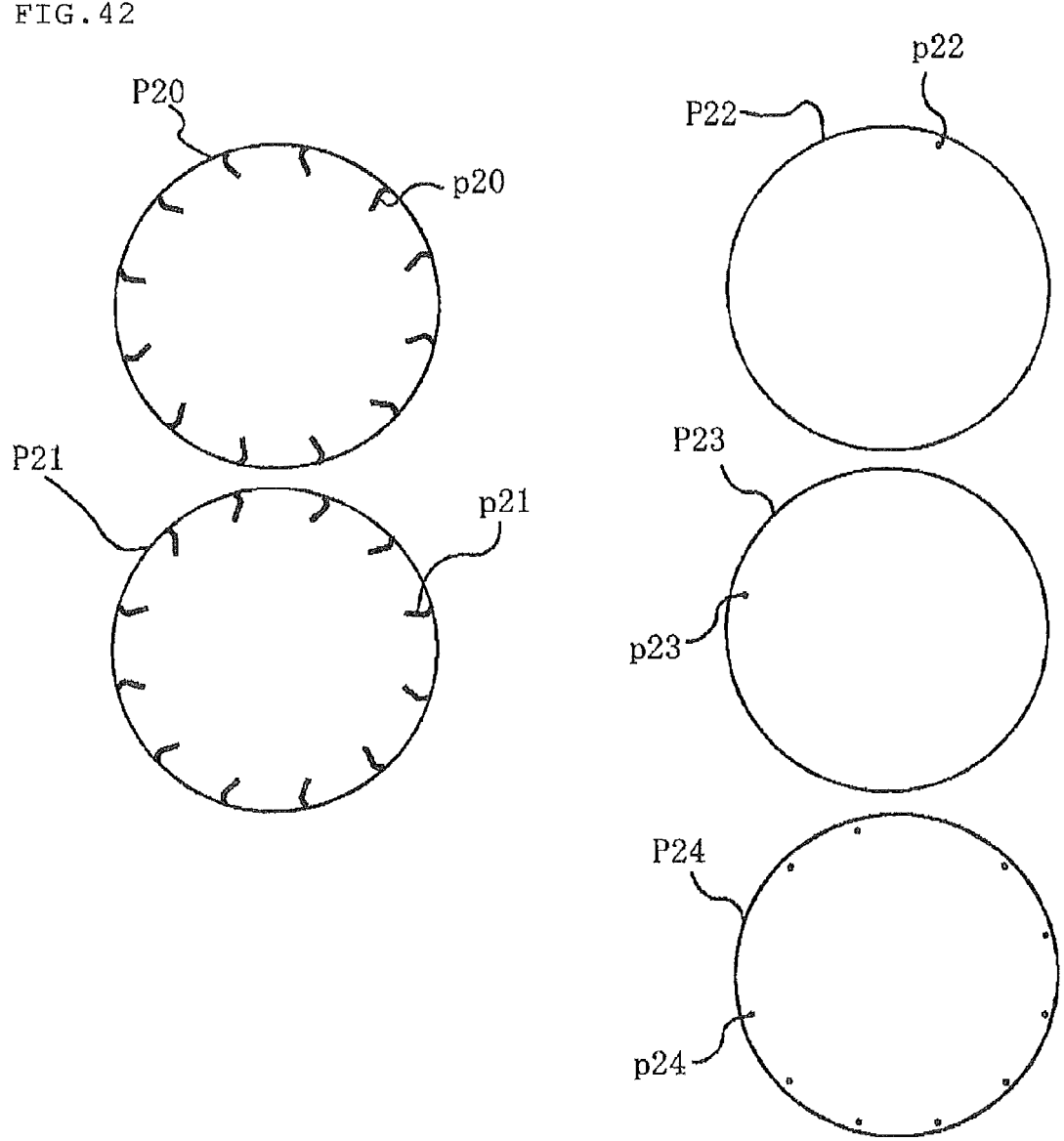
FIG. 42 is a diagram illustrating punches for manufacturing the iron core C1.

FIG. 42 is a diagram illustrating punches for manufacturing the iron core C1 shown in FIG. 35. The iron core C1 is formed by laminating the annular core members M1 and the annular core members M6 alternately using the rotary lamination method. In FIG. 42, a punch P20 is a punch for cut processing between yoke parts of each annular core member M1, and has cutting portions p20 for making cut lines of a convex shape toward the first circumferential direction (counterclockwise direction) at the reference position (0-degree position), at the position (90-degree position) rotated by the predetermined angle from the reference position, and at outer circumference positions (10 positions in this example) other than the reference position and the position rotated by the predetermined angle from the reference position. A punch P21 is a punch for cut processing between yoke parts of each annular core member M6, and has cutting portions p21 for making cut lines of the first shape (e.g., convex shape) toward the first circumferential direction (counterclockwise direction) at the reference position (0-degree position), and making cut lines of the first shape (e.g., convex shape) toward the second circumferential direction (clockwise direction) at the position (90-degree position) rotated by the predetermined angle from the reference position, and at outer circumference positions (10 positions in this example) other than the reference position and the position rotated by the predetermined angle from the reference position.

A punch P22 has a protruding portion p22 for forming rotation uneven parts at the overlaid portion on each of the annular core members, at the position (90-degree position) rotated by the predetermined angle from the reference position, where the first shape part (e.g., convex shape part) of the first end in the first circumferential direction of a yoke of one annular core member is overlaid with the first shape part (e.g., convex shape part) of the fourth end in the second circumferential direction of a yoke of another annular core member. A punch P23 has a protruding portion p23 for forming rotation uneven parts at the overlaid portion on each of the annular core members, at the reference position (0-degree position), where the first shape part (e.g., convex shape part) of the first end in the first circumferential direction of a yoke of one annular core member is overlaid with the first shape part (e.g., convex shape part) of the fourth end in the second circumferential direction of a yoke of another annular core member. A punch P24 has protruding portions p24 (10 portions in this example) for forming rotation uneven parts at the overlaid portions on each of the annular core members, at the positions other than the reference position (0-degree position) and the position (90-degree position) rotated by the predetermined angle from the reference position, where the first shape parts (e.g., convex shape parts) of the first ends in the first circumferential direction of a yoke of one annular core member are overlaid with the first shape parts (e.g., convex shape parts) of the fourth ends in the second circumferential direction of a yoke of another core member.

As described above, with the use of the punches shown in FIG. 42, it is possible to manufacture the iron core C1 with a lesser number of punches than with the punches shown in FIG. 22.

Figure 43:
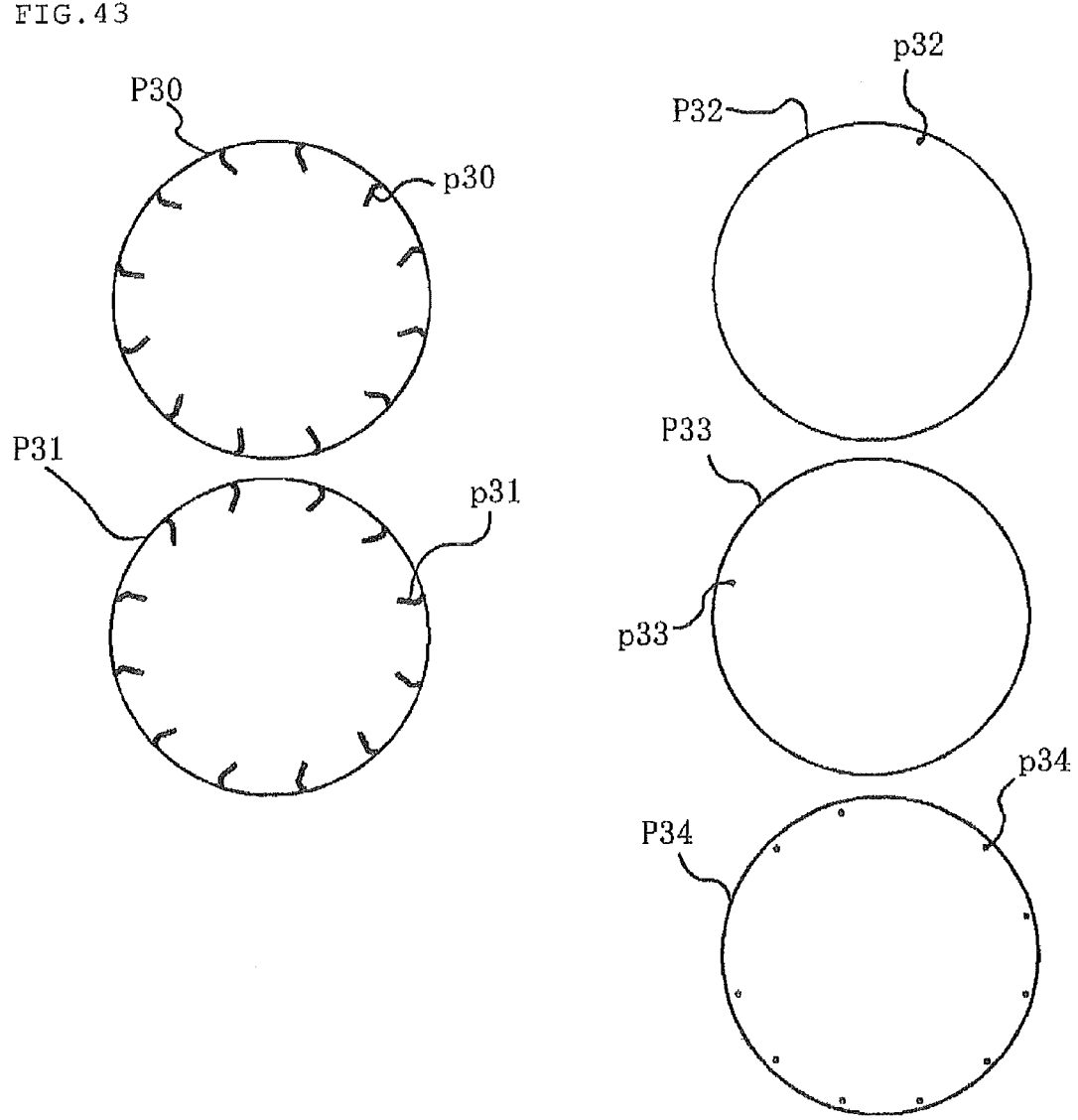
FIG. 43 is a diagram illustrating punches for manufacturing the iron cores C3 and C6.

FIG. 43 is a diagram illustrating punches for manufacturing the iron core C3 shown in FIG. 37. The iron core C3 is formed by laminating the annular core members M1 and the annular core members M8 alternately using the rotary lamination method. In FIG. 43, the punch P30 is a punch for cut processing between yoke parts of each annular core member M1, and has cutting portions p30 for making cut lines of the first shape (e.g., convex shape) toward the first circumferential direction (counterclockwise direction) at the reference position (0-degree position), at the position (90-degree position) rotated by the predetermined angle from the reference position, and at outer circumference positions (10 positions in this example) other than the reference position and the position rotated by the predetermined angle from the reference position. A punch P31 is a punch for cut processing between yoke parts of each annular core member M8, and has cutting portions p31 for making cut lines of the first shape (e.g., convex shape) toward the second circumferential direction (clockwise direction) at the reference position (0-degree position), at the position (90-degree position) rotated by the predetermined angle from the reference position, and at outer circumference positions (10 positions in this example) other than the reference position and the position rotated by the predetermined angle from the reference position.

Since punch P32, punch P33, and punch P34 are similar to the punch P22, punch P23, and punch P24 shown in FIG. 42, respectively, description thereof will be omitted.

As described above, with the use of the punches shown in FIG. 43, it is possible to manufacture the iron core C3 with a lesser number of punches than with the punches shown in FIG. 22.

In addition, with the use of the punches shown in FIG. 43, it is also possible to manufacture the iron core C6 with a lesser number of punches than with the punches shown in FIG. 22. The iron core C6 is formed by: forming the core parts C14 by laminating the annular core members M1 and the annular core members M4 alternately; forming the core parts C58 by laminating the annular core members M5 and the annular core members M8 alternately; and laminating the core parts C14 and core parts C58 alternately using the rotary lamination method. In this case, the punch P30 is used for cut processing between the yoke parts of each of the annular core members M1 and M5, and the punch P31 is used for cut processing between the yoke parts of each of the annular core members M4 and M8.

Figure 44:
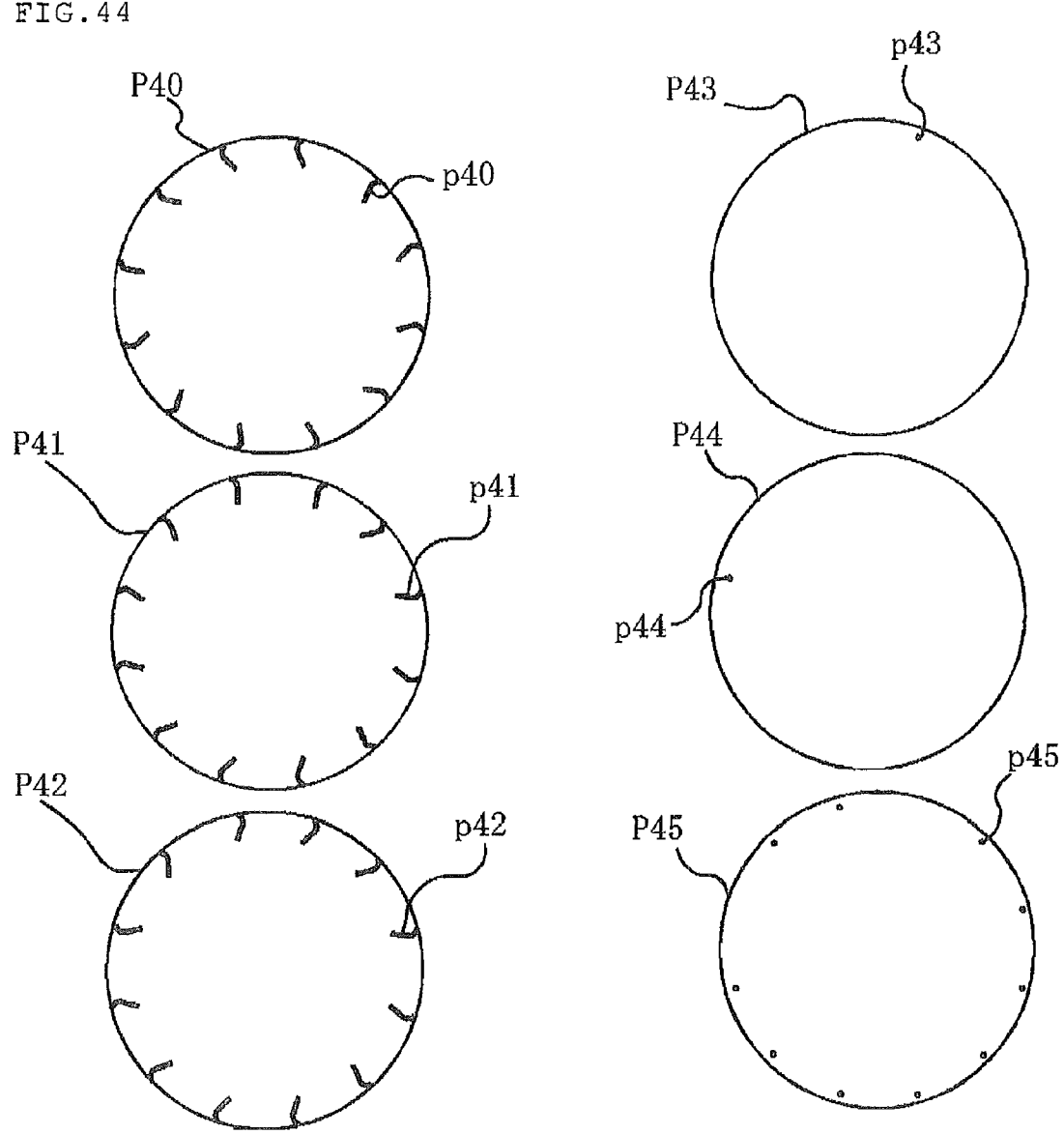
FIG. 44 is a diagram illustrating punches for manufacturing the iron core C4.

FIG. 44 is a diagram illustrating punches for manufacturing the iron core C4 shown in FIG. 38. The iron core C4 is formed by: forming the core parts C12 by laminating the annular core members M1 and the annular core members M2 alternately; forming the core parts C56 by laminating the annular core members M5 and the annular core members M6 alternately; and laminating the core parts C12 and the core parts C56 alternately using the rotary lamination method. In FIG. 44, a punch P40 is a punch for cut processing between yoke parts of each of the annular core members M1 and M5, and has cutting portions p40 for making cut lines of the first shape (e.g., convex shape) toward the first circumferential direction (counterclockwise direction) at the reference position (0-degree position), at the position (90-degree position) rotated by the predetermined angle from the reference position, and at outer circumference positions (10 positions in this example) other than the reference position and the position rotated by the predetermined angle from the reference position. A punch P41 is a punch for cut processing between yoke parts of each annular core member M2, and has cutting portions p41 for making a cut line of the first shape (e.g., convex shape) toward the first circumferential direction (counterclockwise direction) at the position (90-degree position) rotated by the predetermined angle from the reference position, and making cut lines of the first shape (e.g., convex shape) toward the second circumferential direction (clockwise direction) at the reference position (0-degree position), and at outer circumference positions (10 positions in this example) other than the reference position and the position rotated by the predetermined angle from the reference position. A punch P42 is a punch for cut processing between yoke parts of each annular core member M6, and has cutting portions p42 for making a cut line of the first shape (e.g., convex shape) toward the first circumferential direction (counterclockwise direction) at the reference position (0-degree position), and making cut lines of the first shape (e.g., convex shape) toward the second circumferential direction (clockwise direction) at the position (90-degree position) rotated by the predetermined angle from the reference position, and at outer circumference positions (10 positions in this example) other than the reference position and the position rotated by the predetermined angle from the reference position.

Since punch P43, punch P44, and punch P45 are similar to the punch P22, punch P23, and punch P24 shown in FIG. 42, respectively, description thereof will be omitted.

As described above, with the use of the punches shown in FIG. 44, it is possible to manufacture the iron core C4 with a lesser number of punches than with the punches shown in FIG. 22.

Figure 45:
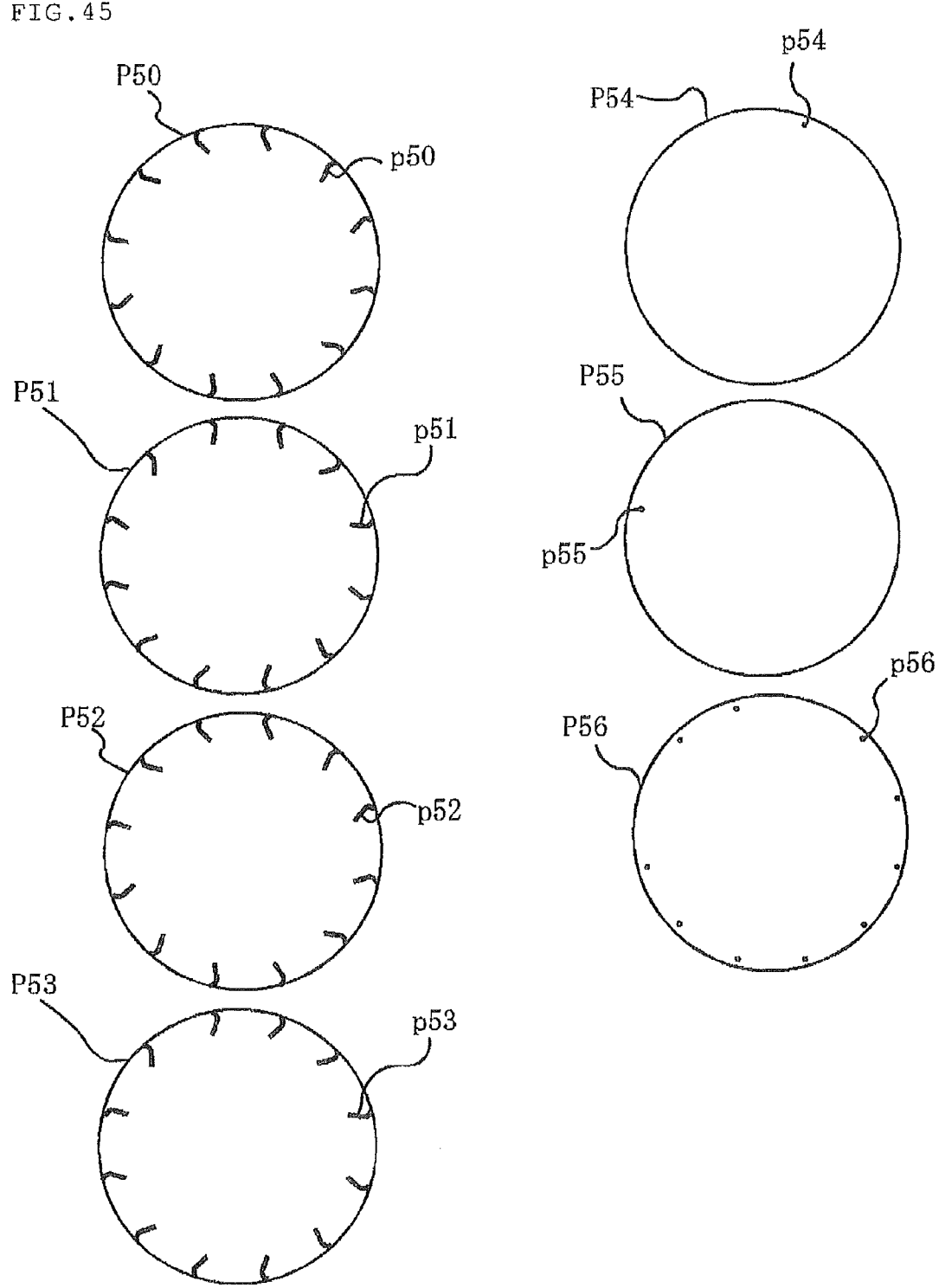
FIG. 45 is a diagram illustrating punches for manufacturing the iron core C5.

FIG. 45 is a diagram illustrating punches for manufacturing the iron core C5 shown in FIG. 39. The iron core C5 is formed by: forming the core parts C12 by laminating the annular core members M1 and the annular core members M2 alternately; forming the core parts C78 by laminating the annular core members M7 and the annular core members M8 alternately; and laminating the core parts C12 and the core parts C78 alternately using the rotary lamination method.

In FIG. 45, a punch P50 is a punch for cut processing between yoke parts of each annular core member M1, and has cutting portions p50 for making cut lines of the first shape (e.g., convex shape) toward the first circumferential direction (counterclockwise direction) at the reference position (0-degree position), at the position (90-degree position) rotated by the predetermined angle from the reference position, and at outer circumference positions (10 positions in this example) other than the reference position and the position rotated by the predetermined angle from the reference position. A punch P51 is a punch for cut processing between yoke parts of each annular core member M2, and has cutting portions p51 for making a cut line of the first shape (e.g., convex shape) toward the first circumferential direction (counterclockwise direction) at the position (90-degree position) rotated by the predetermined angle from the reference position, and making cut lines of the first shape (e.g., convex shape) toward the second circumferential direction (clockwise direction) at the reference position (0-degree position), and at outer circumference positions (10 positions in this example) other than the reference position and the position rotated by the predetermined angle from the reference position. A punch P52 is a punch for cut processing between yoke parts of each annular core member M7, and has cutting portions p52 for making a cut line of the first shape (e.g., convex shape) toward the second circumferential direction (clockwise direction) at the reference position (0-degree position), and making cut lines of the first shape (e.g., convex shape) toward the first circumferential direction (counterclockwise direction) at the position (90-degree position) rotated by the predetermined angle from the reference position, and at outer circumference positions (10 positions in this example) other than the reference position and the position rotated by the predetermined angle from the reference position. A punch P53 is a punch for cut processing between yoke parts of each annular core member M8, and has cutting portions p53 for making cut lines of the first shape (e.g., convex shape) toward the second circumferential direction (clockwise direction) at the reference position (0-degree position), at the position (90-degree position) rotated by the predetermined angle from the reference position, and at outer circumference positions (10 positions in this example) other than the reference position and the position rotated by the predetermined angle from the reference position.

Since punch P54, punch P55, and punch P56 are similar to the punch P22, punch P23, and punch P24 shown in FIG. 42, respectively, description thereof will be omitted.

As described above, with the use of the punches shown in FIG. 45, it is possible to manufacture the iron core C5 with a lesser number of punches than with the punches shown in FIG. 22.

As described above, according to the present embodiment, an iron core, which is formed by rotatably connecting a plurality of split cores to each other via rotation uneven parts and by arranging the plurality of split cores annularly, is formed of a plurality of layered products through the rotary lamination. Accordingly, the phase of torque ripple, which is caused by the shape asymmetry such as level differences in the inner circumference shape of split cores, or by the difference in the magnetic resistance of split cores, can be changed among the layered products depending on the rotation angle of the rotary lamination. Therefore, through the rotary lamination, a predetermined relation is set with respect to the phases of the layered products, whereby torque ripple elements of the respective layered products are offset as a whole iron-core, and the torque ripple elements can be reduced.

In addition, in the description of the above embodiment, a rotary electric machine of a slot combination having 10 rotor poles and 12 stator slots is used as an example, and a rotary lamination in which the rotation angle of one layered product is $\pi/2$ relative to the other layered product has been described as an example. However, the number of rotor poles, the number of stator slots, the height of the respective layered products, the number of layered products, and the rotation angle of rotary lamination are not limited to this, and may take any values as long as they are within the range satisfying the methods and conditions described above.

For example, in the case where, in the rotary electric machine having 8 rotor poles and 12 stator slots, the stator iron core is formed by three layered products having a common lamination thickness, when the rotation angles of the layered products are obtained based on the above described method, the rotation angles of two layered products to be rotated relative to the remaining one layered product are $\pi/6$, and $\pi/3$, respectively.

In this case, when the method for manufacturing iron cores according to the present invention is employed, a method for manufacturing an iron core having a structure, in which first split core pieces adjoining one another in the circumferential direction and second split core pieces adjoining one another in the circumferential direction are mutually rotatable, includes the following steps.

That is, a first annular core member A is formed by punching a plurality of first split core pieces in an annular shape out of a sheet of magnetic plate material, the first split core pieces each including: a yoke part which includes a first end of a first shape oriented in a first circumferential direction and a second end of a second shape oriented in a second circumferential direction, and which has a rotation uneven part arranged on the surface of the first end; and a tooth part projecting inwardly in the radial direction from the yoke part, such that the first end of the yoke part of each first split core piece comes in contact with the second end of the yoke part of its circumferentially adjoining first split core piece.

Next, a second annular core member B is formed by punching a plurality of second split core pieces in an annular shape out of a sheet of magnetic plate material, the second split core pieces each including: a yoke part which includes a third end of the second shape oriented in the first circumferential direction and a fourth end of the first shape oriented in the second circumferential direction, and which has a rotation uneven part arranged on the surface of the fourth end; and a tooth part projecting inwardly in the radial direction from the yoke part, such that the third end of the yoke part of each second split core piece comes in contact with the fourth end of the yoke part of its circumferentially adjoining second split core piece.

Then, the first annular core member A and the second annular core member B are concentrically laminated such that each first end of the first shape is overlaid with its corresponding fourth end of the first shape, and the overlaid portions are connected to each other by the rotation uneven parts. The above method includes the following processes.

That is, included are: a first process of, on the first annular core member A, making cut lines of the first or the second shape with respect to the first ends that are at the reference position, at the position rotated by $\pi/6$ from the reference position, and at the position rotated by $\pi/3$ from the reference position, and also making cut lines of the first shape with respect to the first ends that are at circumference positions other than the reference position, the position rotated by $\pi/6$ from the reference position, and the position rotated by $\pi/3$ from the reference position;

a second process of, on the second annular core member B, making cut lines of the first or the second shape with respect to the fourth ends that are at the reference position, at the position rotated by $\pi/6$ from the reference position, and at the position rotated by $\pi/3$ from reference position, and also making cut lines of the first shape with respect to the fourth ends that are at circumference positions other than the reference position, the position rotated by $\pi/6$ from the reference position, and the position rotated by $\pi/3$ from the reference position;

a third process of forming rotation uneven parts on the surfaces of the first ends of the first annular core member A and on the surfaces of the fourth ends of the second annular core member B, at the circumferential positions other than one of the reference position, the position rotated by π/6 from the reference position, and the position rotated by π/3 from the reference position; and a fourth process of laminating the first annular core member A and the second annular core member B while rotating the first annular core member A or the second annular core member B by π/6 or by π/3 such that the first end in the circumferential direction of the first annular core member A, the first end having no rotation uneven part processed, is positionally identical in the laminating direction with the fourth end in the circumferential direction of the second annular core member B, the fourth end having no rotation uneven part processed.

In addition, when the apparatus of manufacturing iron cores according to the present invention is employed, an apparatus of manufacturing iron cores having a structure, in which first split core pieces adjoining one another in the circumferential direction and second split core pieces adjoining one another in the circumferential direction are mutually rotatable, includes the following steps.

That is, a first annular core member A is formed by punching a plurality of first split core pieces in an annular shape out of a sheet of magnetic plate material, the first split core pieces each including: a yoke part which includes a first end of a first shape oriented in a first circumferential direction and a second end of a second shape oriented in a second circumferential direction, and which has a rotation uneven part arranged on the surface of the first end; and a tooth part projecting inwardly in the radial direction from the yoke part, such that the first end of the yoke part of each first split core piece comes in contact with the second end of the yoke part of its circumferentially adjoining first split core piece.

Next, a second annular core member B is formed by punching a plurality of second split core pieces in an annular shape out of a sheet of magnetic plate material, the second split core pieces each including: a yoke part which includes a third end of the second shape oriented in the first circumferential direction and a fourth end of the first shape oriented in the second circumferential direction, and which has a rotation uneven part arranged on the surface of the fourth end; and a tooth part projecting inwardly in the radial direction from the yoke part, such that the third end of the yoke part of each second split core piece comes in contact with the fourth end of the yoke part of its circumferentially adjoining second split core piece.

Then, the first annular core member A and the second annular core member B are concentrically laminated such that each first end of the first shape is overlaid with its corresponding fourth end of the first shape, and the overlaid portions are connected to each other by the rotation uneven parts. The above apparatus includes the following configurations.

That is, included are a metallic mold stage including:

a first cut processing punch which makes, on the first annular core member A, cut lines of the first or the second shape with respect to the first ends that are at the reference position, at the position rotated by π/6 from the reference position, and at the position rotated by π/3 from the reference position, and which also makes, on the first annular core member A, cut lines of the first shape with respect to the first ends that are at circumference positions other than the reference position, the position rotated by π/6 from the reference position, and the position rotated by π/3 from the reference position;

a second processing punch which makes, on the second annular core member B, cut lines of the first or the second shape with respect to the fourth ends that are at the reference position, at the position rotated by π/6 from the reference position, and at the position rotated by π/3 from the reference position, and which also makes, on the second annular core member B, cut lines of the first shape with respect to the fourth ends that are at circumference positions other than the reference position, the position rotated by π/6 from the reference position, and the position rotated by π/3 from the reference position;

a first rotation uneven part processing punch for forming rotation uneven parts each on the surface of the first end of the first annular core member A and on the surface of the fourth end of the second annular core member B, at the reference position;

a second(a) rotation uneven part processing punch for forming rotation uneven parts each on the surface of the first end of the first annular core member A and on the surface of the fourth end of the second annular core member B, at the position rotated by π/6 from the reference position;

a second(b) rotation uneven part processing punch for forming rotation uneven parts each on the surface of the first end of the first annular core member A and on the surface of the fourth end of the second annular core member B, at the position rotated by π/3 from the reference position; and a third rotation uneven part processing punch for forming rotation uneven parts on the surfaces of the first ends of the first annular core member A, and on the surfaces of the fourth ends of the second annular core member B, at the circumference positions other than the reference position, the position rotated by π/6 from the reference position, and the position rotated by π/3 from the reference position, and a rotary lamination apparatus for laminating the first annular core member A and the second annular core member B while rotating the first annular core member A or the second annular core member B by π/6 or by π/3 such that the first end in the circumferential direction of the first annular core member A, the first end having no rotation uneven part processed is positionally identical in the laminating direction with the fourth end in the circumferential direction of the second annular core member B, the fourth end having no rotation uneven part processed.

INDUSTRIAL APPLICABILITY

The present invention relates to a method and an apparatus for manufacturing iron cores formed of split cores, which are particularly employed as a method and an apparatus for manufacturing an iron core used in a stator of a rotary electric machine which enables suppression of torque ripple.

The invention claimed is:

1. A method for manufacturing an iron core having a structure, in which first split core pieces adjoining one another in the circumferential direction and second split core pieces adjoining one another in the circumferential direction are mutually rotatable, by forming a first annular core member by punching a plurality of first split core pieces in an annular shape out of a sheet of magnetic plate material, the first split core pieces each including: a yoke part which includes a first end of a first shape oriented in a first circumferential direction and a second end of a second shape, which is different from the first shape and is oriented in a second circumferential direction, and which has a rotation uneven part arranged on the surface of the first end; and a tooth part projecting inwardly in the radial direction from the yoke part, such that the first end of the yoke part of each first split core piece comes in contact with the second end of the yoke part of its circumferentially adjoining first split core piece, by forming a second annular core member by punching a plurality of second split core pieces in an annular shape out of a sheet of magnetic plate material, the second split core pieces each including: a yoke part which includes a third end of the second shape oriented in the first circumferential direction and a fourth end of the first shape oriented in the second circumferential direction, and which has a rotation uneven part arranged on the surface of the fourth end; and a tooth part projecting inwardly in the radial direction from the yoke part, such that the third end of the yoke part of each second split core piece comes in contact with the fourth end of the yoke part of its circumferentially adjoining second split core piece, and by concentrically laminating the first annular core member and the second annular core member such that each first end of the first shape is overlaid with its corresponding fourth end of the first shape, and connecting the overlaid portions by the rotation uneven parts, the method comprising:

a first process of, on the first annular core member, making cut lines of the first shape or the second shape with respect to the first ends that are at a reference position, and at a position rotated by a predetermined angle from the reference position, and also making cut lines of the first shape with respect to the first ends that are at circumference positions other than the reference position, and the position rotated by the predetermined angle from the reference position;

a second process of, on the second annular core member, making cut lines of the first or the second shape with respect to the fourth ends that are at the reference position, and at the position rotated by the predetermined angle from reference position, and also making cut lines of the first shape with respect to the fourth ends that are at circumference positions other than the reference position, and the position rotated by the predetermined angle from the reference position;

a third process of forming the rotation uneven parts on the surfaces of the first ends of the yokes of the first annular core member and on the surfaces of the fourth ends of the yokes of the second annular core member, at the circumference positions other than either of the reference position and the position rotated by the predetermined angle from the reference position; and a fourth process of laminating the first annular core member and the second annular core member while rotating the first annular core member or the second annular core member by the predetermined angle such that one of the first ends in the circumferential direction of the first annular core member, the first end having no rotation uneven part processed, is positionally identical in the laminating direction with one of the fourth ends in the circumferential direction of the second annular core member, the fourth end having no rotation uneven part processed.

2. The method for manufacturing the iron core according to claim 1, wherein the first process is a process of manufacturing, from the first annular core member, an annular core member M1 by making a cut line of the first shape with respect to one of the first ends that is at the position rotated by the predetermined angle from the reference position, and by making cut lines of the first shape with respect to the other first ends that are at circumference positions other than the position rotated by the predetermined angle from the reference position, the second process is a process of manufacturing, from the second annular core member, an annular core member M6 by making a cut line of the second shape with respect to one of the fourth ends that is at the reference position, and by making cut lines of the first shape with respect to the other fourth ends at the circumference positions other than the reference position, the third process is a process of forming, on the annular core member M1, the rotation uneven parts on the surfaces of the first ends of the yokes at the circumference positions other than the position rotated by the predetermined angle from the reference position, and of forming, on the annular core member M6, the rotation uneven parts on the surfaces of the fourth ends of the yokes at the circumference positions other than the reference position; and the fourth process is a process of laminating the annular core member M1 and the annular core member M6 while rotating the annular core member M1 and the annular core member M6 alternately by the predetermined angle such that one of the first ends in the circumferential direction of the annular core member M1, the first end having no rotation uneven part processed, is positionally identical in the laminating direction with one of the fourth ends in the circumferential direction of the annular core member M6, the fourth end having no rotation uneven part processed.

3. The method for manufacturing the iron core according to claim 1, wherein the first process is a process of:

manufacturing, from the first annular core member, an annular core member M1 by making a cut line of the first shape with respect to one of the first ends that is at the position rotated by the predetermined angle from the reference position, and by making cut lines of the first shape with respect to the other first ends that are at the circumference positions other than the position rotated by the predetermined angle from the reference position; and manufacturing, from the first annular core member, an annular core member M3 by making a cut line of the second shape with respect to one of the first ends that is at the position rotated by the predetermined angle from the reference position, and by making cut lines of the first shape with respect to the other first ends that are at the circumference positions other than the position rotated by the predetermined angle from the reference position, the second process is a process of:

manufacturing, from the second annular core member, an annular core member M6 by making a cut line of the second shape with respect to one of the fourth ends that is at the reference position, and by making cut lines of the first shape with respect to the other fourth ends that are at the circumference positions other than the reference position; and manufacturing, from the second annular core member, an annular core member M8 by making a cut line of the first shape with respect to one of the fourth ends that is at the reference position, and by making cut lines of the first shape with respect to the other fourth ends that are at the circumference positions other than the reference position, the third process is a process of:
  forming, on the annular core member M1, the rotation uneven parts on the surfaces of the first ends of the yokes at the circumference positions other than the position rotated by the predetermined angle from the reference position;
  forming, on the annular core member M3, the rotation uneven parts on the surfaces of the first ends of the yokes at the circumference positions other than the reference position;
  forming, on the annular core member M6, the rotation uneven parts on the surfaces of the fourth ends of the yokes at the circumference positions other than the reference position; and
  forming, on the annular core member M8, the rotation uneven parts on the surfaces of the fourth ends of the yokes at the circumference positions other than the reference position, and
the fourth process is a process of:
  forming at least one core part C16 by laminating the annular core member M1 and the annular core member M6 alternately while rotating the annular core member M1 and the annular core member M6 by the predetermined angle such that one of the first ends in the circumferential direction of the annular core member M1, the first end having no rotation uneven part processed, is positionally identical in the laminating direction with one of the third ends in the circumferential direction of the annular core member M6, the third end having no rotation uneven part processed;
  forming at least one core part C38 by laminating the annular core member M3 and the annular core member M8 alternately while rotating the annular core member M3 and the annular core member M8 by the predetermined angle such that one of the second ends in the circumferential direction of the annular core member M3, the second end having no rotation uneven part processed, is positionally identical in the laminating direction with one of the fourth ends in the circumferential direction of the annular core member M8, the fourth end having no rotation uneven part processed; and
  laminating the core parts C16 and C38 alternately such that the first end of the annular core member M1, the third end of the annular core member M6, the second end of the annular core member M3, and the fourth end of the annular core member M8 are positionally identical in the laminating direction with one another, all of the ends being in the circumferential direction and none of the ends having a rotation uneven part processed.

4. The method for manufacturing the iron core according to claim 1, wherein
the first process is a process of manufacturing, from the first annular core member, an annular core member M1 by making a cut line of the first shape with respect to one of the first ends that is at the position rotated by the predetermined angle from the reference position, and by making cut lines of the first shape with respect to the other first ends that are at the circumference positions other than the position rotated by the predetermined angle from the reference position,
the second process is a process of manufacturing, from the second annular core member, an annular core member M8 by making a cut line of the first shape with respect to one of the fourth ends that is at the reference position, and by making cut lines of the first shape with respect to the other fourth ends at the circumference positions other than the reference position,
the third process is a process of forming, on the annular core member M1, the rotation uneven parts on the surfaces of the first ends of the yokes at the circumference positions other than the position rotated by the predetermined angle from the reference position, and of forming, on the annular core member M8, the rotation uneven parts on the surfaces of the fourth ends of the yokes at the circumference positions other than the reference position; and
the fourth process is a process of laminating the annular core member M1 and the annular core member M8 alternately while rotating the annular core member M1 and the annular core member M6 by the predetermined angle such that one of the first ends in the circumferential direction of the annular core member M1, the first end having no rotation uneven part processed, is positionally identical in the laminating direction with one of the fourth ends in the circumferential direction of the annular core member M8, the fourth end having no rotation uneven part processed.

5. The method for manufacturing the iron core according to claim 1, wherein
the first process is a process of:
  manufacturing, from the first annular core member, an annular core member M1 by making a cut line of the first shape with respect to one of the first ends that is at the position rotated by the predetermined angle from the reference position, and by making cut lines of the first shape with respect to the other first ends that are at the circumference positions other than the position rotated by the predetermined angle from the reference position; and
  manufacturing, from the first annular core member, an annular core member M5 by making a cut line of the first shape with respect to one of the first ends that is at the reference position, and by making cut lines of the first shape with respect to the other first ends that are at the circumference positions other than the reference position,
the second process is a process of:
  manufacturing, from the second annular core member, an annular core member M2 by making a cut line of the second shape with respect to one of the fourth ends that is at the position rotated by the predetermined angle from the reference position, and by making cut lines of the first shape with respect to the other fourth ends that are at the circumference positions other than the position rotated by the predetermined angle from the reference position; and
  manufacturing, from the second annular core member, an annular core member M6 by making a cut line of the second shape with respect to one of the fourth ends that is at the reference position, and by making cut lines of the first shape with respect to the other fourth ends at the circumference positions other than the reference position,
the third process is a process of:
  forming, on the annular core member M1, the rotation uneven parts on the surfaces of the first ends of the yokes at the circumference positions other than the position rotated by the predetermined angle from the reference position;

forming, on the annular core member M5, the rotation uneven parts on the surfaces of the first ends of the yokes at the circumference positions other than the reference position;

forming, on the annular core member M2, the rotation uneven parts on the surfaces of the fourth ends of the yokes at the circumference positions other than the position rotated by the predetermined angle from the reference position; and forming, on the annular core member M6, the rotation uneven parts on the surfaces of the fourth ends of the yokes at the circumference positions other than the reference position, and the fourth process is a process of:

forming at least one core part C12 by laminating the annular core member M1 and the annular core member M2 alternately such that one of the first ends in the circumferential direction of the annular core member M1, the first end having no rotation uneven part processed, is positionally identical in the laminating direction with one of the third ends in the circumferential direction of the annular core member M2, the third end having no rotation uneven part processed;

forming at least one core part C56 by laminating the annular core member M5 and the annular core member M6 alternately such that one of the first ends in the circumferential direction of the annular core member M5, the first end having no rotation uneven part processed, is positionally identical in the laminating direction with one of the third ends in the circumferential direction of the annular core member M6, the third end having no rotation uneven part processed; and laminating the core parts C12 and C56 alternately while rotating the core parts C12 and C56 by the predetermined angle such that the first end of the annular core member M1, the third end of the annular core member M2, the first end of the annular core member M5, and the third end of the annular core member M6 are positionally identical in the laminating direction with one another, all of the ends being in the circumferential direction and none of the ends having a rotation uneven part processed.

6. The method for manufacturing the iron core according to claim 1, wherein the first process is a process of:

manufacturing, from the first annular core member, an annular core member M1 by making a cut line of the first shape with respect to one of the first ends that is at the position rotated by the predetermined angle from the reference position, and by making cut lines of the first shape with respect to the other first ends that are at the circumference positions other than the position rotated by the predetermined angle from the reference position; and manufacturing, from the first annular core member, an annular core member M7 by making a cut line of the second shape with respect to one of the first ends that is at the reference position, and by making cut lines of the first shape with respect to the other first ends that are at the circumference positions other than the reference position, the second process is a process of:

manufacturing, from the second annular core member, an annular core member M2 by making a cut line of the second shape with respect to one of the fourth ends that is at the position rotated by the predetermined angle from the reference position, and by making cut lines of the first shape with respect to the other fourth ends that are at the circumference positions other than the position rotated by the predetermined angle from the reference position; and manufacturing, from the second annular core member, an annular core member M8 by making a cut line of the first shape with respect to one of the fourth ends that is at the reference position, and by making cut lines of the first shape with respect to the other fourth ends at the circumference positions other than the reference position, the third process is a process of:

forming, on the annular core member M1, the rotation uneven parts on the surfaces of the first ends of the yokes at the circumference positions other than the position rotated by the predetermined angle from the reference position;

forming, on the annular core member M7, the rotation uneven parts on the surfaces of the first ends of the yokes at the circumference positions other than the reference position;

forming, on the annular core member M2, the rotation uneven parts on the surfaces of the fourth ends of the yokes at the circumference positions other than the position rotated by the predetermined angle from the reference position; and forming, on the annular core member M8, the rotation uneven parts on the surfaces of the fourth ends of the yokes at the circumference positions other than the reference position, and the fourth process is a process of:

forming at least one core part C12 by laminating the annular core member M1 and the annular core member M2 alternately such that one of the first ends in the circumferential direction of the annular core member M1, the first end having no rotation uneven part processed, is positionally identical in the laminating direction with one of the third ends in the circumferential direction of the annular core member M2, the third end having no rotation uneven part processed;

forming at least one core part C78 by laminating the annular core member M7 and the annular core member M8 alternately such that one of the second ends in the circumferential direction of the annular core member M7, the second end having no rotation uneven part processed, is positionally identical in the laminating direction with one of the fourth ends in the circumferential direction of the annular core member M8, the fourth end having no rotation uneven part processed; and laminating the core parts C12 and C78 alternately while rotating the core parts C12 and C78 by the predetermined angle such that the first end of the annular core member M1, the third end of the annular core member M2, the second end of the annular core member M7, and the fourth end of the annular core member M8 are positionally identical in the laminating direction with one another, all of the ends being in the circumferential direction and none of the ends having a rotation uneven part processed.

7. The method for manufacturing the iron core according to claim 1, wherein the first process is a process of:

manufacturing, from the first annular core member, an annular core member M1 by making a cut line of the first shape with respect to one of the first ends that is at the position rotated by the predetermined angle from the reference position, and by making cut lines of the first shape with respect to the other first ends that are at the circumference positions other than the position rotated by the predetermined angle from the reference position; and manufacturing, from the first annular core member, an annular core member M5 by making a cut line of the first shape with respect to one of the first ends that is at the reference position, and by making cut lines of the first shape with respect to the other first ends that are at the circumference positions other than the reference position, the second process is a process of:

manufacturing, from the second annular core member, an annular core member M4 by making a cut line of the first shape with respect to one of the fourth ends that is at the position rotated by the predetermined angle from the reference position, and by making cut lines of the first shape with respect to the other fourth ends that are at the circumference positions other than the position rotated by the predetermined angle from the reference position; and manufacturing, from the second annular core member, an annular core member M8 by making a cut line of the first shape with respect to one of the fourth ends that is at the reference position, and by making cut lines of the first shape with respect to the other fourth ends at the circumference positions other than the reference position, the third process is a process of:

forming, on the annular core member M1, the rotation uneven parts on the surfaces of the first ends of the yokes at the circumference positions other than the position rotated by the predetermined angle from the reference position;

forming, on the annular core member M5, the rotation uneven parts on the surfaces of the first ends of the yokes at the circumference positions other than the reference position;

forming, on the annular core member M4, the rotation uneven parts on the surfaces of the fourth ends of the yokes at the circumference positions other than the position rotated by the predetermined angle from the reference position; and forming, on the annular core member M8, the rotation uneven parts on the surfaces of the fourth ends of the yokes at the circumference positions other than the reference position, and the fourth process is a process of:

forming at least one core part C14 by laminating the annular core member M1 and the annular core member M4 alternately such that one of the first ends in the circumferential direction of the annular core member M1, the first end having no rotation uneven part processed, is positionally identical in the laminating direction with one of the fourth ends in the circumferential direction of the annular core member M4, the fourth end having no rotation uneven part processed;

forming at least one core part C58 by laminating the annular core member M5 and the annular core member M8 alternately such that one of the first ends in the circumferential direction of the annular core member M5, the first end having no rotation uneven part processed, is positionally identical in the laminating direction with one of the fourth ends in the circumferential direction of the annular core member M8, the fourth end having no rotation uneven part processed; and laminating the core parts C14 and C58 alternately while rotating the core parts C14 and C58 by the predetermined angle such that the first end of the annular core member M1, the fourth end of the annular core member M4, the first end of the annular core member M5, and the fourth end of the annular core member M8 are positionally identical in the laminating direction with one another, all of the ends being in the circumferential direction and none of the ends having a rotation uneven part processed.

8. The method for manufacturing the iron core according to claim 1, wherein the first process is a process of:

manufacturing, from the first annular core member, an annular core member M1 by making a cut line of the first shape with respect to one of the first ends that is at the position rotated by the predetermined angle from the reference position, and by making cut lines of the first shape with respect to the other first ends that are at the circumference positions other than the position rotated by the predetermined angle from the reference position;

manufacturing, from the first annular core member, an annular core member M5 by making a cut line of the first shape with respect to one of the first ends that is at the reference position, and by making cut lines of the first shape with respect to the other first ends that are at the circumference positions other than the reference position; and manufacturing, from the first annular core member, an annular core member M3 by making a cut line of the second shape with respect to one of the first ends that is at the position rotated by the predetermined angle from the reference position, and by making cut lines of the first shape with respect to the other first ends that are at the circumference positions other than the position rotated by the predetermined angle from the reference position;

manufacturing, from the first annular core member, an annular core member M7 by making a cut line of the second shape with respect to one of the first ends that is at the reference position, and by making cut lines of the first shape with respect to the other first ends that are at the circumference positions other than the reference position;

the second process is a process of:

manufacturing, from the second annular core member, an annular core member M2 by making a cut line of the second shape with respect to one of the fourth ends that is at the position rotated by the predetermined angle from the reference position, and by making cut lines of the first shape with respect to the other fourth ends that are at the circumference positions other than the position rotated by the predetermined angle from the reference position;

manufacturing, from the second annular core member, an annular core member M6 by making a cut line of the second shape with respect to one of the fourth ends that is at the reference position, and by making cut lines of the first shape with respect to the other fourth ends at the circumference positions other than the reference position;

manufacturing, from the second annular core member, an annular core member M4 by making a cut line of the first shape with respect to one of the fourth ends that is at the position rotated by the predetermined angle from the reference position, and by making cut lines of the first shape with respect to the other fourth ends at the circumference positions other than the position rotated by the predetermined angle from the reference position; and manufacturing, from the second annular core member, an annular core member M8 by making a cut line of the first shape with respect to one of the fourth ends that is at the reference position, and by making cut lines of the first shape with respect to the other fourth ends at the circumference positions other than the reference position, the third process is a process of:

forming, on the annular core member M1, the rotation uneven parts on the surfaces of the first ends of the yokes at the circumference positions other than the position rotated by the predetermined angle from the reference position;

forming, on the annular core member M5, the rotation uneven parts on the surfaces of the first ends of the yokes at the circumference positions other than the reference position;

forming, on the annular core member M3, the rotation uneven parts on the surfaces of the first ends of the yokes at the circumference positions other than the position rotated by the predetermined angle from the reference position;

forming, on the annular core member M7, the rotation uneven parts on the surfaces of the first ends of the yokes at the circumference positions other than the reference position;

forming, on the annular core member M2, the rotation uneven parts on the surfaces of the fourth ends of the yokes at the circumference positions other than the position rotated by the predetermined angle from the reference position;

forming, on the annular core member M6, the rotation uneven parts on the surfaces of the fourth ends of the yokes at the circumference positions other than the reference position;

forming, on the annular core member M4, the rotation uneven parts on the surfaces of the fourth ends of the yokes at the circumference positions other than the position rotated by the predetermined angle from the reference position; and forming, on the annular core member M8, the rotation uneven parts on the surfaces of the fourth ends of the yokes at the circumference positions other than the reference position, and the fourth process is a process of:

forming a core part C12 by laminating the annular core member M1 and the annular core member M2 alternately such that one of the first ends in the circumferential direction of the annular core member M1, the first end having no rotation uneven part processed, is positionally identical in the laminating direction with one of the third ends in the circumferential direction of the annular core member M2, the third end having no rotation uneven part processed;

forming a core part C56 by laminating the annular core member M5 and the annular core member M6 alternately such that one of the first ends in the circumferential direction of the annular core member M5, the first end having no rotation uneven part processed, is positionally identical in the laminating direction with one of the third ends in the circumferential direction of the annular core member M6, the third end having no rotation uneven part processed;

forming a core part C34 by laminating the annular core member M3 and the annular core member M4 alternately such that one of the second ends in the circumferential direction of the annular core member M3, the second end having no rotation uneven part processed, is positionally identical in the laminating direction with one of the fourth ends in the circumferential direction of the annular core member M4, the fourth end having no rotation uneven part processed;

forming a core part C78 by laminating the annular core member M7 and the annular core member M8 alternately such that one of the second ends in the circumferential direction of the annular core member M7, the second end having no rotation uneven part processed, is positionally identical in the laminating direction with one of the fourth ends in the circumferential direction of the annular core member M8, the fourth end having no rotation uneven part processed; and laminating the core parts C12, C56, C34, and C78 alternately while rotating the core parts C12, C56, C34, and C78 by the predetermined angle such that the first end of the annular core member M1, the third end of the annular core member M2, the first end of the annular core member M5, the third end of the annular core member M6, the second end of the annular core member M3, the fourth end of the annular core member M4, the second end of the annular core member M7, and the fourth end of the annular core member M8 are positionally identical in the laminating direction with one another, all of the ends being in the circumferential direction and none of the ends having a rotation uneven part processed.

9. An apparatus for manufacturing an iron core having a structure, in which first split core pieces adjoining one another in the circumferential direction and second split core pieces adjoining one another in the circumferential direction are mutually rotatable, by forming a first annular core member by punching a plurality of first split core pieces in an annular shape out of a sheet of magnetic plate material, the first split core pieces each including: a yoke part which includes a first end of a first shape oriented in a first circumferential direction and a second end of a second shape, which is different from the first shape and is oriented in a second circumferential direction, and which has a rotation uneven part arranged on the surface of the first end; and a tooth part projecting inwardly in the radial direction from the yoke part, such that the first end of the yoke part of each first split core piece comes in contact with the second end of the yoke part of its circumferentially adjoining first split core piece, by forming a second annular core member by punching a plurality of second split core pieces in an annular shape out of a sheet of magnetic plate material, the second split core pieces each including: a yoke part which includes a third end of the second shape oriented in the first circumferential direction and a fourth end of the first shape oriented in the second circumferential direction, and which has a rotation uneven part arranged on the surface of the fourth end; and a tooth part projecting inwardly in the radial direction from the yoke part, such that the third end of the yoke part of each second split core piece comes in contact with the fourth end of the yoke part of its circumferentially adjoining second split core piece, and by concentrically laminating the first annular core member and the second annular core member such that each first end of the first shape is overlaid with its corresponding fourth end of the first shape, and connecting the overlaid portions by the rotation uneven parts, the apparatus comprising:

a metallic mold stage including:
- a first cut processing punch which makes, on the first annular core member, cut lines of the first shape or the second shape with respect to the first ends that are at the reference position, and at the position rotated by a predetermined angle from the reference position, and which also makes, on the first annular core member, cut lines of the first shape with respect to the first ends that are at circumference positions other than the reference position, and the position rotated by the predetermined angle from the reference position;
- a second processing punch which makes, on the second annular core member, cut lines of the first shape or the second shape with respect to the fourth ends that are at the reference position, and at the position rotated by the predetermined angle reference position, and which also makes, on the second annular core member, cut lines of the first shape with respect to the fourth ends that are at the circumference positions other than the reference position, and the position rotated by the predetermined angle from the reference position;
- a first rotation uneven part processing punch for forming rotation uneven parts each on the surface of one of the first ends of the first annular core member, and on the surface of one of the fourth ends of the second annular core member, the first end and the fourth end being at the reference position;
- a second rotation uneven part processing punch for forming rotation uneven parts each on the surface of one of the first ends of the first annular core member and on the surface of one of the fourth ends of the second annular core member, the first end and the fourth end being at the position rotated by the predetermined angle from the reference position; and
- a third rotation uneven part processing punch for forming rotation uneven parts on the surfaces of the other first ends of the first annular core member, and on the surfaces of the other fourth ends of the second annular core member, the first ends and the fourth ends being at the circumference positions other than the reference position, and the position rotated by the predetermined angle from the reference position, and a rotary lamination apparatus for laminating the first annular core member and the second annular core member while rotating the first annular core member or the second annular core member B by the predetermined angle such that one of the first ends in the circumferential direction of the first annular core member, the first end having no rotation uneven part processed, is positionally identical in the laminating direction with one of the fourth ends in the circumferential direction of the second annular core member, the fourth end having no rotation uneven part processed.

10. The apparatus for manufacturing the iron core according to claim 9, wherein the first and the second cut processing punches include:
- a punch that makes the cut line of the first shape with respect to one of the first ends, at the reference position, in the first annular core member, or one of the fourth ends, at the reference position, in the second annular core member;
- a punch that makes the cut line of the second shape with respect to one of the first ends, at the reference position, in the first annular core member, or one of the fourth ends, at the reference position, in the second annular core member;
- a punch that makes the cut line of the first shape with respect to one of the first ends, at the position rotated by the predetermined angle from the reference position, in the first annular core member, or one of the fourth ends, at the position rotated by the predetermined angle from the reference position, in the second annular core member;
- a punch that makes the cut line of the second shape with respect to one of the first ends, at the position rotated by the predetermined angle from the reference position, in the first annular core member, or one of the fourth ends, at the position rotated by the predetermined angle from the reference position, in the second annular core member;
- a punch that makes the cut lines of the first shape with respect to the first ends that are at the circumference positions other than the reference position and the position rotated by the predetermined angle from the reference position, in the first annular core member, or the fourth ends that are at the circumference positions other than the reference position and the position rotated by the predetermined angle from the reference position, in the second annular core member; and
- a punch that makes the cut lines of the second shape with respect to the first ends that are at the circumference positions other than the reference position and the position rotated by the predetermined angle from the reference position, in the first annular core member, or the fourth ends that are at the circumference positions other than the reference position and the position rotated by the predetermined angle from the reference position, in the second annular core member.

* * * * *